US011616992B2

United States Patent
Santangelo et al.

(10) Patent No.: US 11,616,992 B2
(45) Date of Patent: Mar. 28, 2023

(54) APPARATUS AND METHODS FOR DYNAMIC SECONDARY CONTENT AND DATA INSERTION AND DELIVERY

(71) Applicant: Time Warner Cable Enterprises LLC, St. Louis, MO (US)

(72) Inventors: Bryan Santangelo, Tulsa, OK (US); Justin Tidwell, Waxhaw, NC (US)

(73) Assignee: TIME WARNER CABLE ENTERPRISES LLC, St. Louis, MO (US)

( * ) Notice: Subject to any disclaimer, the term of this patent is extended or adjusted under 35 U.S.C. 154(b) by 440 days.

(21) Appl. No.: 16/409,591

(22) Filed: May 10, 2019

(65) Prior Publication Data

US 2019/0268392 A1    Aug. 29, 2019

Related U.S. Application Data

(62) Division of application No. 12/766,433, filed on Apr. 23, 2010, now abandoned.

(51) Int. Cl.
*H04N 21/234* (2011.01)
*G06Q 30/02* (2012.01)
(Continued)

(52) U.S. Cl.
CPC ....... *H04N 21/23424* (2013.01); *G06Q 30/02* (2013.01); *G06Q 30/0241* (2013.01);
(Continued)

(58) Field of Classification Search
None
See application file for complete search history.

(56) References Cited

U.S. PATENT DOCUMENTS

| 4,975,909 A | 12/1990 | Masson et al. |
| 5,410,344 A | 4/1995 | Graves et al. |

(Continued)

FOREIGN PATENT DOCUMENTS

| EP | 1134951 A2 | 9/2001 |
| EP | 1691523 A1 | 8/2006 |

(Continued)

OTHER PUBLICATIONS

IP-Internet Protocol, About.com, Internet Archive Capture date of Mar. 4, 2009 from URL http://compnetworking.about.com/od/networkprotocolsip/g/ip_protocol.htm.

(Continued)

*Primary Examiner* — Ricky Chin
(74) *Attorney, Agent, or Firm* — Patent Beach PC

(57) ABSTRACT

Apparatus and methods for providing primary and secondary content and data to users. In one embodiment, management entities at a content delivery network core cooperate to provide primary content with contextually related or germane inserted secondary content to user devices. Inserted secondary content may include e.g., advertisements, multimedia applications, interactive programming, and scheduled programming. A network entity monitors user-specific data such as demographics, geographic location, and viewing patterns, and facilitates content selection and delivery based thereon. Content insertion may further be managed by a campaign manager according to business rules. In another embodiment, the primary and secondary content is pushed to a device at or near the network edge based on the applicability thereof to devices serviced by the edge device.

17 Claims, 18 Drawing Sheets

(51) Int. Cl.
*H04L 67/306* (2022.01)
*H04N 21/44* (2011.01)
*H04N 21/458* (2011.01)
*H04L 65/611* (2022.01)
*H04L 65/612* (2022.01)
*H04L 65/75* (2022.01)
*H04L 67/53* (2022.01)
*H04L 67/50* (2022.01)
*G06Q 30/0241* (2023.01)
*G06Q 30/0251* (2023.01)

(52) U.S. Cl.
CPC ..... *G06Q 30/0251* (2013.01); *G06Q 30/0267* (2013.01); *H04L 65/611* (2022.05); *H04L 65/612* (2022.05); *H04L 65/765* (2022.05); *H04L 67/306* (2013.01); *H04L 67/53* (2022.05); *H04L 67/535* (2022.05); *H04N 21/44016* (2013.01); *H04N 21/458* (2013.01)

(56) References Cited

U.S. PATENT DOCUMENTS

| | | | |
|---|---|---|---|
| 5,515,510 A | 5/1996 | Kikinis | |
| 5,528,284 A | 6/1996 | Iwami et al. | |
| 5,708,961 A | 1/1998 | Hylton et al. | |
| 5,758,257 A | 5/1998 | Herz et al. | |
| 5,790,935 A | 8/1998 | Payton | |
| 5,815,146 A | 9/1998 | Youden et al. | |
| 5,818,438 A | 10/1998 | Howe et al. | |
| 5,842,221 A | 11/1998 | Schmonsees | |
| 5,913,040 A | 6/1999 | Rakavy et al. | |
| 5,987,506 A | 11/1999 | Carter et al. | |
| 5,995,708 A | 11/1999 | Corey | |
| 6,006,265 A | 12/1999 | Rangan et al. | |
| 6,073,160 A | 6/2000 | Grantham et al. | |
| 6,092,197 A | 7/2000 | Coueignoux | |
| 6,112,192 A | 8/2000 | Capek | |
| 6,122,647 A | 9/2000 | Horowitz et al. | |
| 6,167,432 A | 12/2000 | Jiang | |
| 6,169,570 B1 | 1/2001 | Suzuki | |
| 6,171,931 B1 | 1/2001 | Murari et al. | |
| 6,177,931 B1 | 1/2001 | Alexander et al. | |
| 6,181,697 B1 | 1/2001 | Nurenberg et al. | |
| 6,219,710 B1 | 4/2001 | Gray et al. | |
| 6,259,701 B1 | 7/2001 | Shur et al. | |
| 6,285,999 B1 | 9/2001 | Page | |
| 6,286,041 B1 | 9/2001 | Collins, III et al. | |
| 6,321,257 B1 | 11/2001 | Kotola et al. | |
| 6,519,062 B1 | 2/2003 | Yoo | |
| 6,523,696 B1 | 2/2003 | Saito et al. | |
| 6,574,617 B1 | 6/2003 | Immerman et al. | |
| 6,581,207 B1 | 6/2003 | Sumita et al. | |
| 6,640,145 B2 | 10/2003 | Hoffberg et al. | |
| 6,694,145 B2 | 2/2004 | Riikonen et al. | |
| 6,704,930 B1 | 3/2004 | Eldering et al. | |
| 6,741,980 B1 | 5/2004 | Langseth et al. | |
| 6,760,916 B2 | 7/2004 | Holtz et al. | |
| 6,769,127 B1 | 7/2004 | Bonomi et al. | |
| 6,782,550 B1 | 8/2004 | Cao | |
| 6,785,704 B1 | 8/2004 | McCanne | |
| 6,788,676 B2 | 9/2004 | Partanen et al. | |
| 6,832,259 B2 | 12/2004 | Hymel et al. | |
| 6,925,257 B2 | 8/2005 | Yoo | |
| 6,944,150 B1 | 9/2005 | McConnell et al. | |
| 6,975,850 B1 | 12/2005 | Hurtta et al. | |
| 6,978,370 B1 | 12/2005 | Kocher | |
| 7,006,881 B1 | 2/2006 | Hoffberg et al. | |
| 7,009,972 B2 | 3/2006 | Maher et al. | |
| 7,024,466 B2 | 4/2006 | Outten et al. | |
| 7,025,209 B2 | 4/2006 | Hawkins | |
| 7,027,460 B2 | 4/2006 | Iyer et al. | |
| 7,028,071 B1 * | 4/2006 | Slik | G06Q 30/02 348/E7.071 |
| 7,039,048 B2 | 5/2006 | Monta et al. | |
| 7,054,843 B2 | 5/2006 | Charas | |
| 7,054,902 B2 | 5/2006 | Toporek et al. | |
| 7,068,639 B1 | 6/2006 | Varma et al. | |
| 7,099,308 B2 | 8/2006 | Merrill et al. | |
| 7,103,906 B1 | 9/2006 | Katz et al. | |
| 7,106,382 B2 | 9/2006 | Shiotsu | |
| 7,149,772 B1 | 12/2006 | Kalavade | |
| 7,155,226 B1 | 12/2006 | Oh et al. | |
| 7,159,235 B2 | 1/2007 | Son et al. | |
| 7,167,895 B1 | 1/2007 | Connelly | |
| 7,174,126 B2 | 2/2007 | Mcelhatten et al. | |
| 7,174,127 B2 | 2/2007 | Otten et al. | |
| 7,174,385 B2 | 2/2007 | Li | |
| 7,191,461 B1 | 3/2007 | Arsenault et al. | |
| 7,197,708 B1 | 3/2007 | Frendo et al. | |
| 7,203,185 B1 | 4/2007 | Dhara et al. | |
| 7,209,458 B2 | 4/2007 | Ahvonen et al. | |
| 7,222,163 B1 | 5/2007 | Girouard et al. | |
| 7,228,359 B1 | 6/2007 | Monteiro | |
| 7,237,017 B1 | 6/2007 | Pecus et al. | |
| 7,242,960 B2 | 7/2007 | Van et al. | |
| 7,254,608 B2 | 8/2007 | Yeager et al. | |
| 7,260,564 B1 | 8/2007 | Lynn et al. | |
| 7,325,073 B2 | 1/2008 | Shao et al. | |
| 7,330,483 B1 | 2/2008 | Peters et al. | |
| 7,330,875 B1 | 2/2008 | Parasnis et al. | |
| 7,340,510 B1 | 3/2008 | Liskov et al. | |
| 7,346,630 B2 | 3/2008 | Eichstaedt et al. | |
| 7,363,643 B2 | 4/2008 | Drake et al. | |
| 7,376,386 B2 | 5/2008 | Phillips et al. | |
| 7,383,228 B2 | 6/2008 | Lisanke et al. | |
| 7,406,099 B2 | 7/2008 | Schlagintweit | |
| 7,441,037 B2 | 10/2008 | Saxena | |
| 7,453,844 B1 | 11/2008 | Lee et al. | |
| 7,457,520 B2 | 11/2008 | Rosetti et al. | |
| 7,477,621 B1 | 1/2009 | Loc et al. | |
| 7,486,869 B2 | 2/2009 | Alexander et al. | |
| 7,496,647 B2 | 2/2009 | Karaoguz et al. | |
| 7,558,837 B1 | 7/2009 | Denny | |
| 7,567,988 B2 | 7/2009 | Wolf et al. | |
| 7,592,912 B2 | 9/2009 | Hasek et al. | |
| 7,602,820 B2 | 10/2009 | Helms et al. | |
| 7,603,321 B2 | 10/2009 | Gurvey | |
| 7,636,792 B1 | 12/2009 | Ho | |
| 7,653,689 B1 | 1/2010 | Champagne et al. | |
| 7,690,020 B2 | 3/2010 | Lebar | |
| 7,693,171 B2 | 4/2010 | Gould | |
| 7,711,605 B1 | 5/2010 | Santeufemia | |
| 7,721,314 B2 | 5/2010 | Sincaglia et al. | |
| 7,742,074 B2 | 6/2010 | Minatogawa | |
| 7,788,687 B1 * | 8/2010 | Conrad | H04N 21/4532 725/36 |
| 7,793,334 B2 | 9/2010 | Lewis | |
| 7,809,942 B2 | 10/2010 | Baran et al. | |
| 7,889,765 B2 | 2/2011 | Brooks et al. | |
| 7,937,725 B1 | 5/2011 | Schaffer et al. | |
| 7,954,131 B2 | 5/2011 | Cholas et al. | |
| 7,986,686 B2 | 7/2011 | Nadeau | |
| 8,010,691 B2 | 8/2011 | Kollmansberger et al. | |
| 8,015,583 B2 | 9/2011 | Bates et al. | |
| 8,028,322 B2 | 9/2011 | Riedl et al. | |
| 8,079,052 B2 | 12/2011 | Chen et al. | |
| 8,151,295 B1 * | 4/2012 | Eldering | H04N 21/4331 725/34 |
| 8,165,916 B2 | 4/2012 | Hoffberg et al. | |
| 8,205,226 B2 | 6/2012 | Ko et al. | |
| 8,219,134 B2 | 7/2012 | Maharajh et al. | |
| 8,228,818 B2 | 7/2012 | Chase et al. | |
| 8,249,918 B1 * | 8/2012 | Biere | G06Q 30/0241 705/14.4 |
| 8,272,020 B2 | 9/2012 | Watson et al. | |
| 8,296,643 B1 | 10/2012 | Vasilik | |
| 8,583,758 B2 | 11/2013 | Casey et al. | |
| 8,813,124 B2 | 8/2014 | Tidwell et al. | |
| 8,838,863 B2 | 9/2014 | Henriksson et al. | |
| 8,848,969 B2 * | 9/2014 | Ramsdell | H04N 21/812 382/100 |
| 8,856,825 B1 | 10/2014 | Mick, Jr. et al. | |
| 8,863,164 B1 | 10/2014 | Mick et al. | |

(56) References Cited

U.S. PATENT DOCUMENTS

| | | |
|---|---|---|
| 8,935,721 B2 | 1/2015 | Tidwell et al. |
| 9,178,634 B2 | 11/2015 | Tidwell et al. |
| 9,215,423 B2 | 12/2015 | Kimble et al. |
| 9,286,388 B2 | 3/2016 | Marsh |
| 9,479,807 B1 | 10/2016 | Bugajski et al. |
| 10,506,296 B2 * | 12/2019 | Bonvolanta ...... H04N 21/47815 |
| 10,586,023 B2 | 3/2020 | Gould et al. |
| 2001/0003194 A1 | 6/2001 | Shimura et al. |
| 2001/0004768 A1 | 6/2001 | Hodge et al. |
| 2001/0030975 A1 | 10/2001 | Limb et al. |
| 2001/0037223 A1 | 11/2001 | Beery et al. |
| 2001/0056573 A1 * | 12/2001 | Kovac ................. H04N 21/2543 |
| | | 725/32 |
| 2002/0002512 A1 | 1/2002 | Harpale |
| 2002/0003789 A1 | 1/2002 | Kim et al. |
| 2002/0013943 A1 | 1/2002 | Haberman et al. |
| 2002/0019984 A1 | 2/2002 | Rakib |
| 2002/0027883 A1 | 3/2002 | Belaiche |
| 2002/0032754 A1 | 3/2002 | Logston et al. |
| 2002/0038296 A1 | 3/2002 | Margolus et al. |
| 2002/0053076 A1 | 5/2002 | Landesmann |
| 2002/0055924 A1 * | 5/2002 | Liming .................. H04L 67/18 |
| 2002/0056107 A1 * | 5/2002 | Schlack ........... H04N 21/26233 |
| | | 725/46 |
| 2002/0056125 A1 | 5/2002 | Hodge et al. |
| 2002/0059619 A1 | 5/2002 | Lebar |
| 2002/0073421 A1 * | 6/2002 | Levitan .............. H04N 21/4532 |
| | | 725/28 |
| 2002/0075805 A1 | 6/2002 | Gupta et al. |
| 2002/0077787 A1 | 6/2002 | Rappaport et al. |
| 2002/0078444 A1 | 6/2002 | Krewin et al. |
| 2002/0082858 A1 | 6/2002 | Heddaya et al. |
| 2002/0083451 A1 | 6/2002 | Gill et al. |
| 2002/0085516 A1 | 7/2002 | Bridgelall |
| 2002/0087975 A1 | 7/2002 | Schlack |
| 2002/0112186 A1 | 8/2002 | Ford et al. |
| 2002/0129368 A1 | 9/2002 | Schlack et al. |
| 2002/0143565 A1 | 10/2002 | Headings et al. |
| 2002/0147771 A1 | 10/2002 | Traversat et al. |
| 2002/0152299 A1 | 10/2002 | Traversat et al. |
| 2002/0152458 A1 | 10/2002 | Eyer et al. |
| 2002/0161835 A1 | 10/2002 | Ball et al. |
| 2002/0178445 A1 * | 11/2002 | Eldering .............. H04N 21/812 |
| | | 725/32 |
| 2002/0184091 A1 * | 12/2002 | Pudar ................. G06Q 30/0272 |
| | | 705/14.62 |
| 2002/0188689 A1 | 12/2002 | Michael |
| 2002/0188744 A1 | 12/2002 | Mani |
| 2002/0188947 A1 | 12/2002 | Wang et al. |
| 2002/0194498 A1 | 12/2002 | Blight et al. |
| 2002/0194608 A1 | 12/2002 | Goldhor et al. |
| 2003/0005447 A1 | 1/2003 | Rodriguez |
| 2003/0023690 A1 | 1/2003 | Lohtia |
| 2003/0037338 A1 | 2/2003 | Suzuki |
| 2003/0056217 A1 | 3/2003 | Brooks |
| 2003/0061618 A1 | 3/2003 | Horiuchi et al. |
| 2003/0069873 A1 | 4/2003 | Fox et al. |
| 2003/0093790 A1 | 5/2003 | Logan et al. |
| 2003/0101454 A1 | 5/2003 | Ozer et al. |
| 2003/0126244 A1 | 7/2003 | Smith et al. |
| 2003/0130008 A1 | 7/2003 | Rajaniemi et al. |
| 2003/0149581 A1 | 8/2003 | Chaudhri et al. |
| 2003/0149884 A1 | 8/2003 | Hernandez et al. |
| 2003/0165241 A1 | 9/2003 | Fransdonk |
| 2003/0166401 A1 | 9/2003 | Combes et al. |
| 2003/0169234 A1 | 9/2003 | Kempisty |
| 2003/0172374 A1 | 9/2003 | Vinson et al. |
| 2003/0179865 A1 | 9/2003 | Stillman et al. |
| 2003/0182551 A1 | 9/2003 | Frantz et al. |
| 2003/0188023 A1 | 10/2003 | Grecco et al. |
| 2003/0192060 A1 | 10/2003 | Levy |
| 2003/0204602 A1 | 10/2003 | Hudson et al. |
| 2003/0208767 A1 | 11/2003 | Williamson et al. |
| 2003/0217365 A1 | 11/2003 | Caputo |
| 2003/0223450 A1 | 12/2003 | Bender et al. |
| 2003/0229900 A1 | 12/2003 | Reisman |
| 2003/0236839 A1 | 12/2003 | Demsky et al. |
| 2004/0001087 A1 * | 1/2004 | Warmus ................. H04H 60/65 |
| | | 715/745 |
| 2004/0003402 A1 | 1/2004 | McKenna, Jr. |
| 2004/0006694 A1 | 1/2004 | Heelan et al. |
| 2004/0015365 A1 | 1/2004 | Ohmori et al. |
| 2004/0015608 A1 | 1/2004 | Ellis et al. |
| 2004/0030747 A1 | 2/2004 | Oppermann et al. |
| 2004/0034877 A1 | 2/2004 | Nogues |
| 2004/0045032 A1 | 3/2004 | Cummings et al. |
| 2004/0045035 A1 | 3/2004 | Cummings et al. |
| 2004/0045037 A1 | 3/2004 | Cummings et al. |
| 2004/0103120 A1 | 5/2004 | Fickle et al. |
| 2004/0113936 A1 | 6/2004 | Dempski |
| 2004/0114539 A1 | 6/2004 | Beshai et al. |
| 2004/0117838 A1 | 6/2004 | Karaoguz et al. |
| 2004/0117846 A1 | 6/2004 | Karaoguz et al. |
| 2004/0128688 A1 | 7/2004 | Seo |
| 2004/0133467 A1 | 7/2004 | Siler |
| 2004/0133923 A1 | 7/2004 | Watson et al. |
| 2004/0137918 A1 | 7/2004 | Varonen et al. |
| 2004/0148625 A1 | 7/2004 | Eldering et al. |
| 2004/0153525 A1 | 8/2004 | Borella |
| 2004/0158858 A1 | 8/2004 | Paxton et al. |
| 2004/0162900 A1 | 8/2004 | Bucher et al. |
| 2004/0172531 A1 | 9/2004 | Little et al. |
| 2004/0185856 A1 | 9/2004 | McKenna et al. |
| 2004/0189873 A1 * | 9/2004 | Konig .................... H04N 7/162 |
| | | 348/E7.06 |
| 2004/0193712 A1 | 9/2004 | Benenati et al. |
| 2004/0194141 A1 | 9/2004 | Sanders |
| 2004/0199789 A1 | 10/2004 | Shaw |
| 2004/0216158 A1 | 10/2004 | Blas |
| 2004/0218827 A1 | 11/2004 | Cohen et al. |
| 2004/0246933 A1 | 12/2004 | Valko et al. |
| 2004/0255148 A1 | 12/2004 | Monteiro et al. |
| 2004/0261099 A1 | 12/2004 | Durden et al. |
| 2004/0268398 A1 | 12/2004 | Fano et al. |
| 2004/0268403 A1 | 12/2004 | Krieger et al. |
| 2005/0005308 A1 | 1/2005 | Logan et al. |
| 2005/0021940 A1 | 1/2005 | Ma |
| 2005/0028200 A1 | 2/2005 | Sardera |
| 2005/0034171 A1 | 2/2005 | Benya |
| 2005/0055220 A1 | 3/2005 | Lee et al. |
| 2005/0060229 A1 | 3/2005 | Riedl et al. |
| 2005/0060742 A1 | 3/2005 | Riedl et al. |
| 2005/0060745 A1 | 3/2005 | Riedl et al. |
| 2005/0091539 A1 | 4/2005 | Wang et al. |
| 2005/0102529 A1 | 5/2005 | Buddhikot et al. |
| 2005/0108529 A1 | 5/2005 | Juneau |
| 2005/0108763 A1 | 5/2005 | Baran et al. |
| 2005/0111467 A1 | 5/2005 | Ng et al. |
| 2005/0114900 A1 | 5/2005 | Ladd et al. |
| 2005/0122393 A1 | 6/2005 | Cockerton et al. |
| 2005/0132191 A1 | 6/2005 | Joshi et al. |
| 2005/0144333 A1 | 6/2005 | Kotzin |
| 2005/0144635 A1 | 6/2005 | Boortz et al. |
| 2005/0172312 A1 * | 8/2005 | Lienhart .............. H04N 21/458 |
| | | 725/19 |
| 2005/0177855 A1 | 8/2005 | Maynard et al. |
| 2005/0183120 A1 | 8/2005 | Jain et al. |
| 2005/0188402 A1 | 8/2005 | De et al. |
| 2005/0210502 A1 | 9/2005 | Flickinger et al. |
| 2005/0216942 A1 | 9/2005 | Barton |
| 2005/0229209 A1 | 10/2005 | Hildebolt et al. |
| 2005/0234779 A1 | 10/2005 | Chiu et al. |
| 2005/0238238 A1 | 10/2005 | Xu et al. |
| 2005/0257242 A1 | 11/2005 | Montgomery et al. |
| 2005/0261970 A1 | 11/2005 | Vucina et al. |
| 2005/0262418 A1 | 11/2005 | Gehrmann |
| 2005/0289588 A1 | 12/2005 | Kinnear |
| 2005/0289618 A1 | 12/2005 | Hardin |
| 2006/0010226 A1 | 1/2006 | Hurtta et al. |
| 2006/0015502 A1 | 1/2006 | Szucs |
| 2006/0015580 A1 | 1/2006 | Gabriel et al. |
| 2006/0015637 A1 | 1/2006 | Chung |
| 2006/0015925 A1 | 1/2006 | Logan |

(56) References Cited

U.S. PATENT DOCUMENTS

| | | |
|---|---|---|
| 2006/0020785 A1 | 1/2006 | Grawrock et al. |
| 2006/0031558 A1 | 2/2006 | Ortega et al. |
| 2006/0036488 A1 | 2/2006 | Golan et al. |
| 2006/0047957 A1 | 3/2006 | Helms et al. |
| 2006/0059342 A1 | 3/2006 | Medvinsky et al. |
| 2006/0061682 A1 | 3/2006 | Bradley et al. |
| 2006/0075230 A1 | 4/2006 | Baird et al. |
| 2006/0088063 A1 | 4/2006 | Hartung et al. |
| 2006/0090186 A1 | 4/2006 | Santangelo et al. |
| 2006/0095940 A1 | 5/2006 | Yearwood |
| 2006/0106805 A1 | 5/2006 | Aaron |
| 2006/0112038 A1 | 5/2006 | Luo |
| 2006/0116966 A1 | 6/2006 | Pedersen et al. |
| 2006/0117357 A1 | 6/2006 | Surline et al. |
| 2006/0117365 A1 | 6/2006 | Ueda et al. |
| 2006/0123147 A1 | 6/2006 | Yasuhara |
| 2006/0130099 A1 | 6/2006 | Rooyen |
| 2006/0130107 A1 | 6/2006 | Gonder et al. |
| 2006/0130113 A1 | 6/2006 | Carlucci et al. |
| 2006/0130120 A1 | 6/2006 | Brandyberry et al. |
| 2006/0136964 A1 | 6/2006 | Diez et al. |
| 2006/0149710 A1 | 7/2006 | Koningstein et al. |
| 2006/0149850 A1 | 7/2006 | Bowman |
| 2006/0159048 A1 | 7/2006 | Han et al. |
| 2006/0168119 A1 | 7/2006 | Inoue et al. |
| 2006/0173974 A1 | 8/2006 | Tang |
| 2006/0185004 A1 | 8/2006 | Song et al. |
| 2006/0187900 A1 | 8/2006 | Akbar |
| 2006/0190336 A1 | 8/2006 | Pisaris-Henderson et al. |
| 2006/0195553 A1 | 8/2006 | Nakamura |
| 2006/0200761 A1 | 9/2006 | Judd et al. |
| 2006/0209799 A1 | 9/2006 | Gallagher et al. |
| 2006/0218604 A1 | 9/2006 | Riedl et al. |
| 2006/0224447 A1 | 10/2006 | Koningstein |
| 2006/0230427 A1 | 10/2006 | Kunkel et al. |
| 2006/0230457 A1 | 10/2006 | Hagan et al. |
| 2006/0242267 A1 | 10/2006 | Grossman |
| 2006/0248209 A1 | 11/2006 | Chiu et al. |
| 2006/0248553 A1 | 11/2006 | Mikkelson et al. |
| 2006/0248555 A1 | 11/2006 | Eldering |
| 2006/0253545 A1 | 11/2006 | Lakamp |
| 2006/0253584 A1 | 11/2006 | Dixon et al. |
| 2006/0253894 A1 | 11/2006 | Bookman et al. |
| 2006/0256814 A1 | 11/2006 | Caci |
| 2006/0259927 A1 | 11/2006 | Acharya et al. |
| 2006/0260601 A1 | 11/2006 | Schedeler et al. |
| 2006/0277098 A1 | 12/2006 | Chung et al. |
| 2006/0291506 A1 | 12/2006 | Cain |
| 2006/0291507 A1 | 12/2006 | Sarosi et al. |
| 2006/0293921 A1 | 12/2006 | McCarthy et al. |
| 2006/0293954 A1 | 12/2006 | Anderson et al. |
| 2007/0016476 A1 | 1/2007 | Hoffberg et al. |
| 2007/0019645 A1 | 1/2007 | Menon |
| 2007/0022032 A1 | 1/2007 | Anderson et al. |
| 2007/0022459 A1 | 1/2007 | Gaebel et al. |
| 2007/0027809 A1 | 2/2007 | Alve |
| 2007/0033531 A1 | 2/2007 | Marsh |
| 2007/0038671 A1 | 2/2007 | Holm et al. |
| 2007/0038931 A1 | 2/2007 | Allaire et al. |
| 2007/0048716 A1 | 3/2007 | Hsu et al. |
| 2007/0049245 A1 | 3/2007 | Lipman |
| 2007/0061331 A1 | 3/2007 | Ramer et al. |
| 2007/0061336 A1 | 3/2007 | Ramer et al. |
| 2007/0067297 A1 | 3/2007 | Kublickis |
| 2007/0067851 A1 | 3/2007 | Fernando et al. |
| 2007/0076728 A1 | 4/2007 | Rieger et al. |
| 2007/0077921 A1 | 4/2007 | Hayashi et al. |
| 2007/0078714 A1 | 4/2007 | Ott et al. |
| 2007/0086372 A1 | 4/2007 | Lee et al. |
| 2007/0088801 A1 | 4/2007 | Levkovitz et al. |
| 2007/0088832 A1 | 4/2007 | Tsang et al. |
| 2007/0091920 A1 | 4/2007 | Harris et al. |
| 2007/0094691 A1 | 4/2007 | Gazdzinski |
| 2007/0098350 A1 | 5/2007 | Gibbon et al. |
| 2007/0101359 A1 | 5/2007 | Schiller et al. |
| 2007/0115922 A1 | 5/2007 | Schneider et al. |
| 2007/0118848 A1 | 5/2007 | Schwesinger et al. |
| 2007/0118910 A1 | 5/2007 | Taylor et al. |
| 2007/0121612 A1 | 5/2007 | Nadeau et al. |
| 2007/0121678 A1 | 5/2007 | Brooks et al. |
| 2007/0123253 A1 | 5/2007 | Simongini et al. |
| 2007/0124416 A1 | 5/2007 | Casey et al. |
| 2007/0124488 A1 | 5/2007 | Baum et al. |
| 2007/0124781 A1 | 5/2007 | Casey et al. |
| 2007/0130010 A1 | 6/2007 | Pokonosky |
| 2007/0136743 A1 | 6/2007 | Hasek et al. |
| 2007/0157234 A1 | 7/2007 | Walker |
| 2007/0157260 A1 | 7/2007 | Walker |
| 2007/0162958 A1 | 7/2007 | Kao et al. |
| 2007/0166687 A1 | 7/2007 | Bell et al. |
| 2007/0168429 A1 | 7/2007 | Apfel et al. |
| 2007/0186103 A1 | 8/2007 | Randle et al. |
| 2007/0204292 A1 | 8/2007 | Riedl et al. |
| 2007/0204314 A1 | 8/2007 | Hasek et al. |
| 2007/0209059 A1 | 9/2007 | Moore et al. |
| 2007/0217436 A1 | 9/2007 | Markley et al. |
| 2007/0219860 A1 | 9/2007 | Karls et al. |
| 2007/0219910 A1 | 9/2007 | Martinez |
| 2007/0220158 A1 | 9/2007 | Tolgu et al. |
| 2007/0237077 A1 | 10/2007 | Patwardhan et al. |
| 2007/0239536 A1 | 10/2007 | Bollapragada |
| 2007/0244760 A1 | 10/2007 | Bodnar et al. |
| 2007/0250880 A1 | 10/2007 | Hainline |
| 2007/0255755 A1 | 11/2007 | Zhang et al. |
| 2007/0260604 A1 | 11/2007 | Haeuser |
| 2007/0271388 A1 | 11/2007 | Bowra et al. |
| 2007/0276801 A1 | 11/2007 | Lawrence et al. |
| 2007/0276925 A1 | 11/2007 | La et al. |
| 2007/0276926 A1* | 11/2007 | LaJoie ................ H04N 21/812 709/219 |
| 2007/0276928 A1 | 11/2007 | Rhoads et al. |
| 2008/0009268 A1 | 1/2008 | Ramer et al. |
| 2008/0019661 A1 | 1/2008 | Obrador et al. |
| 2008/0022012 A1 | 1/2008 | Wang |
| 2008/0046542 A1 | 2/2008 | Sano et al. |
| 2008/0066112 A1 | 3/2008 | Bailey et al. |
| 2008/0086750 A1 | 4/2008 | Yasrebi et al. |
| 2008/0091805 A1 | 4/2008 | Malaby et al. |
| 2008/0098212 A1 | 4/2008 | Helms et al. |
| 2008/0133551 A1 | 6/2008 | Wensley et al. |
| 2008/0147497 A1 | 6/2008 | Tischer |
| 2008/0155059 A1 | 6/2008 | Hardin et al. |
| 2008/0155588 A1 | 6/2008 | Roberts et al. |
| 2008/0155614 A1 | 6/2008 | Cooper et al. |
| 2008/0162623 A1 | 7/2008 | Flynn et al. |
| 2008/0178225 A1 | 7/2008 | Jost |
| 2008/0184122 A1 | 7/2008 | Grant et al. |
| 2008/0188964 A1 | 8/2008 | Bech |
| 2008/0192770 A1 | 8/2008 | Burrows et al. |
| 2008/0195468 A1 | 8/2008 | Malik |
| 2008/0235722 A1* | 9/2008 | Baugher ............... H04N 7/1675 725/32 |
| 2008/0235746 A1 | 9/2008 | Peters et al. |
| 2008/0244667 A1 | 10/2008 | Osborne |
| 2008/0250447 A1 | 10/2008 | Rowe et al. |
| 2008/0263578 A1 | 10/2008 | Bayer et al. |
| 2008/0271070 A1 | 10/2008 | Kanojia et al. |
| 2008/0273591 A1 | 11/2008 | Brooks et al. |
| 2008/0281697 A1 | 11/2008 | Whitehead |
| 2008/0282299 A1 | 11/2008 | Koat et al. |
| 2008/0289009 A1 | 11/2008 | Lee et al. |
| 2008/0306814 A1 | 12/2008 | Hudson |
| 2008/0307454 A1 | 12/2008 | Ahanger et al. |
| 2008/0313691 A1 | 12/2008 | Cholas et al. |
| 2009/0006145 A1 | 1/2009 | Duggal et al. |
| 2009/0022472 A1 | 1/2009 | Bronstein et al. |
| 2009/0030802 A1 | 1/2009 | Plotnick et al. |
| 2009/0031384 A1 | 1/2009 | Brooks et al. |
| 2009/0034521 A1 | 2/2009 | Kato |
| 2009/0064219 A1* | 3/2009 | Minor ................ H04N 21/4725 725/32 |
| 2009/0083279 A1 | 3/2009 | Hasek |
| 2009/0083813 A1 | 3/2009 | Dolce et al. |
| 2009/0100459 A1 | 4/2009 | Riedl et al. |

(56) References Cited

U.S. PATENT DOCUMENTS

| | | | |
|---|---|---|---|
| 2009/0119169 A1 | 5/2009 | Chandratillake et al. | |
| 2009/0125951 A1 | 5/2009 | Agricola et al. | |
| 2009/0132346 A1 | 5/2009 | Duggal et al. | |
| 2009/0165045 A1 | 6/2009 | Stallings et al. | |
| 2009/0171784 A1 | 7/2009 | Morgan et al. | |
| 2009/0185576 A1 | 7/2009 | Kisel et al. | |
| 2009/0187944 A1 | 7/2009 | White et al. | |
| 2009/0193485 A1 | 7/2009 | Rieger et al. | |
| 2009/0198794 A1 | 8/2009 | Beals | |
| 2009/0201917 A1 | 8/2009 | Maes et al. | |
| 2009/0210912 A1 | 8/2009 | Cholas et al. | |
| 2009/0216761 A1 | 8/2009 | Raichelgauz, II et al. | |
| 2009/0222316 A1 | 9/2009 | Boinepalli et al. | |
| 2009/0222853 A1* | 9/2009 | White | H04N 21/25891 725/34 |
| 2009/0225760 A1 | 9/2009 | Foti | |
| 2009/0235308 A1 | 9/2009 | Ehlers et al. | |
| 2009/0244291 A1 | 10/2009 | Saptharishi et al. | |
| 2009/0260030 A1* | 10/2009 | Karlsson | H04N 21/64315 725/32 |
| 2009/0299853 A1 | 12/2009 | Jones et al. | |
| 2009/0310668 A1 | 12/2009 | Sackstein et al. | |
| 2009/0313654 A1* | 12/2009 | Paila | H04L 67/20 725/32 |
| 2009/0319379 A1 | 12/2009 | Joao | |
| 2009/0320059 A1 | 12/2009 | Bolyukh | |
| 2009/0327346 A1* | 12/2009 | Teinila | G06Q 30/02 |
| 2009/0328113 A1* | 12/2009 | van de Klashorst | G06Q 30/0269 725/87 |
| 2010/0020683 A1 | 1/2010 | Gummalla et al. | |
| 2010/0023963 A1 | 1/2010 | Crookes et al. | |
| 2010/0030578 A1 | 2/2010 | Siddique et al. | |
| 2010/0070510 A1 | 3/2010 | Agarwal et al. | |
| 2010/0082440 A1* | 4/2010 | Vaidyanathan | G06Q 30/0271 705/14.72 |
| 2010/0083303 A1 | 4/2010 | Redei et al. | |
| 2010/0083329 A1 | 4/2010 | Joyce et al. | |
| 2010/0104015 A1 | 4/2010 | Chatterjee et al. | |
| 2010/0114696 A1 | 5/2010 | Yang | |
| 2010/0122285 A1* | 5/2010 | Begeja | H04N 21/6543 725/34 |
| 2010/0131973 A1 | 5/2010 | Dillon et al. | |
| 2010/0144340 A1 | 6/2010 | Sudak | |
| 2010/0153544 A1 | 6/2010 | Krassner et al. | |
| 2010/0153831 A1 | 6/2010 | Beaton | |
| 2010/0232355 A1 | 9/2010 | Richeson et al. | |
| 2010/0251289 A1* | 9/2010 | Agarwal | H04N 21/252 725/34 |
| 2010/0269128 A1* | 10/2010 | Gordon | H04N 21/23424 725/25 |
| 2010/0269132 A1 | 10/2010 | Foti | |
| 2010/0287609 A1 | 11/2010 | Gonzalez et al. | |
| 2010/0293047 A1 | 11/2010 | Schwarz et al. | |
| 2010/0293165 A1 | 11/2010 | Eldering et al. | |
| 2010/0293221 A1 | 11/2010 | Sidman | |
| 2010/0303022 A1 | 12/2010 | Maas et al. | |
| 2010/0313225 A1 | 12/2010 | Cholas et al. | |
| 2010/0333132 A1 | 12/2010 | Robertson et al. | |
| 2011/0106784 A1* | 5/2011 | Terheggen | G06F 16/438 707/706 |
| 2011/0128961 A1 | 6/2011 | Brooks et al. | |
| 2011/0158095 A1 | 6/2011 | Alexander et al. | |
| 2011/0179184 A1 | 7/2011 | Breau et al. | |
| 2011/0202270 A1* | 8/2011 | Sharma | G06Q 30/0241 701/533 |
| 2011/0211809 A1 | 9/2011 | Sikora et al. | |
| 2011/0264530 A1 | 10/2011 | Santangelo et al. | |
| 2011/0265116 A1 | 10/2011 | Stern et al. | |
| 2011/0299411 A1 | 12/2011 | Chen et al. | |
| 2012/0011567 A1 | 1/2012 | Cronk et al. | |
| 2012/0117584 A1* | 5/2012 | Gordon | H04N 21/4722 725/19 |
| 2012/0128241 A1 | 5/2012 | Jung | |
| 2012/0143660 A1 | 6/2012 | Jiwang et al. | |
| 2012/0230193 A1 | 9/2012 | Fang | |
| 2012/0310762 A1 | 12/2012 | Robbin et al. | |
| 2012/0324552 A1 | 12/2012 | Padala et al. | |
| 2013/0007799 A1* | 1/2013 | Sandoval | H04N 21/25883 725/32 |
| 2013/0120570 A1 | 5/2013 | Stanley et al. | |
| 2013/0166765 A1 | 6/2013 | Kaufman et al. | |
| 2013/0242812 A1 | 9/2013 | Khoryaev et al. | |
| 2013/0272575 A1 | 10/2013 | Li et al. | |
| 2013/0275557 A1 | 10/2013 | Myers et al. | |
| 2014/0010225 A1 | 1/2014 | Puregger | |
| 2014/0019635 A1 | 1/2014 | Reznik et al. | |
| 2014/0052696 A1 | 2/2014 | Soroushian | |
| 2014/0075466 A1* | 3/2014 | Zhao | G06Q 30/0249 725/23 |
| 2014/0105061 A1 | 4/2014 | Kannan | |
| 2014/0129351 A1 | 5/2014 | Ringdahl | |
| 2014/0129352 A1 | 5/2014 | Ringdahl | |
| 2014/0150014 A1 | 5/2014 | Aitken et al. | |
| 2014/0150019 A1 | 5/2014 | Ma et al. | |
| 2014/0282695 A1* | 9/2014 | Bakar | H04N 21/812 725/32 |
| 2014/0358678 A1 | 12/2014 | Raab et al. | |
| 2015/0019982 A1 | 1/2015 | Petitt, Jr. et al. | |
| 2015/0020126 A1 | 1/2015 | Kegel et al. | |
| 2015/0032533 A1 | 1/2015 | Raab et al. | |
| 2015/0032550 A1 | 1/2015 | Shah et al. | |
| 2015/0046938 A1 | 2/2015 | Qian et al. | |
| 2015/0094098 A1 | 4/2015 | Stern et al. | |
| 2015/0140981 A1 | 5/2015 | Balasaygun | |
| 2015/0304698 A1* | 10/2015 | Redol | G11B 27/10 725/23 |
| 2015/0382034 A1* | 12/2015 | Thangaraj | H04L 67/2828 709/231 |
| 2016/0055606 A1* | 2/2016 | Petrovic | G06T 1/0028 382/100 |
| 2016/0094893 A1* | 3/2016 | Tse | H04N 21/4516 725/32 |
| 2016/0105691 A1 | 4/2016 | Zucchetta | |
| 2016/0127260 A1 | 5/2016 | Gordon | |
| 2016/0127440 A1 | 5/2016 | Gordon | |
| 2016/0135230 A1 | 5/2016 | Swierczynski et al. | |
| 2016/0143005 A1 | 5/2016 | Ghosh et al. | |
| 2016/0182973 A1* | 6/2016 | Winograd | H04N 21/4722 725/25 |
| 2016/0226922 A1 | 8/2016 | Russell et al. | |
| 2016/0335659 A1 | 11/2016 | Lewis | |
| 2017/0039444 A1 | 2/2017 | Li et al. | |
| 2017/0070789 A1* | 3/2017 | Liassides | G06Q 30/02 |
| 2017/0339417 A1 | 11/2017 | Puri et al. | |
| 2018/0035174 A1* | 2/2018 | Littlejohn | H04N 21/4334 |
| 2018/0144194 A1 | 5/2018 | Park | |
| 2019/0095715 A1 | 3/2019 | Nunes et al. | |
| 2019/0251602 A1* | 8/2019 | Cormie | G06Q 30/0261 |
| 2019/0268392 A1* | 8/2019 | Santangelo | H04L 67/306 |
| 2019/0289263 A1 | 9/2019 | Amini et al. | |
| 2019/0356956 A1 | 11/2019 | Sheng et al. | |
| 2020/0059693 A1* | 2/2020 | Neumeier | H04N 21/4334 |
| 2020/0329260 A1* | 10/2020 | Mathur | H04N 21/25891 |
| 2021/0089782 A1 | 3/2021 | Weerasinghe et al. | |

FOREIGN PATENT DOCUMENTS

| | | |
|---|---|---|
| WO | WO-9935846 A1 | 7/1999 |
| WO | WO-0110125 A1 | 2/2001 |

OTHER PUBLICATIONS

What is Packet Switching on Computer Networks, about.com, Internet Archive Capture date of Feb. 12, 2009 from URL http://compnetworking.about.com/od/networkprotcols/f/packet-switch.htm.

Merriam-Webster, "mapping", 2020 (Year: 2020).

Bodzinga., et al., "Enhancing the IPTV Service Architecture to Enable Service Innovation," International Engineering Consortium, May 1, 2006.

(56) References Cited

OTHER PUBLICATIONS

Congdon P., et al., "IEEE 802.1 X Remote Authentication Dial-In User Service (RADIUS) Usage Guidelines," RFC 3580—IEEE 802.1X Remote Authentication Dial-In User Service, 2003, pp. 1-30.

David P.A., "The Beginnings and Prospective Ending of 'End-to-End': An Evolutionary Perspective On the Internet's Architecture," Stanford Institute for Economic Policy Research, Aug. 2001, 34 pages.

Dictionary, "Recording", 2021.

Dictionary, "Recorded", 2021.

Ford B., "Unmanaged Internet Protocol: Scalable Application-Friendly Internet Routing," Jul. 24, 2003, 6 pages.

McDevitt., et al., "Switched vs Broadcast Video for Fiber-To-The Home Systems", 1990, 11 pages.

Merriam-Webster, "apparatus", 2019 (Year: 2019).

Microsoft Computer Dictionary, "Device", Fifth edition, 2002.

Sadok D.H., et al., "Trends in Network and Device Composition," Topics in Internet echnology, IEEE Communications Magazine, Oct. 2006, pp. 112-118.

Wikipedia, "broadcast switched", 2015.

Wikipedia, "Client (computing)", 2020, 2 pages.

Wikipedia, "Content delivery network", 2015.

Wikipedia, "Hybrid fibre-coaxial", 2015, 1 page.

Wikipedia, "Packet switching", 2015, 1 page.

Ford B., "Unmanaged Internet Protocol: Taming the Edge Network Management Crisis," ACM SIGCOMM Computer Communications Review, vol. 34 (1), Jan. 2004, pp. 93-98.

Merriam Webster, "subscribe", 2015.

Chen Y.T., et al., "A Cascade of Feed-forward Classifiers for Fast Pedestrian Detection," Asian Conference on Computer Vision, 2007, Part 1, pp. 905-914.

Viola P., et al., "Rapid Object Detection using a Boosted Cascade of Simple Features," IEEE, 2001, 9 pages.

\* cited by examiner

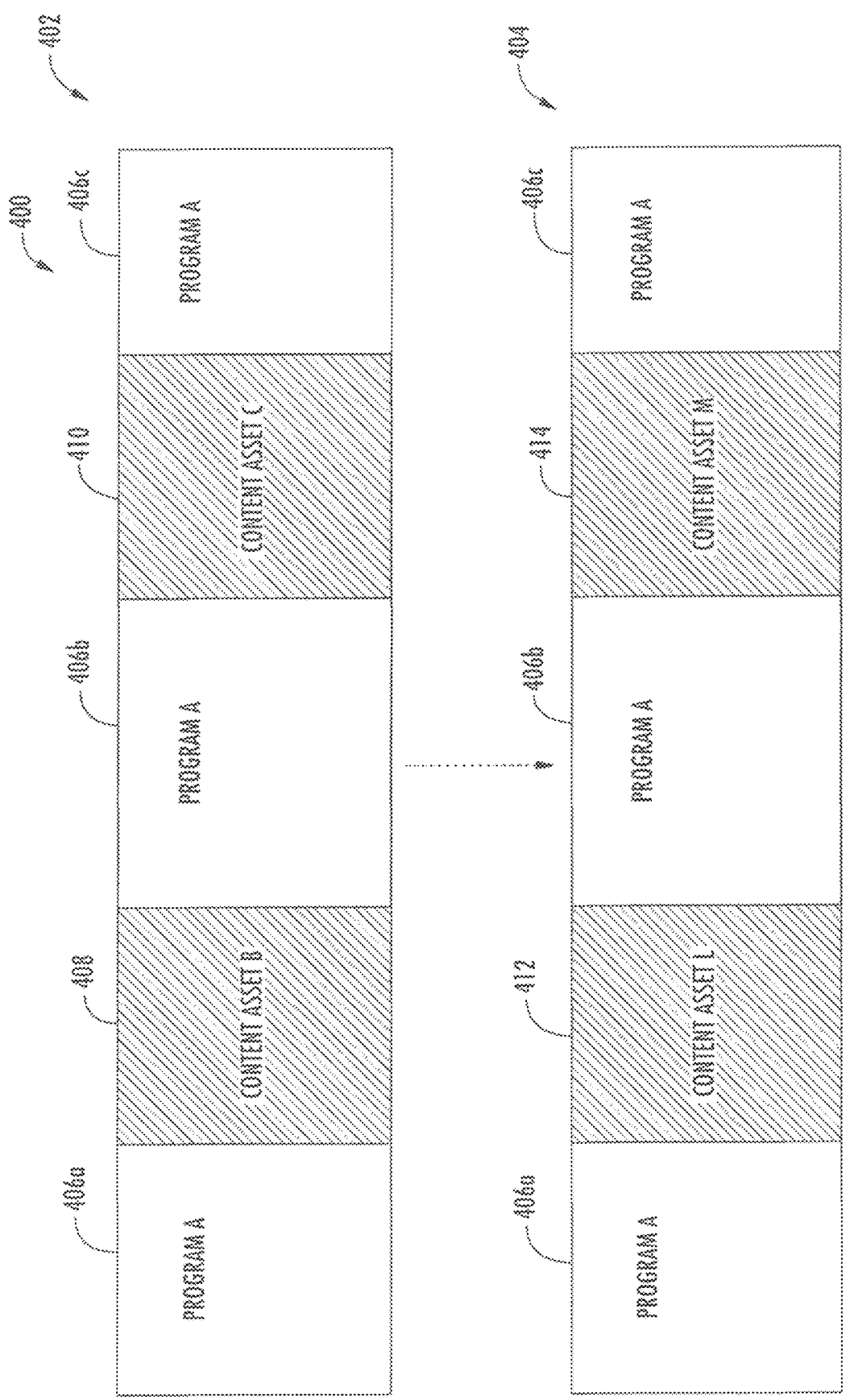

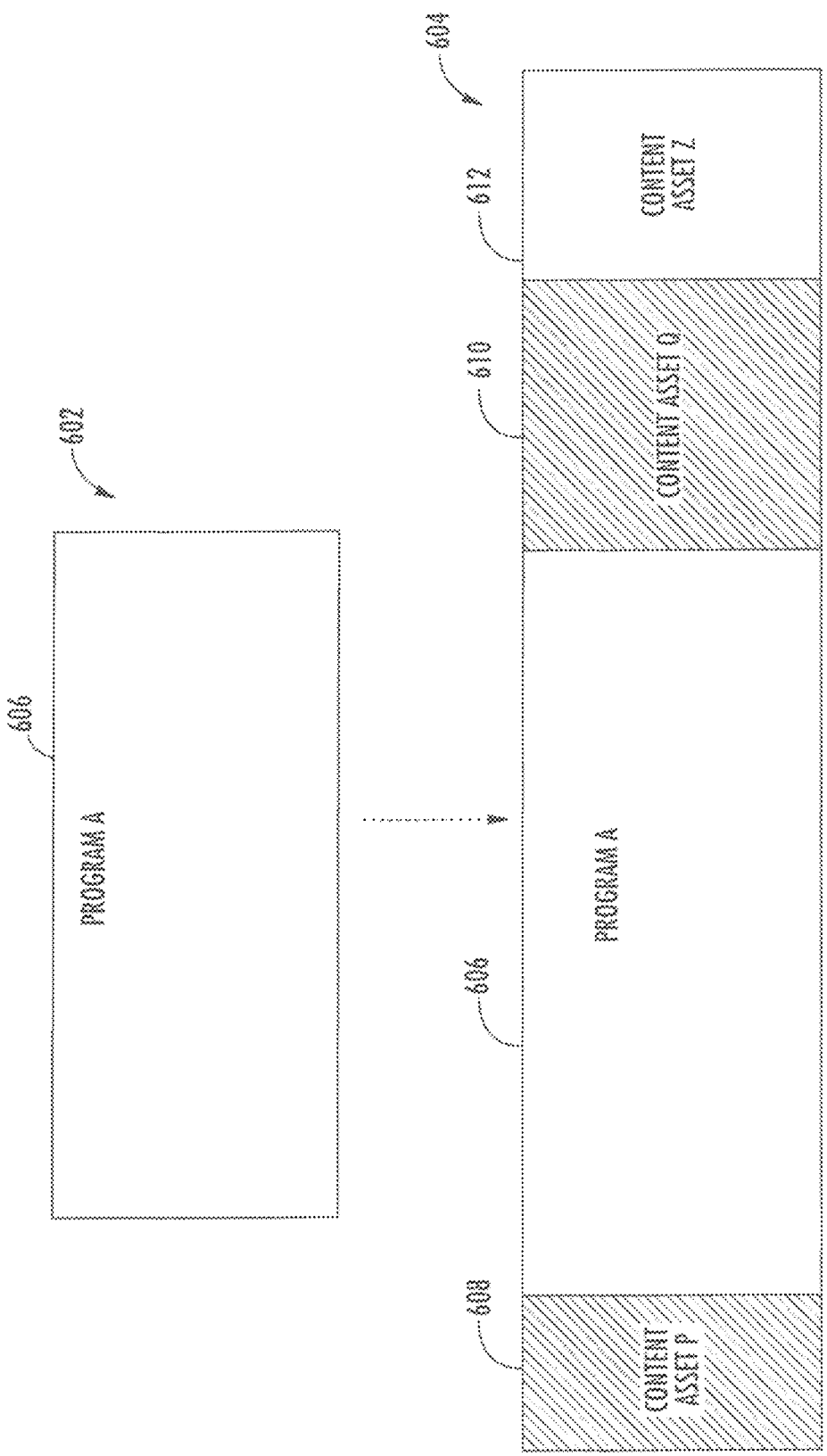

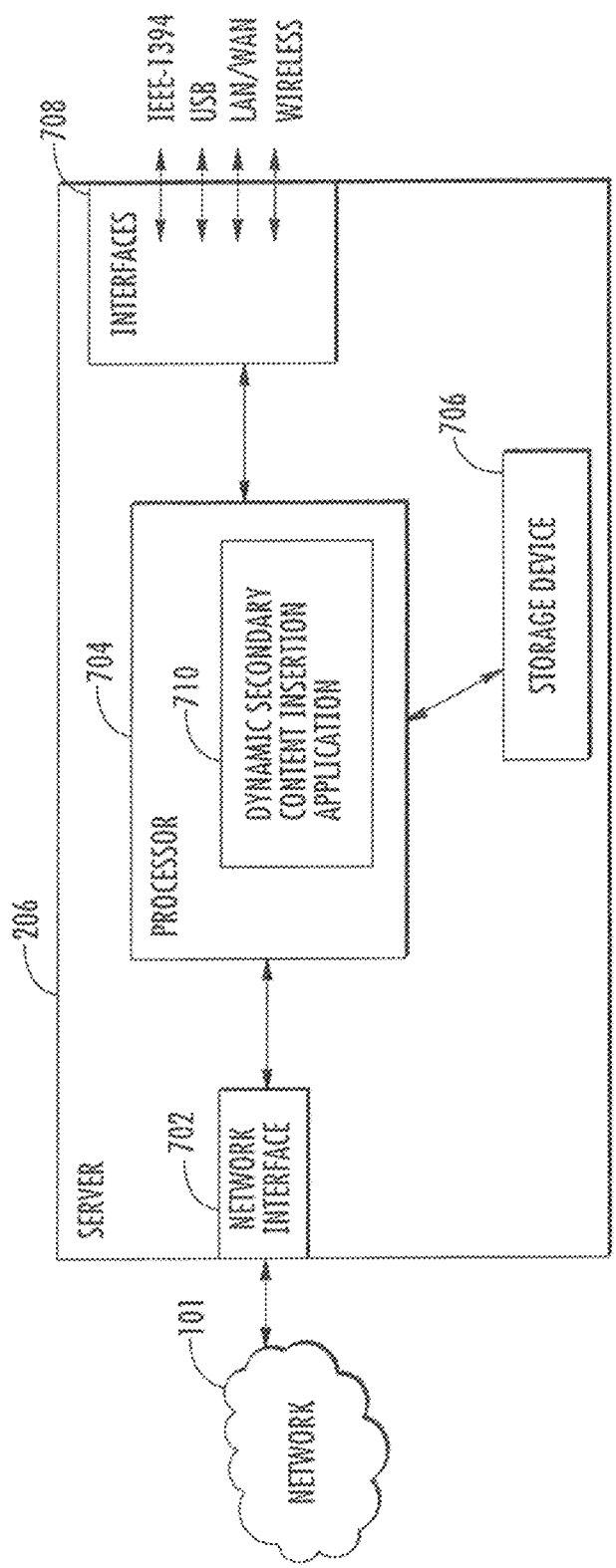

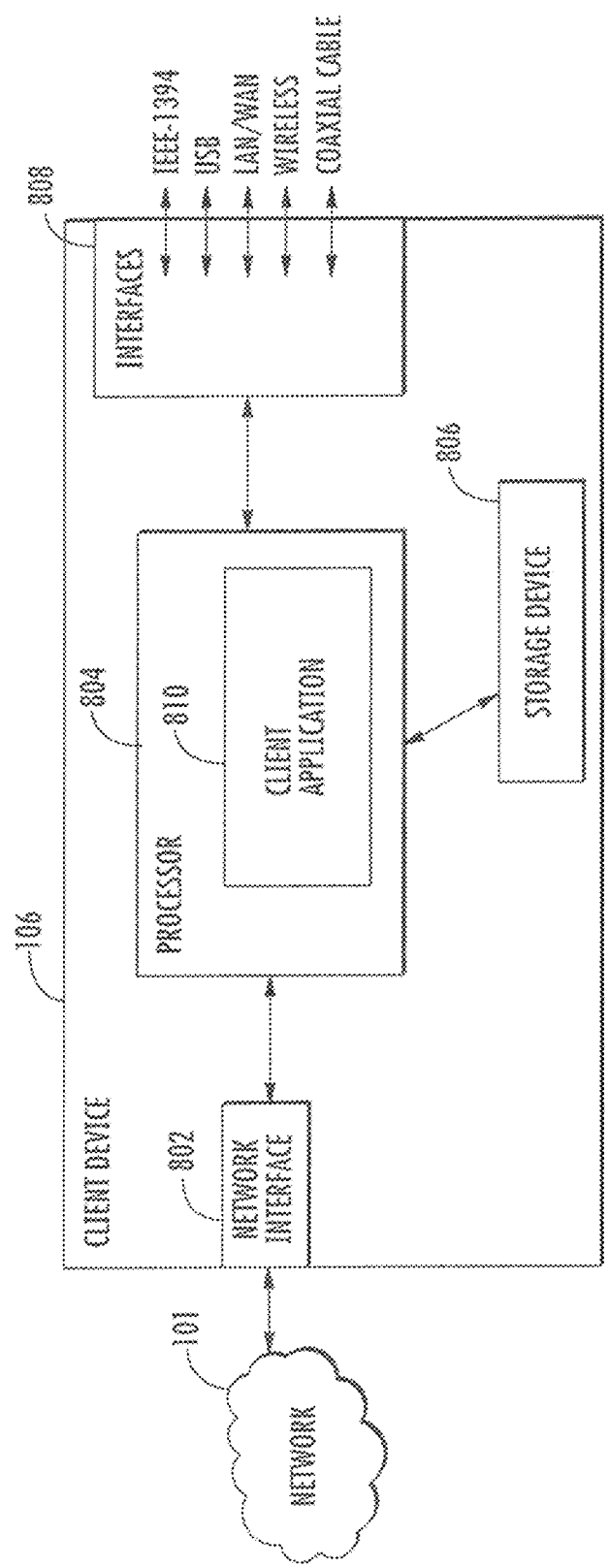

APPARATUS AND METHODS FOR DYNAMIC SECONDARY CONTENT AND DATA INSERTION AND DELIVERY

PRIORITY AND RELATED APPLICATIONS

This application is a divisional of and claims priority to co-owned and co-pending U.S. patent application Ser. No. 12/766,433 of the same title filed on Apr. 23, 2010, which is incorporated herein by reference in its entirety. Additionally, application is related to co-owned U.S. patent application Ser. No. 12/536,724 filed on Aug. 6, 2009 and entitled "SYSTEM AND METHOD FOR MANAGING ENTITLEMENTS TO DATA OVER A NETWORK," which issued as U.S. Pat. No. 8,341,242 on Dec. 25, 2012, and to co-owned U.S. Provisional Application Ser. No. 61/256,903 filed on Oct. 30, 2009 and entitled "METHODS AND APPARATUS FOR PACKETIZED CONTENT DELIVERY OVER A CONTENT DELIVERY NETWORK," each of which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of content and/or data delivery over a network. More particularly, the present invention is related in one exemplary aspect to apparatus and methods for the selection and insertion of secondary content.

2. Description of Related Technology

In the context of network services, it is often highly desirable to provide users of the network with ready and instant access to a variety of different types of content, accessible at different locations, and on different platforms. In many cases, it is also desirable to provide the same user with "secondary" content (such as e.g., advertisements, promotions or "info-mercials", related shorts, telescoping information/advertisements, etc.). The secondary content may be directly or indirectly related to the "primary" content which the user selected in the first place (such as via a common theme or context, common persons of interest, common demographic factors, etc.), or can be totally unrelated.

Secondary content insertion may comprise a major source of revenue for commercial television distributors, and for the network operator. For example, where the secondary content comprises advertisements, it may be a main source of income for national television broadcasters and their local over-the-air affiliates. Cable, satellite, and other content distribution networks, as well as Internet content providers, also derive income from the sale of advertising time.

Hence, an advertiser may seek to maximize the return on their advertising investment by targeting specific subscribers which are likely to be most receptive to the commercial message embodied in the advertisements. One of the most widespread and simplest ways of targeting viewers involves identifying what types of viewers generally watch specific television programs. For example, it may be found that sports programming is overwhelmingly viewed by men ages 18-32; if it is also true that this segment of the population includes a number of persons who are likely to purchase automobiles, an advertiser may take advantage of this information and provide automobile advertisements during e.g., football games, or advertisements logically coupling the two topics (e.g., an automobile advertisement involving a well recognized sports figure).

Another method of targeting specific viewers involves selecting advertisements based on a geographical region in which the advertisement is to be broadcast. In other words, it is advantageous to provide certain advertising content to viewers in one local or regional area which is different than that provided to the viewers in a different local or regional area. For example, the advertisements may be limited by the geographic area in which the business operates. Hence, it would typically only make financial sense for an advertisement for that business to be provided in geographical areas where the business is operated.

Currently, the aforementioned mechanisms are limited with respect to providing secondary content insertion into programming, such as that requested "on demand". Examples of on-demand content include e.g., video on-demand or VOD, subscription video-on-demand (SVOD), which gives customers on-demand access to the content for a flat monthly fee, free video-on-demand (FVOD), which gives customers free on-demand access to some content, and movies on-demand (MOD), which provides on-demand access to movie content only.

The aforementioned on-demand services may be provided to customers without secondary content inserted therein, or having secondary content which is not targeted or applicable to all viewers. In the first instance, prior art approaches fail to provide an effective mechanism for the insertion of secondary content into on-demand (or other content such as previously recorded content) that did not originally have secondary content inserted therein.

With respect to the second instance, on-demand (or other content) having secondary content inserted therein under the prior art approaches may only be provided to customers "as is". For example, under the previous methods, when content is recorded the secondary content therein cannot be easily modified to be targeted to a subsequent group of viewers or updated to insert more temporally relevant content.

Just as different varieties of VOD service offerings have evolved over time, several different network architectures have also evolved for deploying these services. These architectures range from fully centralized (e.g., VOD servers at a central location) to fully distributed (e.g., multiple copies of content distributed on servers or other "edge" devices very close to customer premises), as well as various other network architectures enabling distribution of on-demand (and other) content to devices outside the traditional home network. Since most cable television networks today consist of optical fiber towards the "core" of the network which are connected to coaxial cable or copper wire networks towards the edge, VOD transmission network architectures also consist of a mixture of optical fiber and coaxial/wire portions. As these technologies emerge, there has been a noticeable lag in the ability of the network operator to ensure the content delivered to the remote devices also includes secondary content targeted to these subscribers, their locations, and/or to the capabilities of the requesting devices.

Hence, apparatus and methods for providing primary content having secondary content inserted therein to a plurality of users are desired. Ideally, these apparatus and methods would be monitored and controlled by various management entities of the network, and may be used to provide content to users no matter where they are located (and regardless of their hardware/software context). Efficient delivery of the primary and secondary content is also desired. Secondary content insertion which targets the user, the device, and/or is related to the context of the primary content, would also ideally be provided.

SUMMARY OF THE INVENTION

The present invention addresses the foregoing needs by disclosing apparatus and methods for the selection and insertion of secondary content.

In a first aspect of the invention, a method for providing targeted secondary content to a subscriber of a content-delivery network is disclosed. In one embodiment, the method comprises: receiving a request for on-demand content from the subscriber; determining whether the subscriber is entitled to receive the requested on-demand content. If the subscriber is entitled to receive the requested content: evaluating the requested on-demand content to identify an insertion opportunity; identifying at least one secondary content element targeted to the insertion opportunity; inserting the at least one secondary content element into the requested on-demand content at the opportunity; and delivering the on-demand content and the at least one secondary content element inserted therein via an on-demand session.

In a second aspect of the invention, a method for providing on-demand content to a personal mobile device (PMD) is disclosed. In one embodiment, the method comprises: providing a listing of a plurality of available on-demand content to the PMD; receiving a request for a selected one of the available on-demand content from the PMD, the request including information identifying the PMD and information identifying the selected content; and identifying, based at least in part on the information identifying the PMD, one or more secondary content elements for insertion into the selected one of the plurality of on-demand content; wherein the on-demand content comprises content not originally intended to have secondary content inserted therein.

In a third aspect of the invention, apparatus configured to deliver content to a plurality of user devices of a content delivery network is disclosed. In one embodiment, the apparatus comprises: at least one interface for receiving a plurality of primary and secondary content; a storage apparatus configured to at least temporarily store the plurality of primary and secondary content; at least one interface for transmitting selected ones of the plurality of primary and secondary content to the plurality of user devices; and a processor, the processor configured to run at least one computer program thereon. The computer program is configured to: receive a request for an individual one of the plurality of primary content from at least one of the plurality of user devices; select one or more of the plurality of secondary content for insertion into the individual one of the primary content; and cause transmission of the selected one or more of the plurality of secondary content and the individual one of the plurality of primary content in a substantially coordinated fashion.

In a fourth aspect of the invention, a method of opportunistically providing contextually relevant advertising content along with requested primary content over a content delivery network is disclosed. In one embodiment, the method comprises: receiving a request from a user of the network for the primary content; determining context-specific information relating to the user based at least in part on the request; identifying at least one advertising content element based at least in part on the context-specific information; transmitting at least a portion of the requested primary content to the user; dynamically identifying an insertion opportunity within the requested primary content for the at least one advertising content element; and delivering the at least one advertising content element to the user at the identified insertion opportunity.

In a fifth aspect of the invention, a method for providing on-demand content to a client device via a content delivery network is disclosed. In one embodiment, the method comprises: receiving a plurality of primary and secondary content at an entity of a local service node of the network, the local service node servicing requests from a plurality of client device in communication therewith; receiving a request for a selected one of the plurality of primary content from at least one of the plurality of client devices serviced by the local service node; inserting one or more of the secondary content into the selected one of the plurality of primary content; and transmitting the selected one of the plurality of primary content having the one or more secondary content inserted therein to the at least one of the plurality of client devices. The plurality of secondary content comprises content specifically targeted, based at least in part on information obtained from the local service node, to the one or more of the plurality of client devices serviced by the node.

In a sixth aspect of the invention, an on-demand network apparatus configured to deliver on-demand content to a plurality of subscribers to a content delivery network is disclosed. In one embodiment, the apparatus comprises: at least one interface for receiving a plurality of on-demand content; at least one interface for receiving a plurality of advertisement content; a storage apparatus configured to store the plurality of on-demand content and the plurality of advertisement content; apparatus configured to establish an on-demand session to transmit at least portions of the plurality of on-demand content and the plurality of advertisement content to the plurality of subscribers; and a processor, the processor in data communication with the storage apparatus and configured to run at least one computer program thereon. The computer program is configured to: receive a request for an individual one of the plurality of on-demand content from a client device associated with at least one of the plurality of subscribers; utilize information regarding at least one of (i) the client device, and/or (ii) the at least one of the plurality of subscribers, in order to dynamically select one or more of the plurality of advertisement content for insertion; insert the selected one or more of the plurality of advertisement content into the individual one of the plurality of on-demand content; and cause transmission of the individual one of the plurality of on-demand content having the one or more of the plurality of advertisement content inserted therein.

In a seventh aspect of the invention, methods for content insertion via (i) replacement of extant content; (ii) fill of unfilled placement opportunities, and/or (iii) addition of content, are described.

In an eight aspect of the invention, a business and operation "rules" engine is disclosed. In one embodiment, the engine comprises one or more computer programs adapted to control various aspects of secondary content selection and insertion so as to achieve desired business or operation goals (or obey certain rules).

These and other aspects of the invention shall become apparent when considered in light of the disclosure provided herein.

BRIEF DESCRIPTION OF THE DRAWINGS

FIG. 4 is graphical representation illustrating one embodiment of a "replacement" model for providing secondary content insertion according to the present invention.

FIG. 6 is graphical representation illustrating one embodiment of an "additive" model for providing secondary content insertion according to the present invention.

FIG. 7 is a functional block diagram illustrating an exemplary content server apparatus for use with the present invention.

FIG. 8 is a functional block diagram illustrating an exemplary client device for use with the present invention.

DETAILED DESCRIPTION OF THE INVENTION

Figure 1:
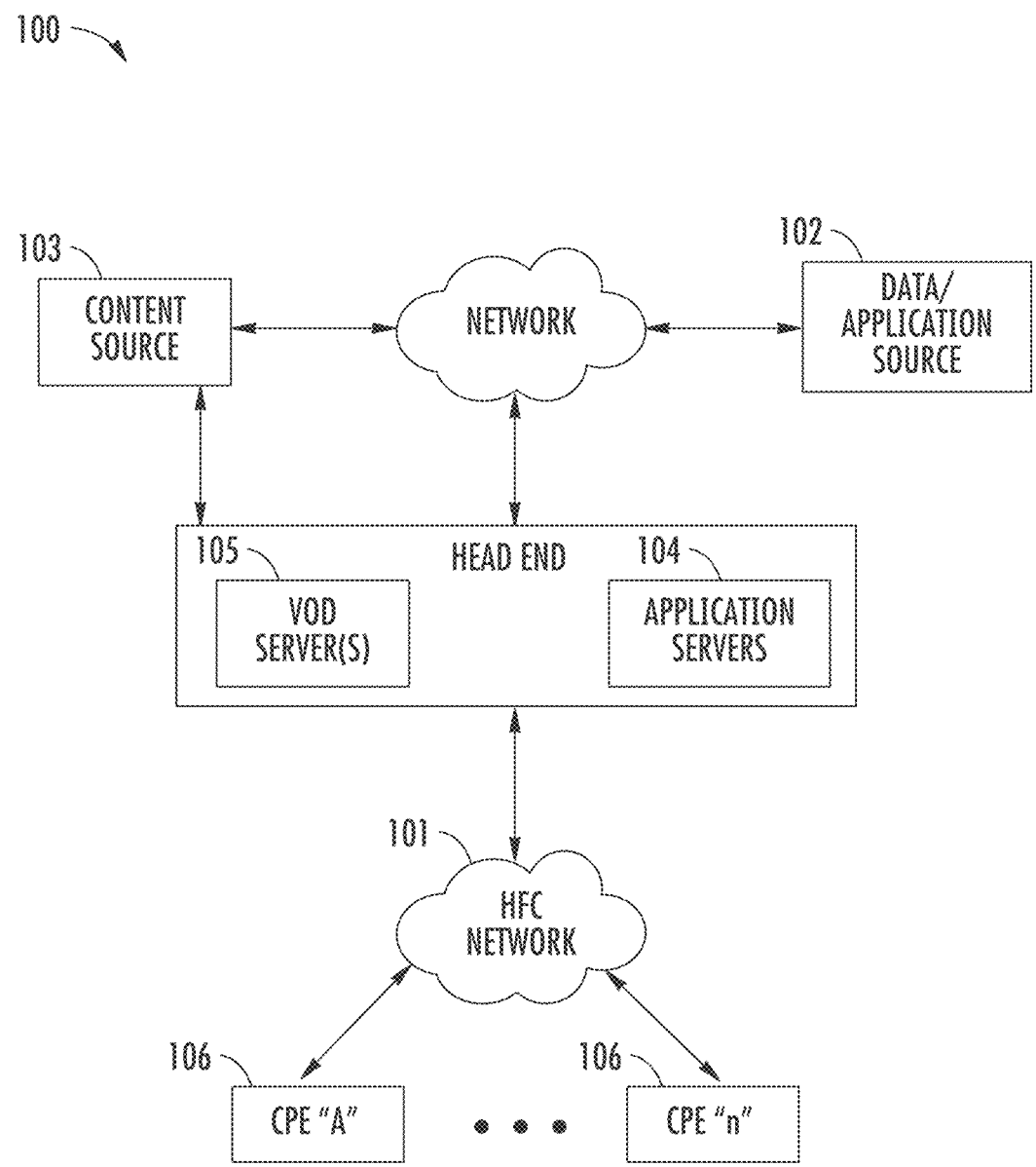
FIG. 1 is a functional block diagram illustrating an exemplary hybrid fiber network configuration useful with the present invention.

Reference is now made to the drawings wherein like numerals refer to like parts throughout.

As used herein, the term "application" refers generally to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could comprise a downloadable Java Xlet™ that runs within the JavaTV™ environment.

As used herein, the terms "client device" and "end user device" include, but are not limited to, set-top boxes (e.g., DSTBs), personal computers (PCs), and minicomputers, whether desktop, laptop, or otherwise, and mobile devices such as handheld computers, PDAs, personal media devices (PMDs), and smartphones.

As used herein, the term "codec" refers to a video, audio, or other data coding and/or decoding algorithm, process or apparatus including, without limitation, those of the MPEG (e.g., MPEG-1, MPEG-2, MPEG-4, etc.), Real (RealVideo, etc.), AC-3 (audio), DiVX, XViD/ViDX, Windows Media Video (e.g., WMV 7, 8, or 9), ATI Video codec, or VC-1 (SMPTE standard 421M) families.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

As used herein, the term "conditional access" refers to any access control scheme, whether implemented in hardware, software, or firmware (or combinations thereof), including without limitation members of the "Powerkey" family (Powerkey Book 2, Powerkey Book 3, etc.), NDS (including VideoGuard, mVideoGuard, etc.), ANSI/SCTE Standard 52 2003 (DVS-042), incorporated herein by reference in its entirety, and Motorola/General Instrument DigiCipher® family (DigiCipher II, etc.). These can be implemented using, for example, the so-called "CableCard" plug-in security module access technology, a downloadable CA system (DCAS), or otherwise.

The terms "Customer Premises Equipment (CPE)" and "host device" refer to any type of electronic equipment located within a customer's or user's premises and connected to a network. The term "host device" refers generally to a terminal device that has access to digital television content via a satellite, cable, or terrestrial network. The host device functionality may be integrated into a digital television (DTV) set. The term "customer premises equipment" (CPE) includes such electronic equipment such as set-top boxes (e.g., DSTBs), televisions, cable modems (CMs), embedded multimedia terminal adapters (eMTAs), whether stand-alone or integrated with other devices, Digital Video Recorders (DVR), gateway storage devices (Furnace), and ITV Personal Computers.

As used herein, the term "display" means any type of device adapted to display information, including without limitation CRTs, LCDs, TFTs, plasma displays, LEDs, incandescent and fluorescent devices. Display devices may also include less dynamic devices such as, for example, printers, e-ink devices, and the like.

As used herein, the term "DOCSIS" refers to any of the existing or planned variants of the Data Over Cable Services Interface Specification, including for example DOCSIS versions 1.0, 1.1, 2.0 and 3.0. DOCSIS (version 1.0) is a standard and protocol for internet access using a "digital" cable network.

As used herein, the term "headend" refers generally to a networked system controlled by an operator (e.g., an MSO) that distributes programming to MSO clientele using client devices. Such programming may include literally any information source/receiver including, inter alia, free-to-air TV channels, pay TV channels, interactive TV, and the Internet.

As used herein, the terms "Internet" and "internet" are used interchangeably to refer to inter-networks including, without limitation, the Internet.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, and application-specific integrated circuits (ASICs). Such digital processors may be contained on a single unitary IC die, or distributed across multiple components. As used herein, the terms "MSO" or "multiple systems operator" refer to a cable, satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, H.323, etc.).

As used herein, the term "network interface" refers to any signal or data interface with a component or network including, without limitation, those of the FireWire (e.g., FW400, FW800, etc.), USB (e.g., USB2), Ethernet (e.g., 10/100, 10/100/1000 (Gigabit Ethernet), 10-Gig-E, etc.), MoCA, Serial ATA (e.g., SATA, e-SATA, SATAII), Ultra-ATA/DMA, Coaxsys (e.g., TVnet™), radio frequency tuner (e.g., in-band or OOB, cable modem, etc.), Wi-Fi (802.11a,b,g,n), WiMAX (802.16), PAN (e.g., 802.15), or IrDA families.

As used herein, the term "QAM" refers to modulation schemes used for sending signals over cable networks. Such modulation scheme might use any constellation level (e.g. QPSK, 16-QAM, 64-QAM, 256-QAM, etc.) depending on details of a cable network. A QAM may also refer to a physical channel modulated according to the schemes.

As used herein, the term "server" refers to any computerized component, system or entity regardless of form which is adapted to provide data, files, applications, content, or other services to one or more other devices or entities on a computer network.

As used herein, the term "storage device" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the term "Wi-Fi" refers to, without limitation, any of the variants of IEEE-Std. 802.11 or related standards including 802.11 a/b/g/n/v.

As used herein, the term "wireless" means any wireless signal, data, communication, or other interface including without limitation Wi-Fi, Bluetooth, 3G, HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, analog cellular, CDPD, satellite systems, millimeter wave or microwave systems, acoustic, and infrared (i.e., IrDA).

Overview

The present invention discloses, inter alia, methods and apparatus for providing primary content to network users, the primary content having secondary content (e.g., targeted advertisements or promotions, info-mercials, telescoping advertisements, etc.) inserted therein, or otherwise associated therewith.

In one exemplary aspect, a network operator's on-demand product portfolio (e.g., single selection/purchase VOD, SVOD, FVOD, etc.) is leveraged as a platform for multiple different types of targeted secondary content insertion, offered as placement opportunities to prospective or existing advertisers. This approach also advantageously provides the opportunity for generating a new revenue stream for the network operator by creating placement opportunities where none existed before.

In one variant, an "upfront" secondary content insertion model is provided, which takes advantage of non-advertising supported on-demand platforms (e.g., FVOD, NDVR, etc.) to provide placement opportunities to advertisers before the start of the primary content event. This approach is also extensible to general VOD paradigms, such as with a subscriber opt-in.

In another variant, a "pause" secondary content insertion model is utilized which provides a dynamic placement opportunity for additional secondary content (e.g., advertising) when the subscriber returns to an on-demand content element (e.g., FVOD, Startover, Lookback, or NDVR content element) already being viewed, after having been paused for a time. Other variants for stopped content, and content played to completion, are also described.

In another aspect of the invention, a "network promotion" product or model is disclosed which allows clients of an MSO (e.g., studios, networks, advertisers, etc.) to utilize the foregoing upfront and/or pause tools to specifically target advertising or other secondary content based on the characteristics of the subscriber and/or the particular on-demand asset being viewed.

In one implementation of the foregoing, a content and data distribution network comprising primary content sources and secondary content sources, at least one content server, and management entities which cooperate to provide content (including secondary content) to various CPE and portable media devices (PMD) in communication with the network (including via a non-MSO network) is utilized. Various management entities are given which cooperate to provide VOD content having advertising or other secondary content inserted therein to the CPE and PMD. The inserted secondary content may include for example targeted advertisements, multimedia applications, interactive programming, scheduled programming (e.g., "live") content, etc. The primary content may include for instance long form content (i.e., content into which secondary content has not yet been inserted) or short form content (i.e., content having secondary content inserted therein).

In another embodiment, viewing patterns of the CPE are monitored at the headend of the network and the selection of secondary content is based in part on the monitored viewing patterns. Secondary content insertion is further managed in one variant by a "campaign manager", in accordance with various business rules.

In another embodiment, the apparatus is configured so that all of the available primary and secondary content may be pushed to the edge of the network if desired, in order to facilitate more efficient transmission thereof to the client. In addition, the content may be pushed to edge devices (such as local service nodes) based on the applicability of the content to the group of devices serviced by the edge device (e.g., the service group associated with the node), thereby making content which is specific to a certain group of users available to the server or node which services these users.

Several methods are discussed for the insertion of secondary content including e.g., a replacement model, a fill model and an additive model for content insertion. According to one implementation of the replacement model, one or more segments of secondary content are used to replace one or more segments of secondary content currently resident within a primary content element. For example, the segments may be replaced "one-for-one", "one-for-N", or "N-for-one".

The fill model is used to insert secondary content into primary content which does not otherwise have secondary content inserted therein, and/or may be used to increase the frequency of inserted secondary content therein.

Lastly, the additive model is used to insert secondary content in a non-disruptive fashion into primary content which does not otherwise have secondary content inserted therein, and/or non-disruptively increase the frequency of inserted secondary content. In one example, the fill model may insert secondary content according to user-initiated interruptions, thereby appearing non-disruptive to the viewer.

The foregoing secondary content insertion models may be utilized for example to replace secondary content targeted to a particular geographic area designated by a network operator (a so-called "advertisement zone") with: (i) secondary content targeted to another (different) advertisement zone, (ii) national advertisements, and/or (iii) more specifically targeted advertisements (discussed below). These models may further be advantageously used to replace secondary content so that a given user will receive the same secondary content no matter the device, location, or network/device context from which the request originates. For example, a user request originating from a mobile device for content to be delivered from an IP network will receive the exact same secondary content which that user would receive if the request had originated from the user's CPE (e.g., STB) at home.

In one variant, a client application is run on the microprocessor of the CPE to facilitate the secondary content insertion of the invention by providing information regarding the subscriber/user (and/or device) to headend entities charged with inserting secondary content (e.g., the management entities discussed above). For example, the client application may provide subscriber, account, or other information upstream in order for the insertion entities to identify the subscriber, and provide content based on what is known about that particular subscriber. In addition, the client application may be configured to collect information regarding the user's actions with respect to content. For example, the client application may log or record button presses, playback events, power up/down events, trick mode events, etc., and pass this information to the headend entities.

In yet another embodiment, the aforementioned headend entities charged with inserting secondary content may provide the playlist of available secondary content, and/or the secondary content itself, directly to the CPE for storage thereon. The client application in this embodiment dynamically causes insertion of the provided secondary content. A proxy store (e.g., network store, web server, etc.) may also provide the secondary content directly to the CPE.

DETAILED DESCRIPTION OF EXEMPLARY EMBODIMENTS

Exemplary embodiments of the apparatus and methods of the present invention are now described in detail. While these exemplary embodiments are described in the context of the aforementioned hybrid fiber coax (HFC) cable system or satellite network architecture having an multiple systems operator (MSO), digital networking capability, IP delivery capability, and plurality of client devices/CPE, the general principles and advantages of the invention may be extended to other types of networks and architectures, whether broadband, narrowband, wired or wireless, or otherwise, the following therefore being merely exemplary in nature. For instance, the invention may be adapted for use on so-called hybrid fiber copper (HFCu) networks, or WiMAX (IEEE Std. 802.16) wireless networks.

It will also be appreciated that while described generally in the context of a consumer (i.e., home) end user domain, the present invention may be readily adapted to other types of environments (e.g., commercial/enterprise, government/military, etc.) as well. Myriad other applications are possible.

It is further noted that while described primarily in the context of a cable system with 6 MHz RF channels, the present invention is applicable to literally any network topology or paradigm, and any frequency/bandwidth, such as for example 8 MHz channels. Furthermore, as referenced above, the invention is in no way limited to traditional cable system frequencies (i.e., below 1 GHz), and in fact may be used with systems that operate above 1 GHz band in center frequency or bandwidth, to include without limitation so-called ultra-wideband systems.

Also, while certain aspects are described primarily in the context of the well-known Internet Protocol (described in, inter alia, RFC 791 and 2460) and Session Initiation Protocol (SIP), it will be appreciated that the present invention may utilize other types of protocols (and in fact bearer networks to include other intranets and intranets) to implement the described functionality.

Moreover, while many aspects of the invention are described within the context of traditional "on demand" services provided over e.g., a cable, satellite, of HFCu network (e.g., FVOD, SVOD, MOD, etc.), it will be appreciated that the concepts and apparatus described herein are readily extensible to other content delivery paradigms which provide content "on demand", including without limitation: (i) "pay per view"; (ii) content rental or purchase via mail or other tangible delivery platform (e.g., the prior art "Netflix®" service); and (iii) selection of a video for play via the Internet, such as via the "YouTube®" website. See the discussion regarding alternate on-demand delivery paradigms provided subsequently herein.

Other features and advantages of the present invention will immediately be recognized by persons of ordinary skill in the art with reference to the attached drawings and detailed description of exemplary embodiments as given below.

Network—

FIG. 1 illustrates a typical content delivery network configuration with which the apparatus and methods of the present invention may be used. The various components of the network 100 include (i) one or more data and application origination points 102; (ii) one or more content sources 103, (iii) one or more application distribution servers 104; (iv) one or more VOD servers 105, and (v) customer premises equipment (CPE) 106. The distribution server(s) 104, VOD servers 105 and CPE(s) 106 are connected via a bearer (e.g., HFC) network 101. A simple architecture comprising one of each of the aforementioned components 102, 104, 105, 106 is shown in FIG. 1 for simplicity, although it will be recognized that comparable architectures with multiple origination points, distribution servers, VOD servers, and/or CPE devices (as well as different network topologies) may be utilized consistent with the invention. For example, the headend architecture of FIG. 1a (described in greater detail below) may be used.

The data/application origination point 102 comprises any medium that allows data and/or applications (such as a VOD-based or "Watch TV" application) to be transferred to a distribution server 104. This can include for example a third party data source, application vendor website, CD-ROM, external network interface, mass storage device (e.g., RAID system), etc. Such transference may be automatic, initiated upon the occurrence of one or more specified events (such as the receipt of a request packet or ACK), performed manually, or accomplished in any number of other modes readily recognized by those of ordinary skill.

The application distribution server 104 comprises a computer system where such applications can enter the network system. Distribution servers are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other locations, whether local or remote to the distribution server 104) that can be accessed by a distribution server 104.

Figure 1A:
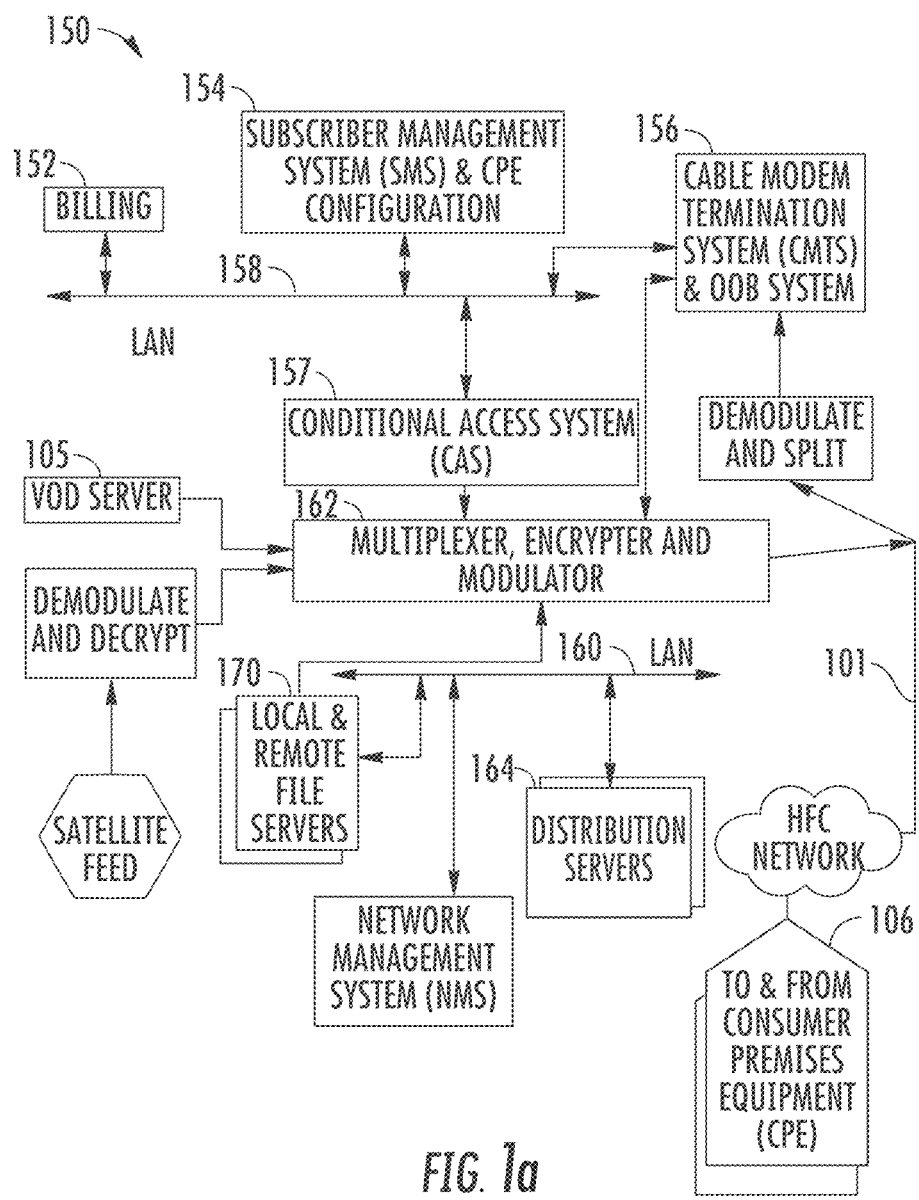
FIG. 1a is a functional block diagram illustrating one exemplary network headend configuration useful with the present invention.

Referring now to FIG. 1a, one exemplary embodiment of a headend architecture useful with the present invention is described. As shown in FIG. 1a, the headend architecture 150 comprises typical headend components and services including billing module 152, subscriber management system (SMS) and CPE configuration management module 154, cable-modem termination system (CMTS) and OOB system 156, as well as LAN(s) 158, 160 placing the various components in data communication with one another. It will be appreciated that while a bar or bus LAN topology is illustrated, any number of other arrangements as previously referenced (e.g., ring, star, etc.) may be used consistent with the invention. It will also be appreciated that the headend configuration depicted in FIG. 1a is high-level, conceptual architecture and that each MSO may have multiple headends deployed using custom architectures.

Figure 1B:
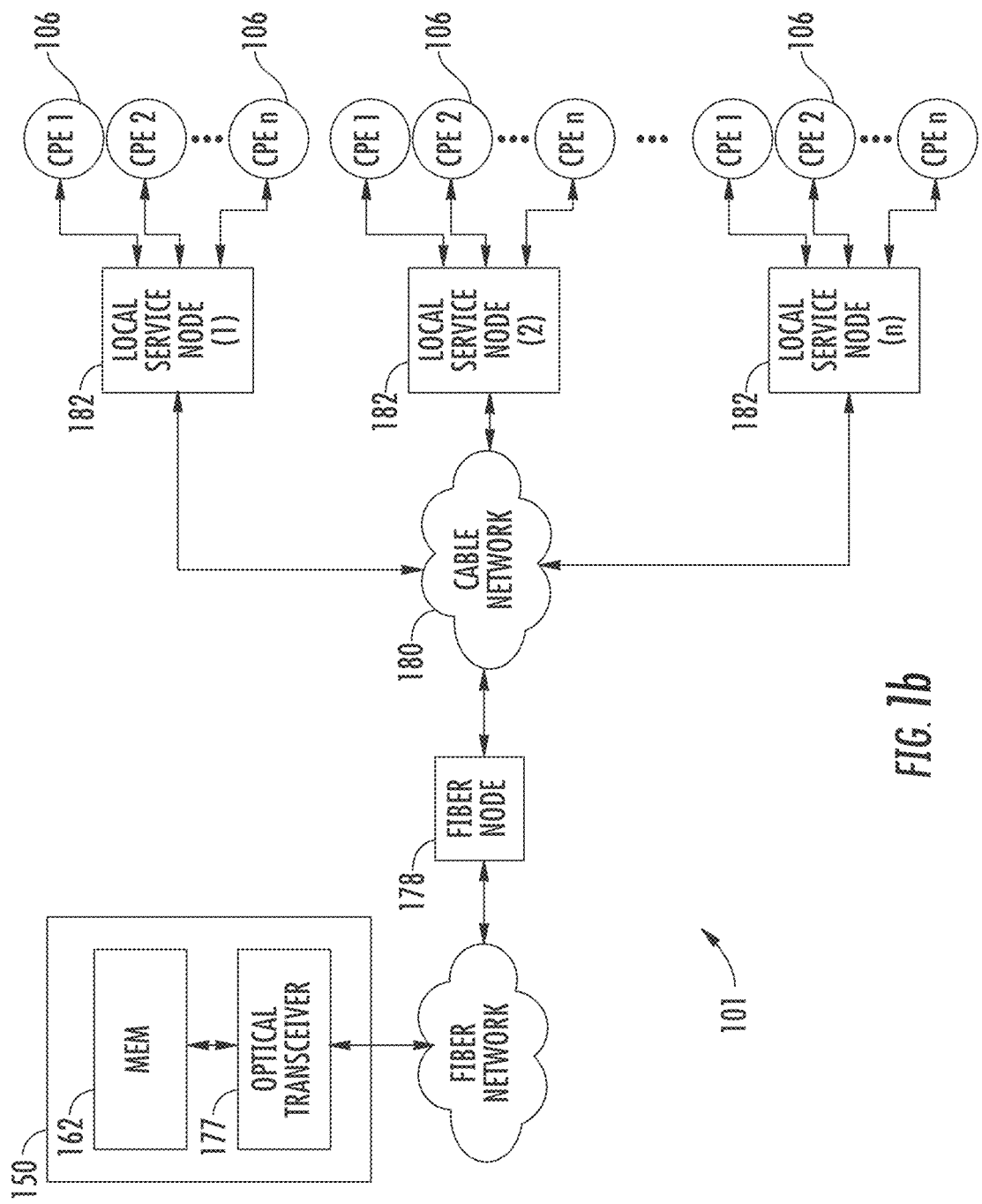
FIG. 1b is a functional block diagram illustrating one exemplary local service node configuration useful with the present invention.

The exemplary architecture 150 of FIG. 1a further includes a multiplexer-encrypter-modulator (MEM) 162 coupled to the HFC network 101 adapted to process or condition content for transmission over the network. The distribution servers 164 are coupled to the LAN 160, which provides access to the MEM 162 and network 101 via one or more file servers 170. The VOD servers 105 are coupled to the LAN 160 as well, although other architectures may be employed (such as for example where the VOD servers are associated with a core switching device such as an 802.3z Gigabit Ethernet device). As previously described, information is carried across multiple channels. Thus, the headend must be adapted to acquire the information for the carried channels from various sources. Typically, the channels being delivered from the headend 150 to the CPE 106 ("downstream") are multiplexed together in the headend, as previously described and sent to neighborhood hubs (FIG. 1b) via a variety of interposed network components.

Figure 1C:
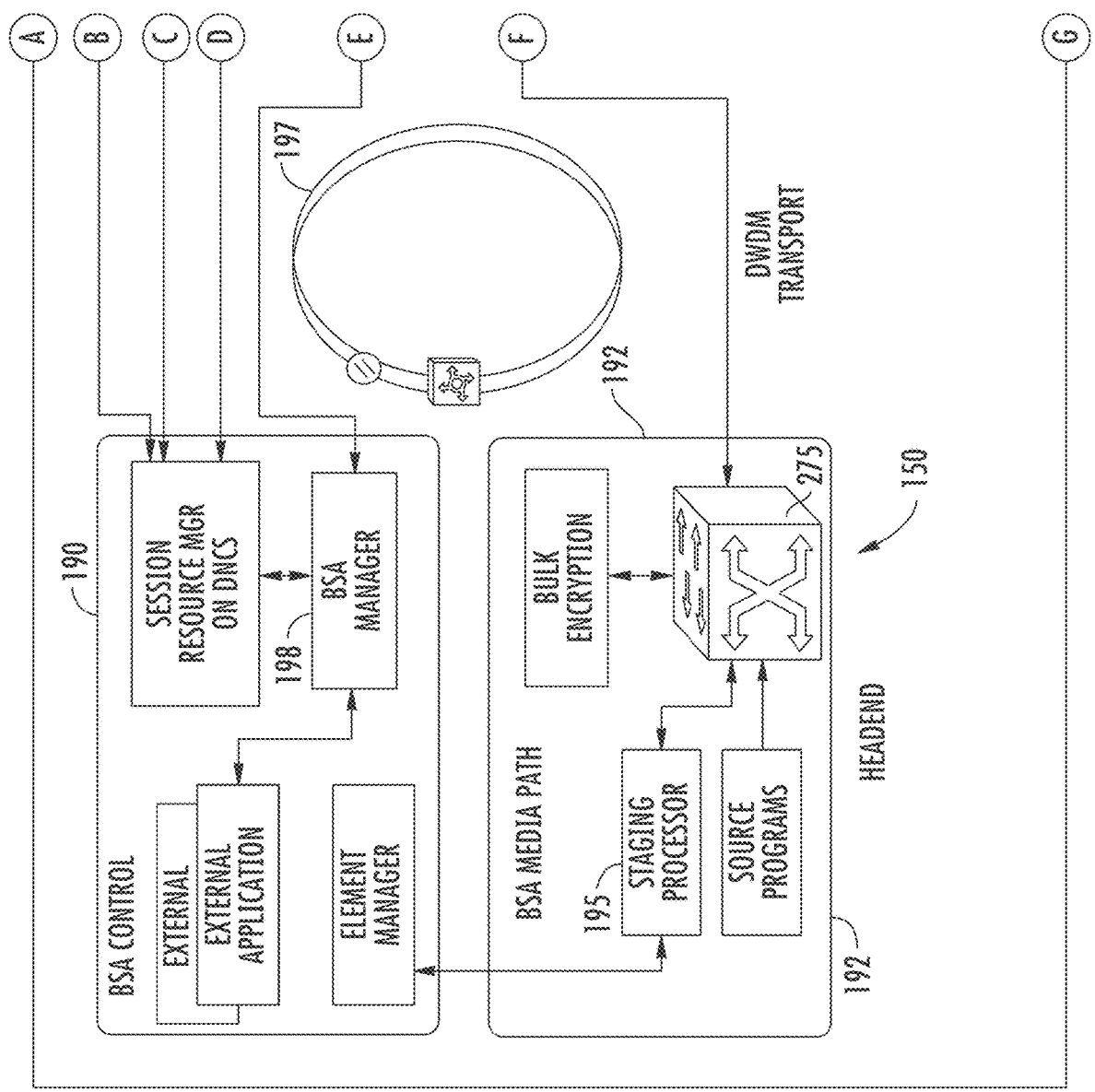
FIG. 1c is a functional block diagram illustrating one exemplary broadcast switched architecture (BSA) network useful with the present invention.
Figure 1C:
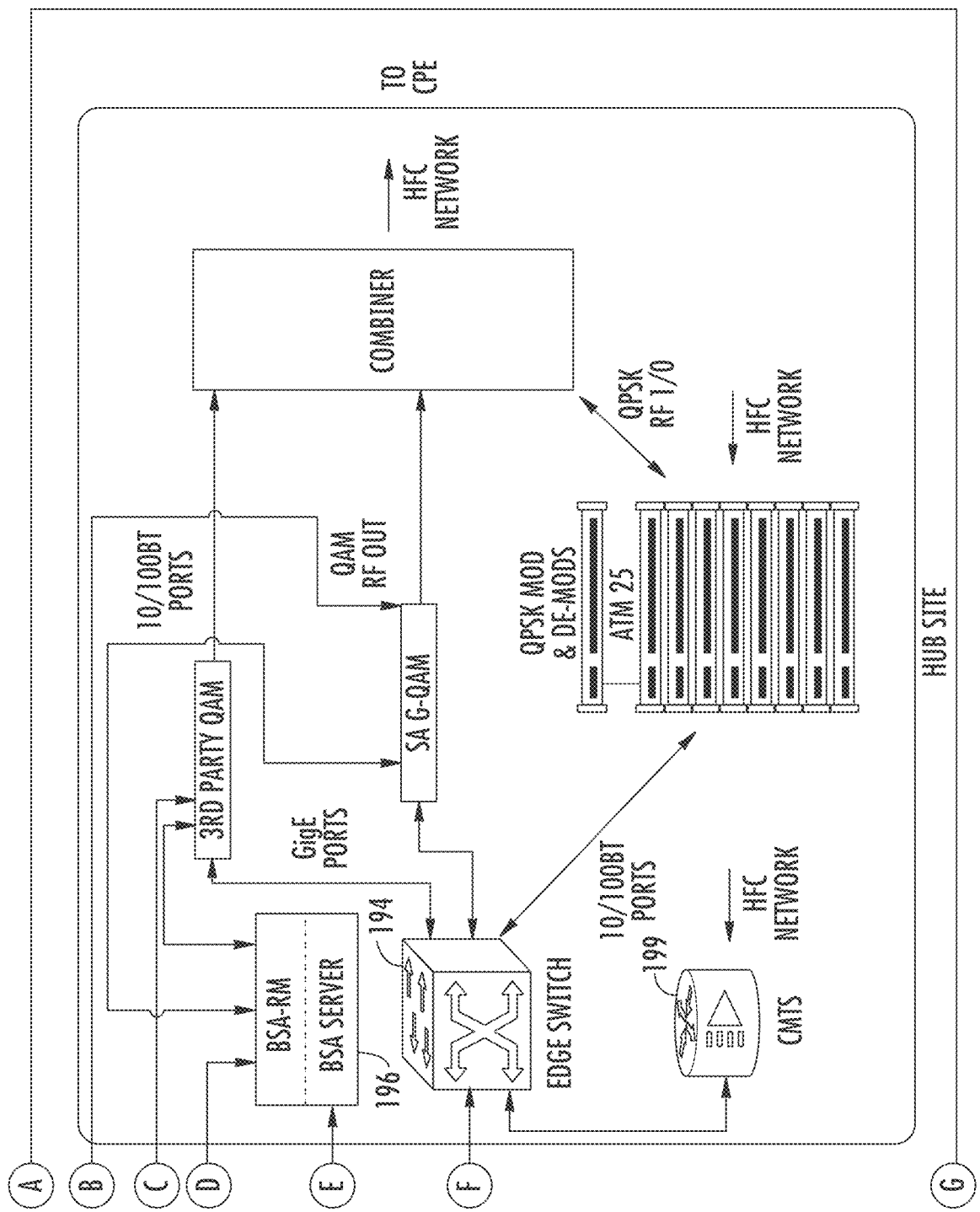

It will also be recognized, however, that the multiplexing operation(s) need not necessarily occur at the headend 150 (e.g., in the aforementioned MEM 162). For example, in one variant, at least a portion of the multiplexing is conducted at a BSA switching node or hub (see discussion of FIG. 1c provided subsequently herein). As yet another alternative, a multi-location or multi-stage approach can be used, such as that described in co-owned U.S. Pat. No. 7,602,820, entitled "APPARATUS AND METHODS FOR MULTI-STAGE MULTIPLEXING IN A NETWORK" incorporated herein by reference in its entirety, which discloses inter alia improved multiplexing apparatus and methods that allow such systems to dynamically compensate for content (e.g., advertisements, promotions, or other programs) that is inserted at a downstream network node such as a local hub, as well as "feed-back" and "feed forward" mechanisms for transferring information between multiplexing stages.

Content (e.g., audio, video, data, files, etc.) is provided in each downstream (in-band) channel associated with the relevant service group. To communicate with the headend or intermediary node (e.g., hub server), the CPE 106 may use the out-of-band (OOB) or DOCSIS channels and associated protocols. The OCAP 1.0, 2.0, 3.0 (and subsequent) specification provides for exemplary networking protocols both downstream and upstream, although the invention is in no way limited to these approaches.

It will also be recognized that the multiple servers (broadcast, VOD, or otherwise) can be used, and disposed at two or more different locations if desired, such as being part of different server "fauns". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

"Switched" Networks—

FIG. 1c illustrates an exemplary "switched" network architecture also useful with the present invention. While a so-called "broadcast switched architecture" or BSA network is illustrated in this exemplary embodiment, it will be recognized that the present invention is in no way limited to such architectures.

Switching architectures allow improved efficiency of bandwidth use for ordinary digital broadcast programs. Ideally, the subscriber is unaware of any difference between programs delivered using a switched network and ordinary streaming broadcast delivery.

FIG. 1c shows the implementation details of one exemplary embodiment of this broadcast switched network architecture. Specifically, the headend 150 contains switched broadcast control and media path functions 190, 192; these element cooperating to control and feed, respectively, downstream or edge switching devices 194 at the hub site which are used to selectively switch broadcast streams to various service groups. A BSA server 196 is also disposed at the hub site, and implements functions related to switching and bandwidth conservation (in conjunction with a management entity 198 disposed at the headend). An optical transport ring 197 is utilized to distribute the dense wave-division multiplexed (DWDM) optical signals to each hub in an efficient fashion.

Co-owned and co-pending U.S. patent application Ser. No. 09/956,688 filed Sep. 20, 2001 and entitled "TECHNIQUE FOR EFFECTIVELY PROVIDING PROGRAM MATERIAL IN A CABLE TELEVISION SYSTEM", incorporated herein by reference in its entirety, describes one exemplary broadcast switched digital architecture useful with the present invention, although it will be recognized by those of ordinary skill that other approaches and architectures may be substituted.

In addition to "broadcast" content (e.g., video programming), the systems of FIGS. 1a and 1c (and 1d discussed below) also deliver Internet data services using the Internet protocol (IP), although other protocols and transport mechanisms of the type well known in the digital communication art may be substituted. One exemplary delivery paradigm comprises delivering MPEG-based video content, with the video transported to user PCs (or IP-based STBs) over the aforementioned DOCSIS channels comprising MPEG (or other video codec such as H.264 or AVC) over IP over MPEG. That is, the higher layer MPEG- or other encoded content is encapsulated using an IP protocol, which then utilizes an MPEG packetizer of the type well known in the art for delivery over the RF channels. In this fashion, a parallel delivery mode to the normal broadcast delivery exists; i.e., delivery of video content both over traditional downstream QAMs to the tuner of the user's STB or other receiver device for viewing on the television, and also as packetized IP data over the DOCSIS QAMs to the user's PC or other IP-enabled device via the user's cable modem. Delivery in such packetized modes may be unicast, multicast, or broadcast.

Referring again to FIG. 1c, the IP packets associated with Internet services are received by edge switch 194, and in one embodiment forwarded to the cable modem termination system (CMTS) 199. The CMTS examines the packets, and forwards packets intended for the local network to the edge switch 194. Other packets are discarded or routed to another component.

The edge switch 194 forwards the packets receive from the CMTS 199 to the QAM modulator 189, which transmits the packets on one or more physical (QAM-modulated RF) channels to the CPE. The IP packets are typically transmitted on RF channels (e.g., DOCSIS QAMs) that are different that the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.

"Packetized" Networks—

Figure 1D:
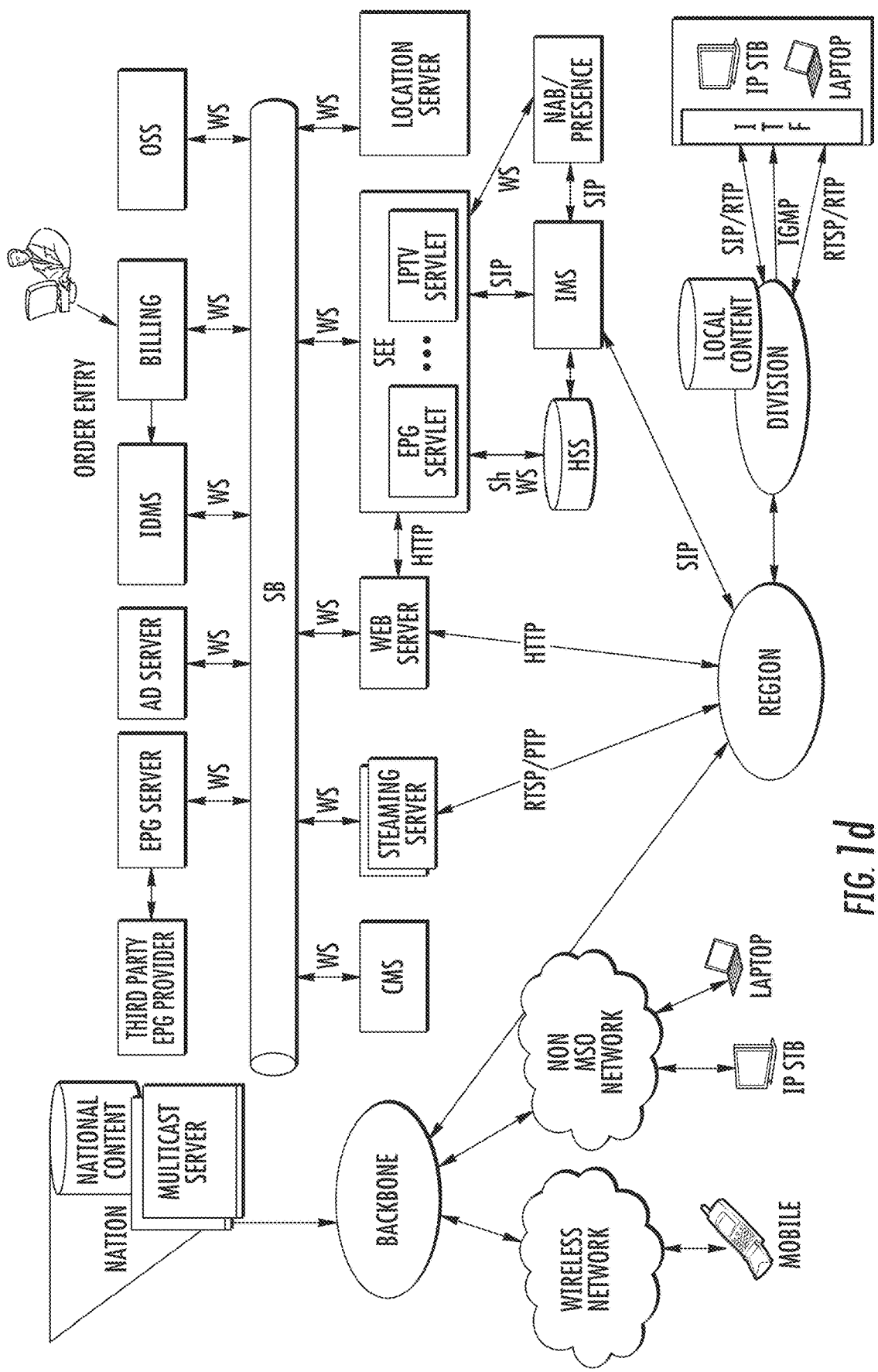
FIG. 1d is a functional block diagram illustrating one exemplary packetized content delivery network architecture useful with the present invention.

While the foregoing network architectures described herein can (and in fact do) carry packetized content (e.g., IP over MPEG for high-speed data or Internet TV, MPEG2 packet content over QAM for MPTS, etc.), they are often not optimized for such delivery. Hence, in accordance with another embodiment of the present invention, a "packet optimized" delivery network is used for carriage of the packet content (e.g., IPTV content). FIG. 1d illustrates one exemplary implementation of such a network, in the context of a 3GPP IMS (IP Multimedia Subsystem) network with common control plane and service delivery platform (SDP), as described in co-pending U.S. Provisional Patent Application Ser. No. 61/256,903 entitled "METHODS AND APPARATUS FOR PACKETIZED CONTENT DELIVERY OVER A CONTENT DELIVERY NETWORK", previously incorporated herein. Such a network provides significant enhancements in terms of common control of different services, implementation and management of content delivery sessions according to unicast or multicast models, etc.; however, it is appreciated that the various features of the present invention are in no way limited to any of the foregoing architectures.

Dynamic Insertion Network—

Figure 2:
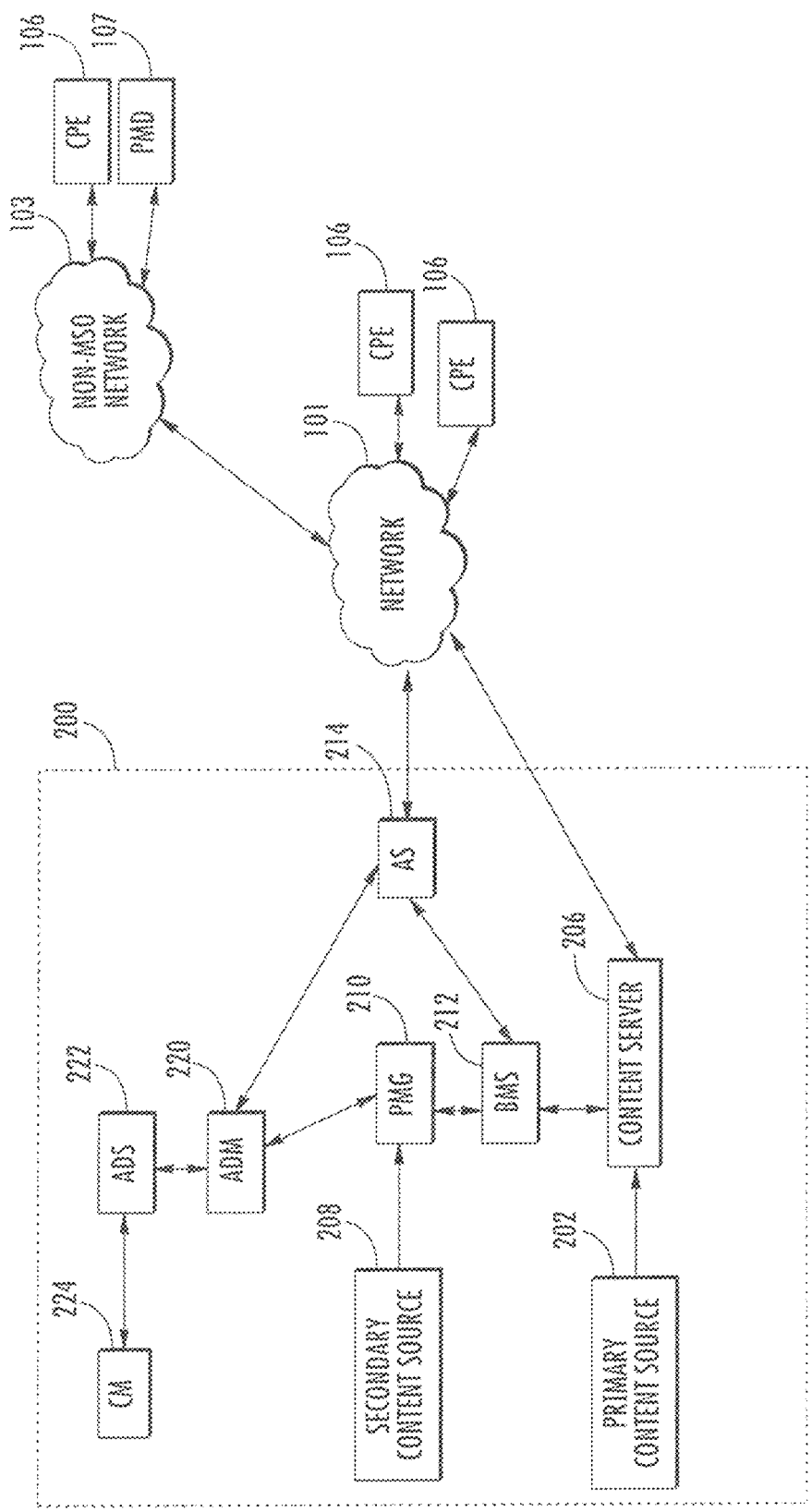
FIG. 2 is a high-level functional block diagram of a content and data distribution network configured in accordance with one embodiment of the invention.

FIG. 2 is a high-level block diagram of a content and data distribution network 200 configured in accordance with one embodiment of the invention and for use in dynamic secondary content insertion or dynamic advertisement insertion (DAI) as discussed herein. As illustrated, the network 200 generally comprises a plurality of CPE 106 adapted to receive content and data via a content delivery network 101, which in turn receives content and data from a content and data distribution network 200. In one embodiment, the content and data distribution network 200 comprises a plurality of entities located at a network headend 150. As shown, the distribution network 200 comprises primary content sources 202 and secondary content sources 208, at least one content server 206 (e.g., a VoD server 105 such as that shown in FIG. 1), and management entities which cooperate to provide content (including secondary content) to various CPE 106 and portable media devices (PMD) 107 in communication with the network 101 (including via a non-MSO network 103). The management entities include e.g., an advertisement management system, advertisement delivery manager, or advertisement decision manager (collectively and individually referred to as "ADM") 220, an advertisement decision service (ADS) 222, and a campaign manager (CM) 224.

In one embodiment, communication between the content and data distribution network 200 and CPE 106 and/or PMD 107 occurs as discussed in previously incorporated co-owned U.S. Provisional Application Ser. No. 61/256,903 filed on Oct. 30, 2009 and entitled "Methods and Apparatus for Packetized Content Delivery Over a Content Delivery Network". As discussed therein, a substantially session-based and packetized content delivery approach (e.g., using the well-known Internet Protocol) which allows for temporal, device, and location flexibility in the delivery of the content, and transportability/migration of user sessions (i.e., allows a user to receive any content they desire, delivered at any time and at any location, and on any device they choose), as well as service/content personalization (e.g., on a per-session/user basis) and blending (integration). This approach uses a common or unified delivery architecture in providing what were heretofore heterogeneous services supplied by substantially different, and often vendor-specific, networks.

Moreover, the foregoing apparatus and methods provide for enhanced content access, reproduction, and distribution control (via e.g., a DRM-based approach and other security and content control measures), as well as quality-of-service (QoS) guarantees which maintain high media quality and user experience, especially when compared to prior art "Internet TV" paradigms. In one exemplary implementation, the network may be based on an IMS (IP Multimedia System, such as e.g., that defined in relevant 3GPP standards) which includes SIP session protocols, as well as a Service Delivery Platform (SDP). In another implementation, the network comprises both "managed" and "unmanaged" (or off-network) services, so that a network operator can utilize both its own and external infrastructure to provide content delivery to its subscribers in various locations and use cases.

In one variant of this approach, network services are sent "over the top" of other provider's infrastructure, thereby making the service network substantially network-agnostic. In another variant, a cooperative approach between providers is utilized, so that features or capabilities present in one provider's network (e.g., authentication of mobile devices) can be leveraged by another provider operating in cooperation therewith.

In another embodiment, content may be provided from the content and data distribution network 200 to the CPE 106 and/or PMD 107 as described in co-owned, co-pending U.S. patent application Ser. No. 11/258,229 filed on Oct. 24, 2005 and entitled "METHOD AND APPARATUS FOR ON-DEMAND CONTENT TRANSMISSION AND CONTROL OVER NETWORKS", which is incorporated herein by reference in its entirety. As discussed therein, data may be provided according to download or "on demand" paradigms. In one embodiment, the network comprises a cable television network connected with a CSP (cellular service provider) or wireless service provider (WSP), and on-demand content delivery is accomplished via a "point-to-point" approach wherein a session is established between a content receiving entity (such as a cellular telephone) and a distributing entity (e.g., a VOD server). Session establishment and data flow control are advantageously implemented using protocols and bandwidth that are typically used for (i) providing on-demand services to subscribers within the cable network, and (ii) delivery and control of streaming multimedia to client mobile devices.

In yet another embodiment, content may be purchased and/or received at a device in a remote network as discussed in co-owned, co-pending U.S. patent application Ser. No. 11/440,490 filed on May 24, 2006 and entitled "PERSONAL CONTENT SERVER APPARATUS AND METHODS", which is incorporated herein by reference in its entirety. As discussed therein, access to content (e.g., program viewing) delivered over a content-based network via other networks or communication channels outside of the content-based network are provided. For example, in the context of a cable television network, programming or other content delivered to a subscriber over the cable network can be accessed via other (secondary) networks such as the Internet, LANs/WANs/MANs, a wireless service provider (WSP) network, cellular service provider (CSP) network, or even a satellite network. In one embodiment, a personal content server located, e.g., at the head-end of the bearer (cable) network may be used to distribute content to the remote requesting location(s), thereby eliminating repetitious traffic to and from subscriber's premises to fulfill the requests for remote content delivery. Infoimation relating to the requesting subscriber's prior activity for the requested content may be used as a basis for authorizing delivery of the remote content. A "network DVR" or "virtual DVR" may be used to provide remote access privileges to content to a subscriber at a location outside the bearer network and/or who does not have a DVR on his premises. In one variant, the network DVR may be web-based, thereby allowing subscribers to request and access content from a website. Broadcast or "live" content can also be accessed via the secondary network approach discussed.

Yet other mechanisms and architectures for providing content to PMDs or CPE located in or out of a managed network may be used consistent with the invention as well, the foregoing being merely exemplary of the broader principles.

Figure 2A:
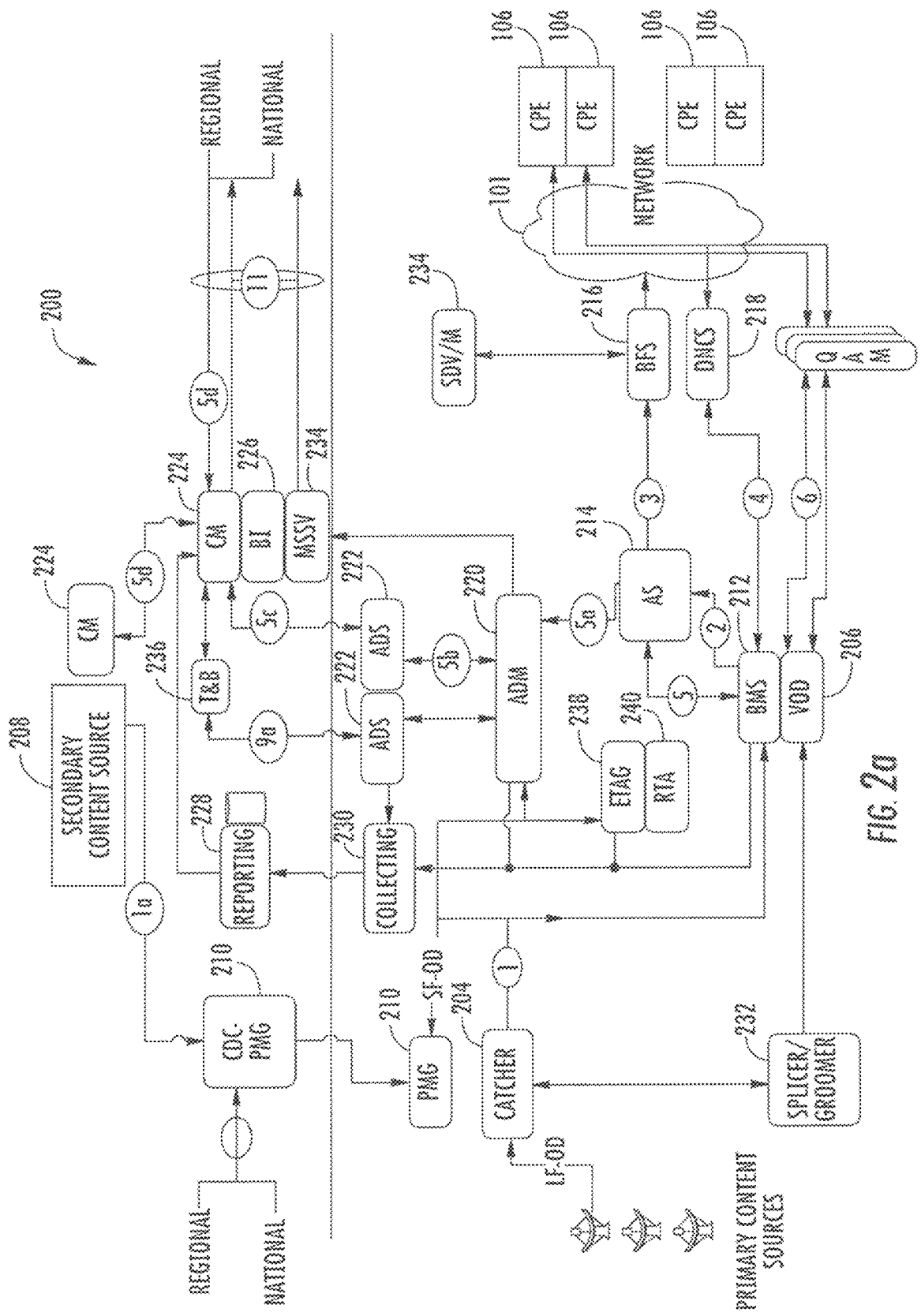
FIG. 2a is a detailed functional block diagram of the exemplary content and data distribution network of FIG. 2.

Referring now to FIG. 2a, a detailed block diagram illustrating one embodiment of the content and data distribution network 200 of FIG. 2 is shown. As illustrated, the network 200 generally comprises primary content (e.g., VOD content) sources 202 and secondary content (e.g., advertisement content) sources 208, at least one VOD content server 206 an application server 214, and various management entities including e.g., an advertisement management system (ADM) 220, an advertisement decision service (ADS) 222, a campaign manager (CM) 224, a package media gateway (PMG) 210, and a business management system (BMS) 212. The PMG 210 in the illustrated embodiment performs content packaging and movement throughout the network. The PMG 210 also acts as a storage and forwarding device, allowing the content to be "manipulated". The BMS 212 is a VOD back office component including metadata management and package/entitlement management functions. The aforementioned components, similar to those discussed above with respect to FIG. 2, cooperate to provide VOD content having advertisement content inserted therein to the CPE 106 and PMD 107 in communication via the network 101 (and/or via a non-MSO network (not shown) in communication with the network 101).

Although discussed herein with respect to advertisement insertion into VOD content, it is appreciated that the foregoing may be utilized in conjunction with the provision of various types of primary and secondary content. For example, multimedia applications, interactive programming, linear or scheduled programming (e.g., "live") content, etc. may be provided.

Additional headend entities are provided in the detailed embodiment of FIG. 2a whose function will be discussed subsequently herein. These entities also work in conjunction with the aforementioned content sources (202, 208), management entities (220, 222, 224, 210, 212), and content server (206, 214), in order to provide authorization and content to the CPE 106 and/or PMD 107.

It is further appreciated that one or more of the aforementioned components may be disposed at various other locations as desired consistent with the architecture implemented (e.g., closer to the network edge, such as at the BSA hub in a BSA network).

In the illustrated embodiment, long form content is received at one or more content catchers 204 from a plurality of content sources 202. The long form content comprises content which into which secondary content has not yet been inserted. In one embodiment, long form content is not formatted for secondary content insertion. The long than content is presented to the users, in one embodiment, as on-demand content. Content retrieved via the catchers 204 is transmitted to a video on-demand (VOD) server 206 for storage. In this model, the VOD platform effectively acts as a splicer from the "streamer" at session playout. Alternatively, short form content may be received at one or more content catchers 204 from a plurality of content sources 202, as discussed elsewhere herein.

Metadata regarding the assets stored at the VOD server 206 is maintained, and utilized to catalogue and carousel the offerings by the broadcast file system (BFS) 216. The BFS 216 performs the basic function of a data carousel. In the illustrated embodiment, a switched digital video manager (SDV/M) 234 is consulted to see if there is available bandwidth to support the playout of additional stream in a shared bandwidth model. In another embodiment, a global resource session manager or GSM (not shown) may be used to manage the resources in the network.

One or more advertisement content sources 208 are also illustrated. Advertisement content is received from the advertisement content sources 208 and via the PMG 210. The secondary content is transmitted to the enhanced TV application gateway (ETAG) 238 and HTA 240. The ETAG 238 is responsible for the "spooling"/streaming of interactive content (EBIF) and receiving any responses from the clients. The secondary content is also delivered from the PMG 210 to the VOD server 206. In this manner, the advertisement content may be inserted into other VOD content prior to delivery to the users.

FIG. 2 further illustrates that the advertisement content is provided as short form content to the VOD server 206. The campaign manager (CM) 224, advertisement decision service (ADS) 222, and advertisement management system (ADM) 220 cooperate to manage insertion of the secondary content (e.g., advertisements) into the primary content (e.g., VOD content).

Communication between the CM 224 and ADS 222 occurs via the traffic and billing interface (T&B) 236. The T&B system 236 traffics linear advertising insertion, and is responsible for producing affidavits for billing purposes. The interface between the CM 224 and may comprise e.g., any number of CCMS (Content and Campaign Management System) schedule files, or other appropriate interface/file transfer mechanisms. The ADM 220 communicates with the CM 224 via an entity providing a centralized view of all the advanced advertising systems in network (MSSV 234) and business intelligence (BI) 226 entities.

In one embodiment, the ADM 220 and ADS 222 are of the type discussed in co-owned, co-pending U.S. patent application Ser. No. 12/503,749 filed on Jul. 15, 2009 and entitled "METHODS AND APPARATUS FOR EVALUATING AN AUDIENCE IN A CONTENT-BASED NETWORK", which is incorporated herein by reference in its entirety.

In another embodiment, the ADM 220 and ADS 222 are adapted to comply with the requirements set forth in the Society of Cable Telecommunications Engineers SCTE 130-1, 130-2, and SCTE 130-3 Digital Program Insertion— Advertising Systems Interfaces standards, each of which is incorporated herein by reference in its entirety.

The ADM 220 is utilized to select individual ones of a plurality of secondary content for delivery to individual ones of the CPE 106 via an application server (AS) 214. The ADM 220 is in communication with the ADS 222; the ADS 222 determines individual ones of the plurality of secondary content from the content store to deliver to the CPE 106 based in part on data collected from a headend collecting entity.

The AS 214 is the headend entity responsible for monitoring viewing patterns of the various CPE 106, and providing content thereto based on the information collected by the monitored viewing patterns. The AS 214 may further enable dynamic insertion of secondary content prior to distribution, in accordance with one embodiment of the invention.

In one embodiment, the application server 214 comprises an application server (AS) such as that discussed in co-owned, U.S. patent application Ser. No. 11/263,015 10/263, 015 filed Oct. 2, 2002 and entitled "NETWORK BASED DIGITAL INFORMATION AND ENTERTAINMENT STORAGE AND DELIVERY SYSTEM", now published as U.S. Patent Application Publication No. 2003/0208767, each of the foregoing incorporated herein by reference in its entirety. In one variant, the AS 214 is a Mystro™ server device of the type utilized by the Assignee hereof, although it will be appreciated that other configurations may be utilized with equal success. With respect to the aforementioned exemplary embodiment utilizing the Mystro server, it is appreciated that the present invention may take advantage of the start-over acquisition process to capture broadcast linear television after local advertisement insertion has occurred. Alternatively, in another embodiment, the network feed may be captured, and have the local advertisements inserted back into the stream from the VOD system. As discussed therein, the AS 214 monitors the content reserved and viewed by a user, and thus can create a profile relating to the user's interests. This information may then be used to assist (the ADM 220 and ADS 222) in providing targeted advertising that would be of most use and interest to the user (and therefore most effectiveness to advertisers). Further, because reserved programs are recorded prior to distribution to a user, the AS 214 may provide the ability to vary advertising content prior to distributing a program to the CPE 106 (e.g., dynamically, in response to changing events or conditions).

The aforementioned concepts may be applied in the context of VOD programming presentation as well. In other words, since VOD programming is pre-stored at the VOD server, the AS 214 may perform one or more of the steps necessary for VOD session setup. Further, the ADM portion of the MAS backoffice may be responsible obtaining an advertisement decision and working with the VOD system to create a stream. The VOD system is responsible for the actual content splicing, multiplexing and transmitting to the user.

The dynamic insertion of secondary content is further monitored and controlled by the business management system (BMS) 212 of FIG. 2.

The ADM 220 and ADS 222 may be further utilized for reporting purposes. For example, the ADM 220 and ADS 222 may cooperate to transmit secondary content to CPE 106 (discussed above) and simultaneously send metadata regarding the secondary content to a collecting entity 230 and report generating entity 228. In one embodiment, the collecting entity 230 and report generating entities comprise e.g., Everstream™ products, such as the interactive data gateway (EV-IDG) product, and/or the interactive data warehouse (EV-IDW) product.

In another embodiment, a content information service (CIS), subscriber information service (SIS) and/or placement opportunity information service (POIS) communicate with the ADM 220 and/or ADS 222 to provide metadata and other information thereto. The CIS is an interface which describes a logical service, it may be run on any entity managing metadata or on an entity in communication with a second entity containing metadata describing the content. The CIS sources metadata to consumers (via the ADM and ADS). The CIS does not define how to move the content around, however a separate CIS implementation may be given to provide such functionality.

A campaign manager 224 is utilized in the illustrated embodiment to manage the insertion of secondary content as discussed herein. In one embodiment, the campaign manager is of the type disclosed in co-owned U.S. patent application Ser. No. 12/503,772 filed on Jul. 15, 2009 and entitled "METHODS AND APPARATUS FOR CLASSIFYING AN AUDIENCE IN A CONTENT- DISTRIBUTION NETWORK" which is incorporated herein by reference in its entirety, although other approaches may be used with equal success. As discussed therein, the campaign manger may comprise multiple components or processes which are either co-located or distributed across two or more entities (CM 224) within the content and data distribution network 200. The campaign manager (CM 224) enables an operator associated with MSO (or another entity) to control one or more aspects of secondary content selection and insertion, therefore enabling an operator to ensure that the goals of the secondary content providers (e.g., advertisers) are accomplished. The CM 224 further allows the MSO to create and maintain billing schema for the various secondary content providers. The CM 224 may further be adapted to manage conflicts, and optimize business value or other business-related parameters such as profit and/or revenue.

Further, the CM 224 provides a user interface which enables the operator associated with the MSO to perform the campaign management functions described herein, whether in whole or part, as well as make adjustments to settings, or simply monitor activity.

In one model, in order for content to be provided to a CPE 106 (or PMD), it must be determined that the CPE 106 or PMD 107 is "entitled" to the content. In one approach, this is accomplished via the methods and apparatus disclosed in co-owned, co-pending U.S. patent application Ser. No. 12/536,724 filed on Aug. 6, 2009 and entitled "SYSTEM AND METHOD FOR MANAGING ENTITLEMENTS TO DATA OVER A NETWORK", which has been previously incorporated herein by reference in its entirety.

As illustrated, the present system supports advertisement sales operations performed at both the regional and national levels. The centralized view of the entire footprint 11 is provided to monitor system activity and performance. CCMS schedule files or other transfer files 9A are obtained for planned or scheduled linear insertion. The campaign management to campaign management interface 5D allows CM's from different entities to "exchange" campaigns and/or "placement opportunity" and inventory information.

The various entities of the content and data distribution network 200 are responsible for providing data and/or content to the CPE 106. These entities may comprise functionality located at one or more of the headend entities discussed above with respect to FIGS. 1-1d, or may comprise additional entities discussed herein. In one embodiment, the network 200 utilizes information obtained from or stored at an authorization server (not shown) to determine whether a CPE 106 requesting content is authorized to receive the content. In another embodiment, restrictions to the provision of content to a user at a display device associated with the CPE 106 are determined by the CPE 106 itself, as discussed in co-owned, co-pending U.S. patent application Ser. No. 12/716,131 filed on Mar. 2, 2010 and entitled "APPARATUS AND METHODS FOR RIGHTS-MANAGED CONTENT AND DATA DELIVERY", which is incorporated herein by reference in its entirety. As discussed therein, a downloadable or transferrable rights profile coupled with a "smart" media player application are given. The rights profile contains information regarding the specific rights of a device and/or a subscriber to access content. It is via the rights profile that the device (via the media player, and its associated rights management application) determines whether to provide content to a subscriber.

Still further, the content server 206 and/or the AS 214 of the CPS 204 may in one embodiment be adapted to utilize information regarding the CPE 106 (or PMD 107) capabilities (e.g., such as in the event a capabilities profile is received from these devices) to perform de-encapsulation/re-encapsulation of content where necessary as is disclosed in co-owned, co-pending U.S. patent application Ser. No. 12/582,619 filed on Oct. 20, 2009 and entitled "GATEWAY APPARATUS AND METHODS FOR DIGITAL CONTENT DELIVERY IN A NETWORK", which is incorporated herein by reference in its entirety. As discussed therein, the content server 206 of the present invention may be configured to process content including de-encapsulating the content from a first media file container format and subsequently re-encapsulating the content to a second media file container format which is known to be compatible with the requesting CPE 106. For example, content which is delivered from a host server or other content source may be encapsulated in e.g., MP4, if the receiving CPE 106 is not capable of reading the MP4 files, the content server 206 may re-encapsulate the content to e.g., MPEG-2 or to another format that the receiving CPE 106 is capable of reading. Other exemplary network architectures may be useful with the present invention as well. For example, the content server 206 may provide data and/or content to a plurality of user devices via the network 101, including e.g., a converged premises device (CPD) and/or a media bridge. The CPD may for example be of the type described in co-owned and co-pending U.S. patent application Ser. No. 11/378,129 filed Mar. 16, 2006 and entitled "METHODS AND APPARATUS FOR CENTRALIZED CONTENT AND DATA DELIVERY", incorporated herein by reference in its entirety. As discussed therein, the CPD comprises a WLAN (e.g., Wi-Fi) and/or PAN (e.g., Bluetooth or 802.15) wireless interface. Packetized (e.g., IP) traffic may be exchanged between the CPD and a PMD 107 via, e.g. the WLAN/PAN interface. Hence, in one embodiment, the PMD 107 may request content from the CPD.

The media bridge apparatus may be for example of the type disclosed in co-owned, co-pending U.S. patent application Ser. No. 12/480,597 filed Jun. 8, 2009 and entitled "MEDIA BRIDGE APPARATUS AND METHODS", incorporated herein by reference in its entirety. As discussed therein, the media bridging apparatus acts as a connection between a PMD 107 (which may include e.g., an iPod™, handheld computer, smartphone, PDA, etc.) and a user's home network. This bridging apparatus may be used, for example, to convert content stored on the PMD 205 to a format capable of being presented on a user's set-top box or other client device. The bridging apparatus may also be utilized for transmitting content to the PMD 107 (such as by converting the content to a format capable of being stored/presented on the PMD 107) provided the user of the PMD 107 is authorized to receive the content.

In another embodiment, all (or portions of) of the available primary and secondary content may be pushed to the edge of the network in order to facilitate more efficient transmission thereof to the client. In addition, the content may be pushed to edge devices, such as local service nodes, based on the applicability of the content to the group of devices serviced by the edge device (e.g., the service group associated with the node). For example, it may be determined that the CPE serviced by a particular local node are all within a given advertisement zone. Hence, secondary content specific to that advertisement zone may be pushed to the node which services that zone for more efficient delivery thereof.

Methodology—

Figure 3:
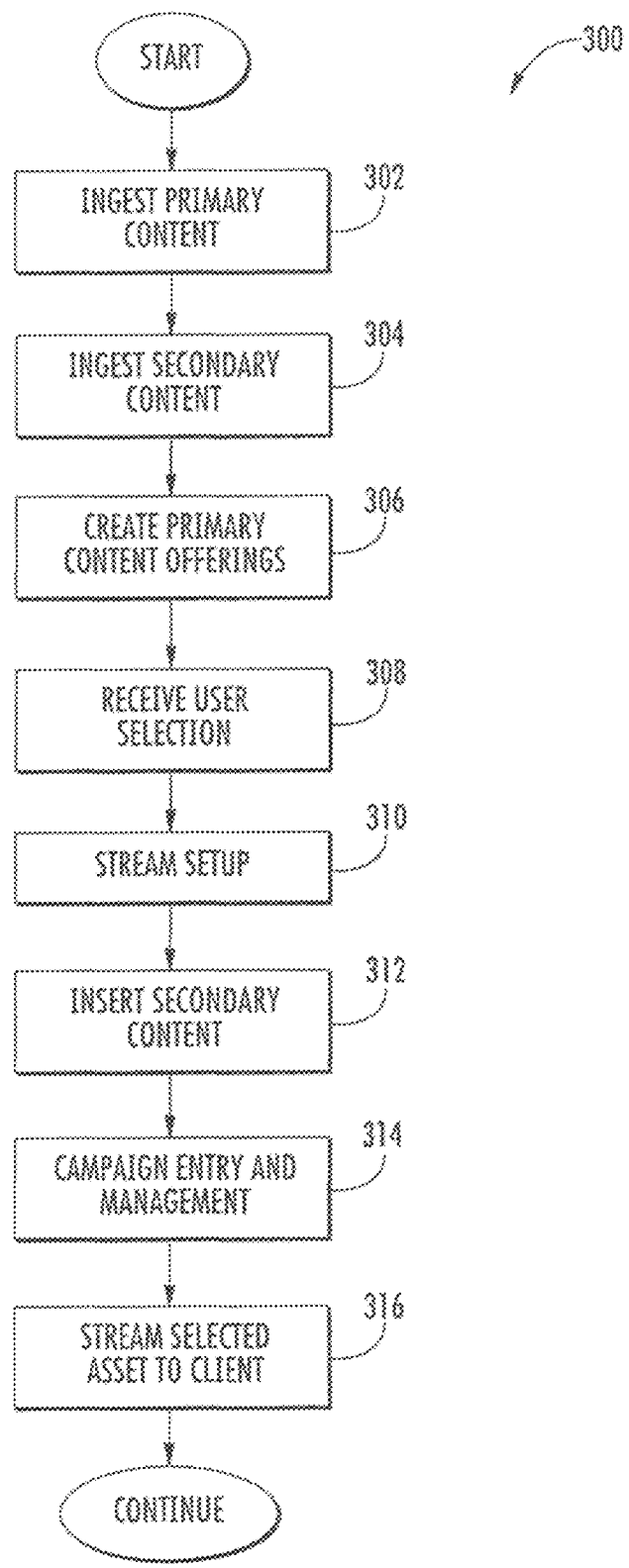
FIG. 3 is a logical flow diagram illustrating an exemplary method for providing primary and secondary content to a plurality of user devices according to the present invention.

Referring now to FIG. 3, an exemplary method 300 for providing primary and secondary content to a plurality of user devices (e.g., CPE 106 and/or PMD 107) according to the present invention is described. As shown, per step 302, primary content is ingested. In the illustrated embodiment, the primary content comprises on-demand content of the type previously referenced herein.

Alternatively, other types or forms of content may be ingested, and hence the method of FIG. 3 can be readily applied and adapted to non-OD content delivery models. For example, so called "quick clips" content (described in co-owned U.S. Pat. No. 7,174,126 issued Feb. 6, 2007 and entitled "TECHNIQUE FOR EFFECTIVELY ACCESSING PROGRAMMING LISTING INFORMATION IN AN ENTERTAINMENT DELIVERY SYSTEM" incorporated herein by reference in its entirety), so-called "start-over" content (described in co-owned, co-pending U.S. Patent Publication No. 2005/0034171 entitled "TECHNIQUE FOR DELIVERING PROGRAMMING CONTENT BASED ON A MODIFIED NETWORK PERSONAL VIDEO RECORDER SERVICE" incorporated herein by reference in its entirety), so-called "lookback" content (as described in co-owned, co-pending U.S. patent application Ser. No. 10/913,064 filed Aug. 6, 2004 and entitled "TECHNIQUE FOR DELIVERING PRGRAMMING CONTENT BASED ON A MODIFIED NETWORK PERSONAL VIDEO RECORDER SERVICE" incorporated herein by reference in its entirety), and/or so-called "remote DVR" content (as discussed in co-owned U.S. Pat. No. 7,457,520 issued Nov. 25, 2008 and entitled "TECHNIQUE FOR PROVIDING A VIRTUAL DIGITAL VIDEO RECORDER SERVICE THROUGH A COMMUNICATIONS NETWORK" incorporated herein by reference in its entirety) may be ingested. Other types of content may be utilized consistent with the invention as well.

In another embodiment, the types or forms of content ingested at step 302 may comprise long form and/or short form on-demand content.

Next, per step 304, secondary content is ingested. In one embodiment, secondary content is obtained from one or more secondary content sources via a PMG 210. The PMG 210 communicates the secondary content to the content server 206 (which is monitored by the BMS 212).

At step 306, a catalog of primary content offerings is created from metadata generated regarding the primary content received (at step 302). In one embodiment, the catalog comprises a user readable listing of content which is presented to the user via a user interface displayed on the CPE 106 (and/or PMD 107). The catalog may bear substantial similarity to an electronic programming guide (EPG). In other words, the catalog presented to the user may comprise a series of selectable titles (or other program identifying information). A user may view the titles by using e.g., one or more menu functions/buttons on the CPE 106, PMD 107, or a remote control device. A user may select a particular one of the presented programs; the user's selection is then received at the DNCS 218, and communicated to the BMS 212 (step 308).

In response to the user selection, a stream is set up (step 310). In the case where the content comprises on-demand content (or other content requiring a unicast delivery), the stream set up may comprise a resource negotiation.

As will be discussed in greater detail herein below, one or more methods are implemented to provide for the insertion of secondary content into the requested primary content. Hence, the ADM 220 is contacted to set up a stream as well (step 310). The ADM 220 and ADS 222 cooperate to select one or more pieces of secondary content for insertion into the selected primary content (step 312). Selection of targeted secondary content, as well as methods for the insertion of secondary content, are described subsequently herein.

Per step 314, campaigns are entered and managed centrally. In other words, the campaign manager (CM) 224 is consulted to ensure that the secondary content is inserted according to one or more management rules. The CM 224 as discussed above is configured to manage advertising campaigns for one or more advertisement/promotional providers in order to, for example, (i) increase advertising or associated sales revenue for an MSO, as well as to (ii) increase the likelihood a particular advertiser will reach its targeted audience as precisely as possible (and within any limitations of an advertiser-MSO defined relationship). As discussed below, these CM "rules" may also be overlaid with other logical rule sets or constructs (e.g., MSO operational and/or business goals, which may not always be compatible with the CM goals of precision targeting under (ii) above).

Finally, per step 316, the selected primary content is provided to the user having the secondary content inserted therein.

Figure 3A:
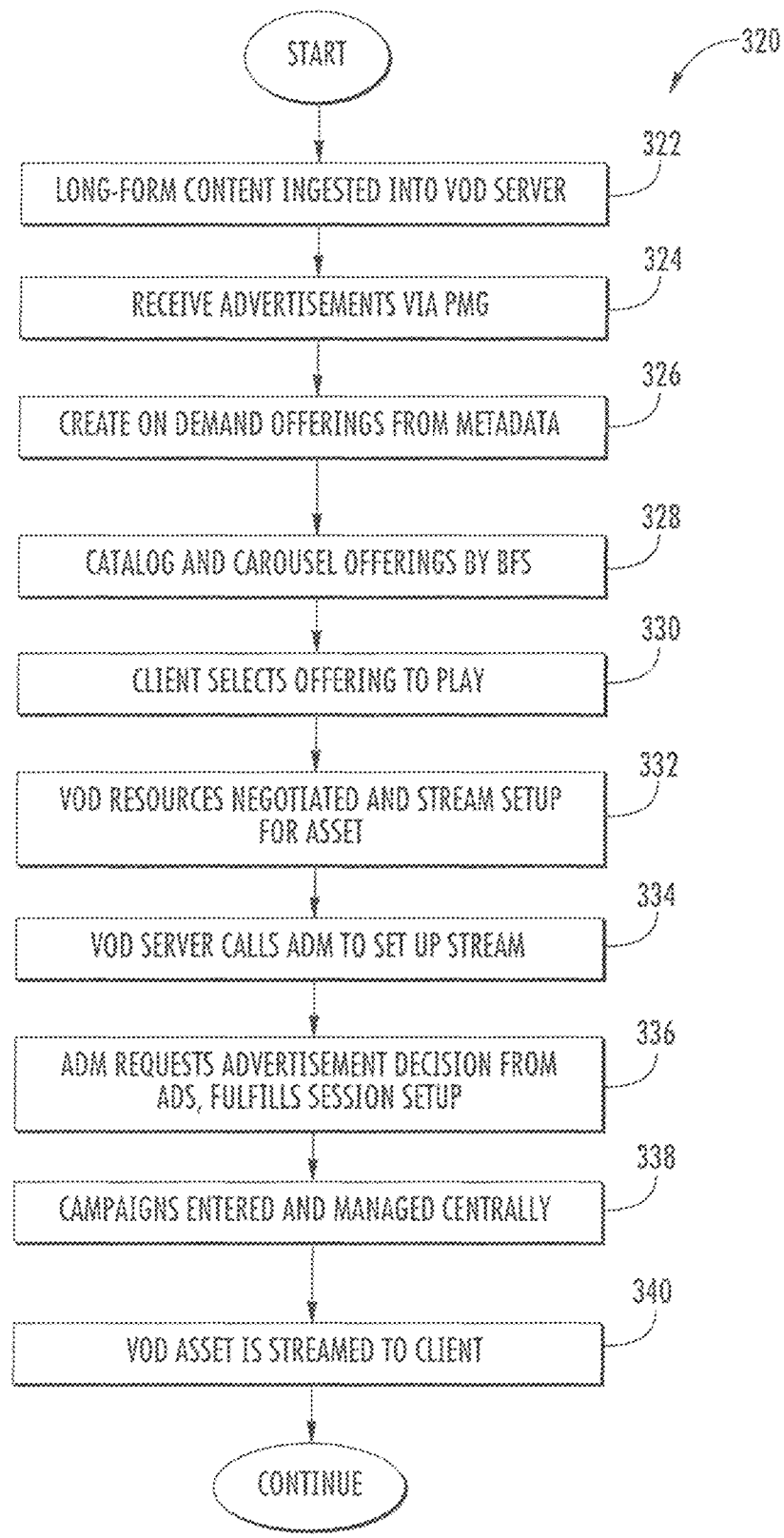
FIG. 3a is a logical flow diagram illustrating one detailed implementation of the method of FIG. 3 for providing primary and secondary content to a plurality of user devices according to the present invention.

Referring now to FIG. 3a, a detailed implementation of the method of FIG. 3 is given. As shown, per step 322, long form content is ingested into the VOD server 206. As noted previously, long form content comprises content which does not have secondary content inserted therein and/or which is not formatted to have such secondary content inserted. In one embodiment, the long form content comprises content which does not have secondary content splice indicators.

Next, per step 324, advertisements are received from one or more secondary content sources via e.g., the PMG 210.

At step 326, the primary content offerings are cataloged and carouseled by the BFS 216. The catalog of content is then presented to the client, which selects at least one offering to play (step 330). In response to the selection, VOD resources are negotiated, and a stream is set up for delivery of the selected asset (step 332).

At step 334, The VOD server 206 calls the ADM 220 to set up a stream for delivery of the selected asset. In order to fulfill the session setup, the ADM 220 requests an advertisement decision from the ADS (step 336). The ADS 222 determines individual ones of the plurality of secondary content from the content store to deliver to the requesting client.

In one variant, the secondary content is selected based in part on data collected from a headend collecting entity regarding the requesting client or subscriber, the requesting device, or other factor. As will be discussed below, advertisement decisions may be based on an advertisement zone (as determined by e.g., zip code, area code, or other indicator assigned to a subscriber and/or device), unique characteristics of the requesting subscriber (demographics, psychographics, firmographics, and/or behavioral variables), or other factor.

Next, at step 338, campaigns are entered and centrally managed. It is the CM 224 which enters and manages the advertisement campaigns in the illustrated embodiment. The CM 224 permits the control of advertisement selection by an operator associated with the MSO. It is via the CM 224 campaign management that the goals of the advertisers and/or the MSO are accomplished.

Lastly, per step 340, the VOD asset having one or more secondary content elements (e.g., targeted advertisements) disposed therein is streamed to the client.

Secondary Content Insertion—

As discussed previously, when a user selects content for delivery, the CM 224, ADM 220, and ADS 222 cooperate to select and insert secondary content into the requested primary content. Several methods are discussed herein for the insertion of secondary content, although the invention should in no way be considered limited to these described methods.

When a CPE or PMD (e.g., set top box) establishes a session, a request is sent to the components at the headend that support dynamic secondary content insertion (e.g., CM 224, ADM 220 and ADS 222). In response to the request, a presentation stream is assembled by combining primary content and secondary content assets (also referred to elsewhere herein as "entertainment content assets (EC)" and "advertisement content assets (AC)", respectively). The presentation stream is then delivered back to the set top box, where it plays out as an uninterrupted session.

In one embodiment, secondary content may be inserted into any type of on-demand or on-demand-like programming. For example, secondary content may be inserted according to the present invention into video on-demand (VOD), free on-demand (FOD), subscription video on-demand (SVOD), movies on-demand (MOD), start-over, lookback etc. Although discussed herein with respect to secondary content insertion into session-based (on-demand) content, it is appreciated that the apparatus and methods discussed herein may also be utilized for dynamic secondary content insertion into linear (e.g., broadcast) or other non-session-based content with proper adaptation, such adaptation being readily within the skill of the ordinary artisan given the present disclosure.

The models of secondary content insertion discussed herein provide for insertion: (i) prior to the start of the primary content, (ii) when primary content is paused, (iii) when primary content is stopped prior to completion, and/or (iv) when primary content plays to completion. It will be appreciated, however, that the invention is not limited to these four instances or scenarios. For example, it may be that a "rewind" or "FF" model is used, so that an advertisement or placement opportunity is created when these functions are invoked. Moreover, if the same primary content is replayed (e.g., a movie watched twice within a prescribed availability window), the secondary content inserted at the second play might be made to be different or the same same as that for the first play, depending on the advertiser/MSO (or even user) preference.

In one embodiment, high definition (HD) content segments are down-converted prior to insertion into or being appended to standard definition (SD) content segments. In other words, a mechanism is given to determine whether the primary content is standard or high definition content, and whether the secondary content to be inserted or appended thereto is standard or high definition content. If the primary content is standard definition content, the secondary content which will be presented therewith (e.g., is inserted therein) is down-converted to standard definition if necessary. As is well known, traditional SD content consumes about ¼ the bitrate/bandwidth of HD content, and hence the video resolution/clarity of the HD content versus the SD may be an undesirable artifact of mixing the two; resolution matching is useful in providing a satisfying user experience. For example, if the user is watching programming in SD, and HD advertisements are available, the HD advertisements are down-converted automatically. Resolution mismatches often result in problems such as macroblocking or audio drops. Alternatively, if the user is watching programming in HD, and SD advertisements are available, then the advertisements can be up-converted. As yet another alternative, SD programming can be upconverted to HD (or near-HD) in order to better match available HD advertising. These approaches may be applied to H.264/AVC, 3D, Silverlight, Apple, or any other media formats.

Replace Model—

A first model for providing secondary content insertion is illustrated at FIG. 4. According to this model, a first segment of secondary content is used to replace another extant segment of secondary content. For example, the segments may be replaced one-for-one. Alternatively, the segments of inserted secondary content may be longer or shorter in length than those being replaced. Further, the number of secondary content segments inserted may be greater than or fewer than the number of replaced segments.

The present secondary content segment replacement model may be utilized, in one embodiment, to replace secondary content targeted to a particular advertisement zone with secondary content targeted to another advertisement zone, national advertisements, and/or more specifically targeted advertisements (discussed below), although other purposes will be recognized by those of ordinary skill given this disclosure.

The content segment replacement model may also advantageously be used to replace secondary content so that a user will receive the same secondary content no matter the device, location, or network from which the request originates. For example, a user requesting content from a mobile device to be delivered from an IP network will receive the exact same secondary content that the same user would receive if the request had originated from the user's STB at their home. In this manner, the MSO can ensure that demographic, psychographic, geographic, etc. information known about a subscriber is translated and utilized for the provision of content to the subscriber via any network and/or device in a consistent and predictable manner.

As illustrated in FIG. 4, a primary content asset having secondary content inserted therein is generated for delivery to a first set of users. The asset is comprised of a first content block 402 comprised of a first primary content program (program A) 406 divided into segments. In the illustrated embodiment, the primary content 406 is divided into three segments (406a, 406b, 406c), but other numbers and division schemes may be used. The primary content 406 is separated by secondary content segments (Content Asset B 408 and Content Asset C 410). As shown, the first segment of primary content 406a and the second segment of primary content 406b are separated by the first secondary content asset (Content Asset B) 408; the second segment of primary content 406b is separated from the third segment of primary content 406c by the second secondary content asset (Content Asset C) 410. The content block 402 is specifically generated to be provided to the first set of users. That is to say, the secondary content asset B and content asset C are specific to the first set of users according to e.g., demographics, geography (such as by advertisement zones, zip code, area code, etc.), psychographics, etc.

When a user not belonging to the first set of users requests program A, the secondary content inserted therein is evaluated by a dynamic secondary content insertion application (e.g., an application running on one of the aforementioned management entities such as the ADM 220, ADS 222, and/or CM 224) to determine whether it is appropriate for transmission to the requesting user. The determination may be based on at least one of: (i) user demographics, (ii) user geographic location, (iii) advertisement zone, (iv) user psychographics, or (v) other information known about the requesting user, their present context, or the requesting device. This may be accomplished by comparing metadata or other descriptive information relating to the secondary content to information known about the requesting user (information obtained from the headend), or the requesting device. From a VOD perspective, the information about the subscriber is in the illustrated embodiment sent with the advertisement decision request. The advertisement decision manager can use that information to best determine what secondary content to insert (e.g., what advertisement to play). If the secondary content assets B and C are both appropriate for delivery to the requesting user, the asset it provided "as is" (with no changes).

If it is determined that one or more of the secondary content assets (Content Asset B 408 and/or Content Asset C 410) provided in the content block 402 are not targeted or otherwise suitable for delivery to a subsequent requesting user, the unsuitable secondary content is removed (such as by "ranging out" the segment of content in question), and new secondary content is placed in the content block in its place, thereby creating a second content block 404 comprising the original primary content 406, having one or more new secondary content assets (such as Content Asset L 412 and/or Content Asset M 414) inserted therein. The process of ranging out may include for instance commands indicating "play from here-to-here in content X but not from there-to-there", "play this part of content Y instead in the there-to-there part of X", and so forth. These instructions may be performed by e.g., the ADM as part of an advertisement decision. In one embodiment, the secondary content is chosen for insertion by the ADS 222 and CM 224. The dynamic secondary content insertion application (discussed below) running at the ADM 220 is responsible for removal of the unsuitable secondary content assets 408, 410 and/or for insertion of the secondary content assets selected for replacement by the ADS 222 and CM 224. Alternatively, the computer application(s) required for secondary content removal and/or insertion may be run at e.g., an entity of the BMS 212, the content server 206, or other headend entity discussed herein.

The VOD system is responsible for preparing content for delivery (e.g., making the content appear acceptable). The VOD system functions as a splicer in an on-demand fashion. The ADM (which may be part of the VOD platform) is functionally responsible for knowing detecting a "trigger", such as a session setup, and obtaining a decision or set of decisions about what advertisement or set of advertisements to play and where they go. Once the decision set is established the ADM can work with the VOD system to make the stream appear as it is supposed to by playing segments of one or more pieces of content out as a continuous stream.

If the replacement secondary content segment (such as Content Asset L 412 and/or Content Asset M 414 of FIG. 4) is shorter than the original secondary segment which it replaces, (such as Content Asset B 408 and/or Content Asset C 410, respectively), the primary content segment scheduled to follow the secondary content will play immediately following completion of the replacement content. Suppose for example Content Asset B 408 is to begin at 1:30:00 and run to 1:33:15 relative the beginning of the first content block 402. Suppose then, that the dynamic secondary content insertion computer application determines that Content Asset B 408 (having a total running time of 00:03:15), is to be replaced by Content Asset L 412 (having a total running time of 00:02:54). When Content Asset B 408 is replaced, Content Asset L 412 begins at 1:30:00 and runs to 1:32:54. In this instance, the second segment 406*b* of the primary content 406 as presented in the second content block 404 will begin immediately after Content Asset L 412 ends e.g. at 1:32:54 (as opposed to starting at 1:33:15 as it would in the first content bock 402). Subsequent content blocks or segments are therefore shifted forward in time so as to make them contiguous with any inserted secondary content.

If the replacement secondary content (such as Content Asset L 412 and/or Content Asset M 414 of FIG.4) is longer than the original secondary content segment which it replaces, (such as Content Asset B 408 and/or Content Asset C 410, respectively), the primary content segment scheduled to follow the secondary content will play immediately following completion of the replacement content. Suppose for example Content Asset C 410 is to begin at 1:30:00 and run to 1:33:15 relative the beginning of the first content block 402. Suppose then, that the dynamic secondary content insertion computer application determines that Content Asset C 410 (having a total running time of 00:03:15), is to be replaced by Content Asset M 414 (having a total running time of 00:03:30). When Content Asset C 410 is replaced, Content Asset M 414 begins at 1:30:00 and runs to 1:33:30. In this instance, the second segment 406*b* of the primary content 406 as presented in the second content block 404 will begin immediately after Content Asset M 414 ends e.g. at 1:33:30 (as opposed to starting at 1:33:15 as it would in the first content bock 402).

Figure 4A:
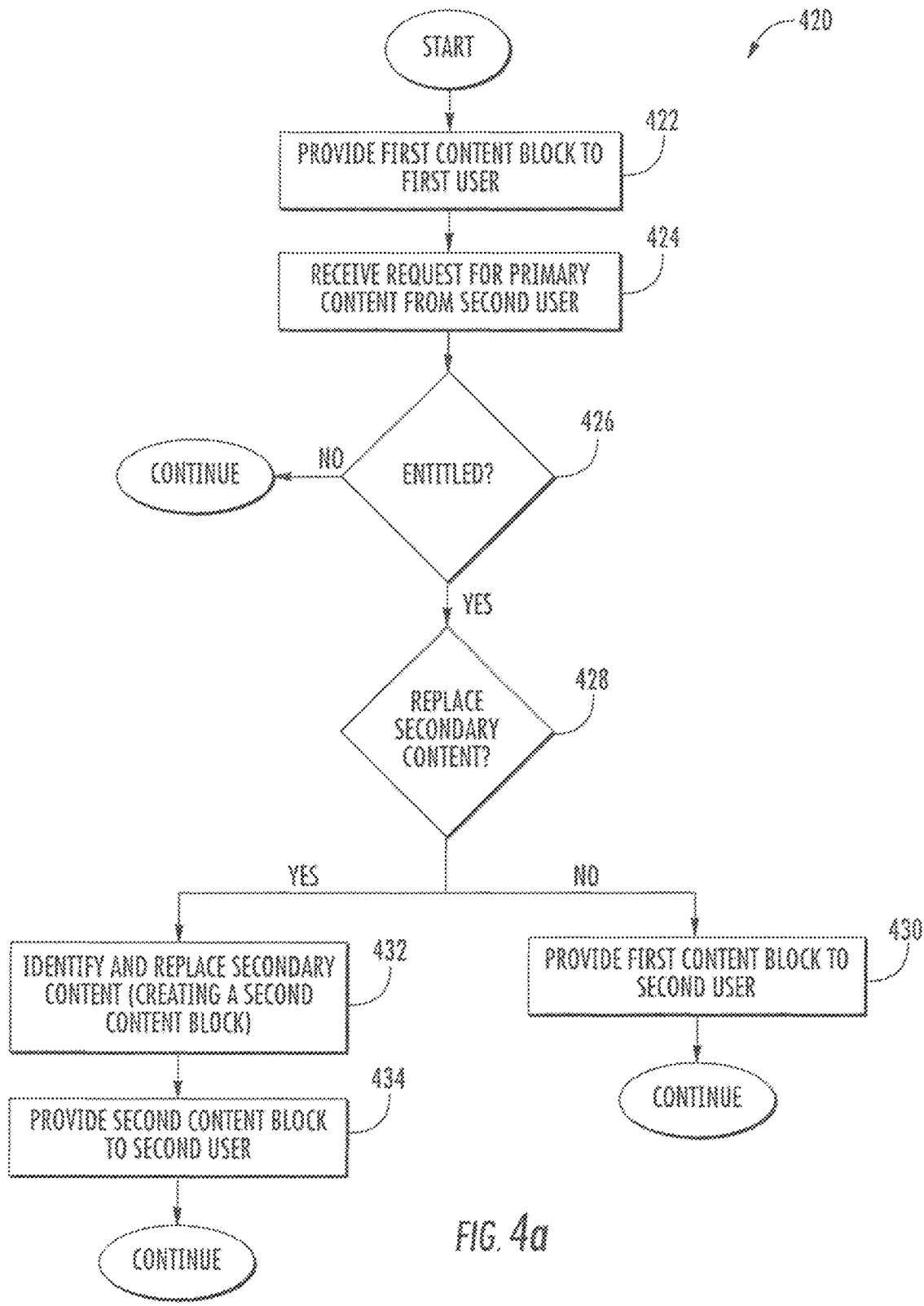
FIG. 4a is a logical flow diagram illustrating an exemplary method of providing secondary content insertion using the replacement model of FIG. 4.

Referring now to FIG. 4*a*, a method 420 is given for performing the content replacement such as that discussed above with respect to FIG. 4. As illustrated, per step 422, a first content block 402 is provided to at least one first user. In one example, the first content block 402 comprises primary content (Program A) 406 having secondary content assets A 408 and B 410 inserted therein.

Next, per step 424, a request is received from a second user for the primary content (Program A) 406 at the DNCS 218. Per step 426, the user must be authenticated in order to receive content. In one embodiment, the entitlements of the user to receive requested content are determined utilizing the systems and methods discussed in co-owned, co-pending U.S. patent application Ser. No. 12/536,724 filed on Aug. 6, 2009 and entitled "SYSTEM AND METHOD FOR MANAGING ENTITLEMENTS TO DATA OVER A NETWORK", previously incorporated herein by reference in its entirety.

In response to receiving the request, the dynamic secondary content insertion application determines whether the secondary content residing within the first content block 402 should be replaced (step 428). The determination of whether the secondary content should be replaced is based on, in one embodiment, the extent to which the secondary content is appropriate for the specific requesting subscriber and/or device. For example, secondary content advertising ski equipment may not be necessary and/or suitable for playback to devices located in e.g., Miami, Fla. In another embodiment, the determination may be based on whether the secondary content has "expired". For example, certain secondary content may be directly related to a current event, a time of year, or may be otherwise in appropriate if not viewed by users within a given time frame. Such secondary content will therefore be replaced according to the methods discussed herein.

The determination of whether the secondary content is appropriate may also be based on the context of the primary content with which it is associated. For example, the methods and apparatus discussed in co-owned, co-pending U.S. patent application Ser. No. 11/441,476 filed on May 24, 2006 and entitled "SECONDARY CONTENT INSERTION APPARATUS AND METHODS", which is incorporated herein by reference in its entirety, may be utilized to provide dynamic secondary content insertion (e.g., replacement of dated or geographically inappropriate advertisements or promotions), and thereby allow the MSO or other network operator to adjust the secondary content to make it more applicable to the remote user's context (e.g., location, hardware/software environment, date/time, etc.).

If the dynamic secondary content insertion application determines that the secondary content does not need to be replaced, the first content block 402 is provided to the second user (step 430). However, if the dynamic secondary content insertion application determines that the secondary content in the first content block 402 should be replaced, then, per step 432, the secondary content is identified and replaced. In one embodiment, the secondary content is identified by the aforementioned dynamic secondary content insertion application via a header or metadata associated with the content. Once identified, the secondary content may be removed, and replaced by other secondary content.

The CM 224, ADS 222 and ADM 220 cooperate to select secondary content for insertion. In one embodiment, the content is selected from a playlist of available secondary content targeted specifically to the user and/or the device. The playlist may be created by the ADM 220 in response to receiving a message from the primary content server 206 that includes information identifying a subscriber (such as by subscriber account, device identification, etc.), and which may be made anonymous (i.e., specific to that user, but the identity of the user being unknown). The information identifying the subscriber may then be correlated to records in a data warehouse (not shown) which indicate various demographic (e.g., age and gender), psychographic (e.g., personality, values, attitudes, interests, or lifestyles), firmographic (e.g., industry, seniority or functional area), geographic (e.g., zip code, area code, or advertisement zone), and/or behavioral (e.g., usage rate or loyalty) variables associated with the given subscriber or group of subscribers. Information regarding the device from which the subscriber request was received (e.g., MAC address, IP address, configuration data, etc.) may also be collected and utilized. The ADM 220, ADS 222, and/or CM 224 may then use the information to select appropriate (e.g., targeted) secondary content for the playlist, and then make insertion decisions from the playlist. Various business-related rules for this determination are discussed herein below. For example, which one(s) of the secondary content are inserted may be dependent on one or more factors relating to the primary content, the subscriber, the type of delivery requested, etc. The insertion of the selected secondary content (as replacement content) creates a second content block 404 (comprising the new secondary content and previously referenced primary content (Program A) 406).

Next, per step 434, the second content block 404 is provided to the second user.

Fill Model—

Figure 5:
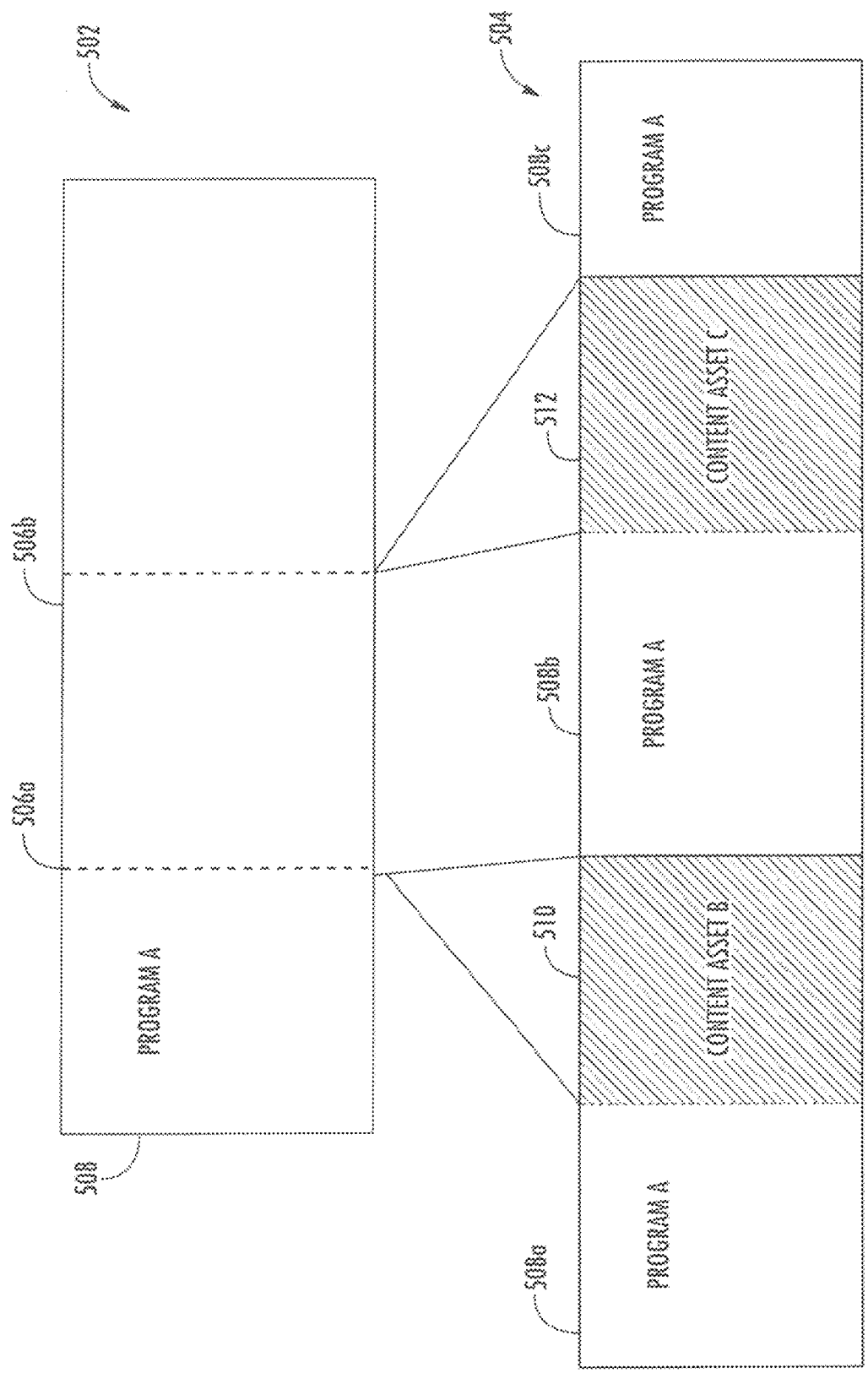
FIG. 5 is graphical representation illustrating one embodiment of a "fill" model for providing secondary content insertion according to the present invention.

FIG. 5 illustrates another model for secondary content insertion according to the present invention.

The secondary segment fill insertion model may advantageously be used to insert secondary content into primary content which might not otherwise have secondary content inserted therein, and/or to increase the frequency of inserted secondary content (or move secondary content around within the primary content). In this manner, a user receiving primary content (such as via a network other than the traditional HFC network) at devices located within the user's home may additionally receive secondary content, including secondary content specifically directed to the user and/or device. For example, a user requesting a movie on-demand to be delivered over an IP network to their laptop computer will, according to the insertion methods discussed herein, receive the movie with secondary content inserted therein or associated therewith. In one variant, the secondary content is the same secondary content that user would receive if the request had originated from the user's STB at their premises. In this manner, the MSO can ensure that demographic, psychographic, geographic, etc. information known about a subscriber is translated and utilized for the provision of any content to the subscriber via any network and/or device. The fill insertion model further allows for secondary content insertion into long form content.

In the model of FIG. 5, one or more segmented secondary content assets (e.g., Content Asset B 510 and/or Content Asset C 512) are inserted at splice points 506a, 506b in the primary content (Program A 508) stream.

A splice point is a location in a bitstream that provides an opportunity to splice. It is an attribute of an individual PID stream, not of a program; each PID of a program has a splice point which corresponds to each splice point in the PCR_PID. A splice point is marked by syntax in a transport packet. The "point" refers to an imaginary point between two packets of a PID stream. The splice points may be seamless, therefore requiring the program stream be encoded with buffer delay at the splice point, or non-seamless.

The splice points may be predetermined by the primary content provider, or may be determined by the MSO or other network controller according to one or more business rules. Splice points may be correlated to events within the program itself (e.g., at logical pauses, breaks, or changes of scene), or have no correlation whatsoever. Splice Points may also occur at irregular intervals, or alternatively, at constant intervals. For example, secondary content (such as Content Asset B) may have a splice point at both its beginning and end. Since splice points merely represent opportunities to splice, the dynamic content insertion application of the present invention may insert splice points regularly (e.g., once every second, or once every GOP), thereby enabling the CM 224, ADS 222 and ADM 220 to insert secondary content at any of the splice points which are determined to be appropriate.

In the illustrated example, an uninterrupted primary content asset (Program A) 508 is provided as a first content block 502. The uninterrupted block comprises primary content only and does not have secondary content inserted therein. However, it is appreciated that in an alternative embodiment, the content block may be received as an interrupted block (i.e., a content block having one or more secondary content insertion points therein). If the dynamic secondary content insertion application determines that secondary content should be inserted, as illustrated in FIG. 5, secondary content assets (e.g., Content Asset B 510 and/or Content Asset C 512) are inserted therein. As shown, Content Asset B 510 is inserted into Program A 508 at a first splice point 506a, thereby creating first and second program segments 508a, 508b. A third program segment 508c is created by the insertion of Content Asset C 512 at a second splice point 506b. In this manner, the programming content of Program A 508a will play out to a user, followed by Content Asset B 510; immediately following the termination of Content Asset B 510, Program A 508b will continue where it left off prior to the switch.

Figure 5A:
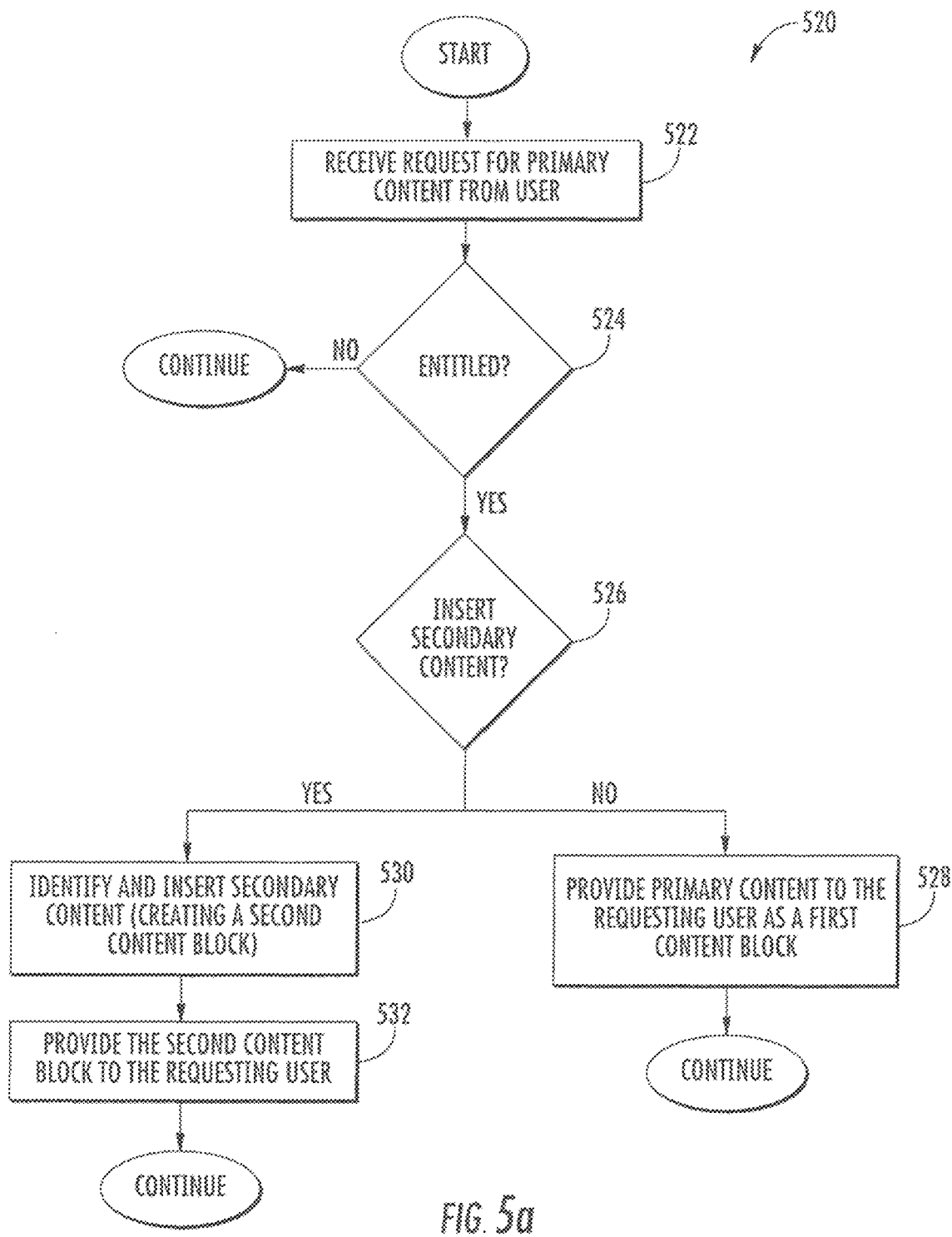
FIG. 5a is a logical flow diagram illustrating an exemplary method of providing secondary content insertion using the fill model of FIG. 5.

FIG. 5a illustrates an exemplary method 520 for secondary content insertion according to the fill model discussed herein. As shown, per step 522, a request for primary content is received from a user at the DNCS 218. Next, at step 524, it is determined whether the user is entitled to receive the content requested. In one embodiment, step 524 is determined utilizing the systems and methods discussed in co-owned, U.S. patent application Ser. No. 12/536,724 filed on Aug. 6, 2009 and entitled "SYSTEM AND METHOD FOR MANAGING ENTITLEMENTS TO DATA OVER A NETWORK", previously incorporated herein by reference, although other approaches may be used as well.

At step 526, the dynamic secondary content insertion application determines whether secondary content should be inserted into the requested primary content. If it is determined that secondary content does not need to be inserted, per step 528, the uninterrupted primary content block (first content block 502) is provided to the user. Alternatively, if it is determined that secondary content should be inserted, then, per step 530, secondary content is identified and inserted at one or more splice points 506 in the primary content.

In one embodiment, secondary content for insertion is identified via cooperation of the CM 224, ADS 222, and ADM 220 (discussed elsewhere herein). The dynamic secondary content insertion application provides information to the aforementioned entities regarding the number of available splice points (506a, 506b) in the requested primary content. In one embodiment, these splice points are created by the dynamic content insertion application. For example, the application may create splice points 506a, 506b at half hour intervals in the primary content, Program A 406. The CM 224, ADS 222, and ADM 220 may then use individual ones of these splice points to insert one or more secondary content assets.

Secondary content may be selected from a playlist of available secondary content targeted specifically to the user and/or the device. The playlist, in this embodiment, is created by the ADM 220 in response to receiving a message from the primary content server 206 having information identifying the requesting subscriber (such as by subscriber account, device identification, etc.) contained therein, and which may be made anonymous as previously described. The information identifying the subscriber is correlated to data warehouse (not shown) records which indicate various demographic, psychographic, firmographic, geographic and/or behavioral variables, etc. attributed with the given subscriber; other information regarding the devices may also be derived and utilized, as well as context information relating to the user (or the primary content itself). For instance, the user may have different usage models (e.g., "Work", "Home", etc.) corresponding to different contexts; the secondary content selected for insertion in these different use contexts may be different.

The ADM 220, ADS 222, and/or CM 224 use the subscriber (and/or device or context) specific information to select appropriate (e.g., targeted) secondary content for the playlist, and then make insertion decisions from the playlist. The insertion decisions may be based on various business-related rules as will be discussed elsewhere herein. For example, which one(s) of the secondary content are inserted may be dependent on one or more factors relating to the primary content, the subscriber, the type of delivery requested, the target device, etc.

Insertion of the secondary content (step 530) results in the formation of a second content block which is, per step 532, provided to the requesting user.

Additive Model—

FIG. 6 provides yet another model for secondary content insertion according to the present invention.

The secondary content additive insertion model may advantageously be used to add or insert secondary content as needed. The additive insertion model can be used to insert secondary content in a non-disruptive fashion into primary content which might not otherwise have secondary content inserted therein, and/or to increase the frequency of inserted secondary content such as according to user initiated interruptions. In this manner, a user receiving any content, on any device, in any network via and from any location may receive secondary content, including secondary content specifically directed to the user and/or device, at various points during the playback of content without disrupting the playback of the requested content in the manner the user intended. For example, a user requesting a movie on-demand over an IP network for delivery to their laptop computer may receive the movie with secondary content being inserted ahead of and behind the movie playback. Additionally, secondary content may be provided at one or more instances where that user pauses, stops, fast-forwards, and/or rewinds the playback of the movie content.

In one variant, the secondary content is the same secondary content that user would receive if the request had originated from the user's premises STB. In this manner, the MSO can ensure that demographic, psychographic, geographic, etc. information known about a subscriber is translated and utilized for the provision of any content to the subscriber via any network and/or device in a consistent and predictable manner.

As illustrated in FIG. 6, one or more segmented content assets are combined dynamically. New secondary content is placed at the beginning (such as Content Asset P 608) or at the end (such as Content Asset Q 610 and Content Asset Z 612) of a segment of primary content (such as Program A 606).

In the embodiment of FIG. 6, the determination to insert secondary content is made "on the fly". For example, a user viewing primary content may elect to pause or otherwise stop the program midstream (including for fast-forwarding, rewinding, or otherwise manipulating the content). In such a situation, the dynamic secondary content insertion application (and headend entities in association therewith) immediately determines whether to insert one or more secondary content assets therein.

According to one embodiment of the additive model, secondary content assets are placed into a playlist. For example, a single playlist can be created which is utilized for secondary content insertion regardless of the primary content and/or requesting devices. Alternatively, various playlists may be created; individual ones of the playlists may be created (e.g., as primary content is requested), based on information contained in the request and/or information regarding the requested content or requesting user/device, or their context. For example, the genre of the selected primary content may be used as a basis for selecting secondary content to add to a playlist. Alternatively (or in conjunction), metadata associated with the requested content may include descriptions of various aspects or attributes of the requested content, various segments thereof (akin to a "scene" approach in prior art DVDs), etc. For instance, metadata may indicate that a given requested movie has: (i) one or more car chase scenes; (ii) one or more romantic scenes; (iii) one or more airport-related scenes, and so forth. A playlist incorporating secondary content (e.g., advertising) relating to one or more of these topics (i)-(iii) could then be generated. Where contextual synchronization is possible (e.g., content references or splice points exist within the primary content associated with the various scenes having the aforementioned topical content), the playlist may be structured so that only certain advertisements are placed at certain points, so as to have contextual relevance. For instance, the aforementioned car chase scene may begin at a first time, and end at a second time, and have 3 splice points or content references associated therewith. Only advertisements contextually related to car chases (e.g., for sports cars, high performance tires, fuel, etc.) would be inserted at any of those three points (or any time coordinates between the start and end points) if the opportunity arose, such as a user pausing during the car chase scene and then restarting play.

The playlist, in another embodiment, is arranged according to a hierarchy. In other words, secondary content associated with certain sources is prioritized over other secondary content, in order to e.g., effect one or more business goals. For example, secondary content sources having paid higher premiums may have the secondary content associated therewith favored in the playlist (such as by being prioritized and/or placed more often therein) over those associated with other secondary content sources. As another option, the performance history of a given advertisement may be considered when ranking for the hierarchy; e.g., an advertisement that has experienced less pauses or tune-away events than another may be placed higher up within the hierarchy than the other advertisement.

The playlist may comprise metadata enabling the dynamic secondary content insertion application to locate and insert the identified secondary content assets. Alternatively, the playlist may comprise links to the content associated therewith.

In another embodiment, the asset playlist comprises an ordered list of segments, with each segment describing a range within a piece of content. The playlist according to this embodiment comprises both primary and secondary content. As will be discussed in greater detail below, in the instance the insertion of a particular secondary content asset fails, the entire playlist does not fail, but rather proceeds to display the next asset (whether primary or secondary content).

According to the present invention, the aforementioned playlists may be created on-the-fly, based on the settings of the on-demand service and addressability parameters. Once the addressability parameters are created they are assigned they quickly associated with a session at session setup time in order to assist in the decision making of an advertisement decision.

There are often adverse effects to the end-user if there are significantly different bit rates. Further, from a resource management perspective, it is difficult to have predictive knowledge of available bandwidth if the streams are constantly varying. In one embodiment, these adverse effects are avoided by capping the bitrates of the segments of a playlist at the highest bit rate so that from a planning perspective, it can be managed effectively.

Additionally, secondary content may be inserted at the beginning and/or ending of the playback of the selected primary content according to the additive model. Thus, the dynamic secondary content insertion application supports dynamic insertion of content segments at the beginning and/or at the end of another segment (including other secondary content segments). The secondary content may be inserted immediately, or when the user resumes playback of the primary content.

Figure 6A:
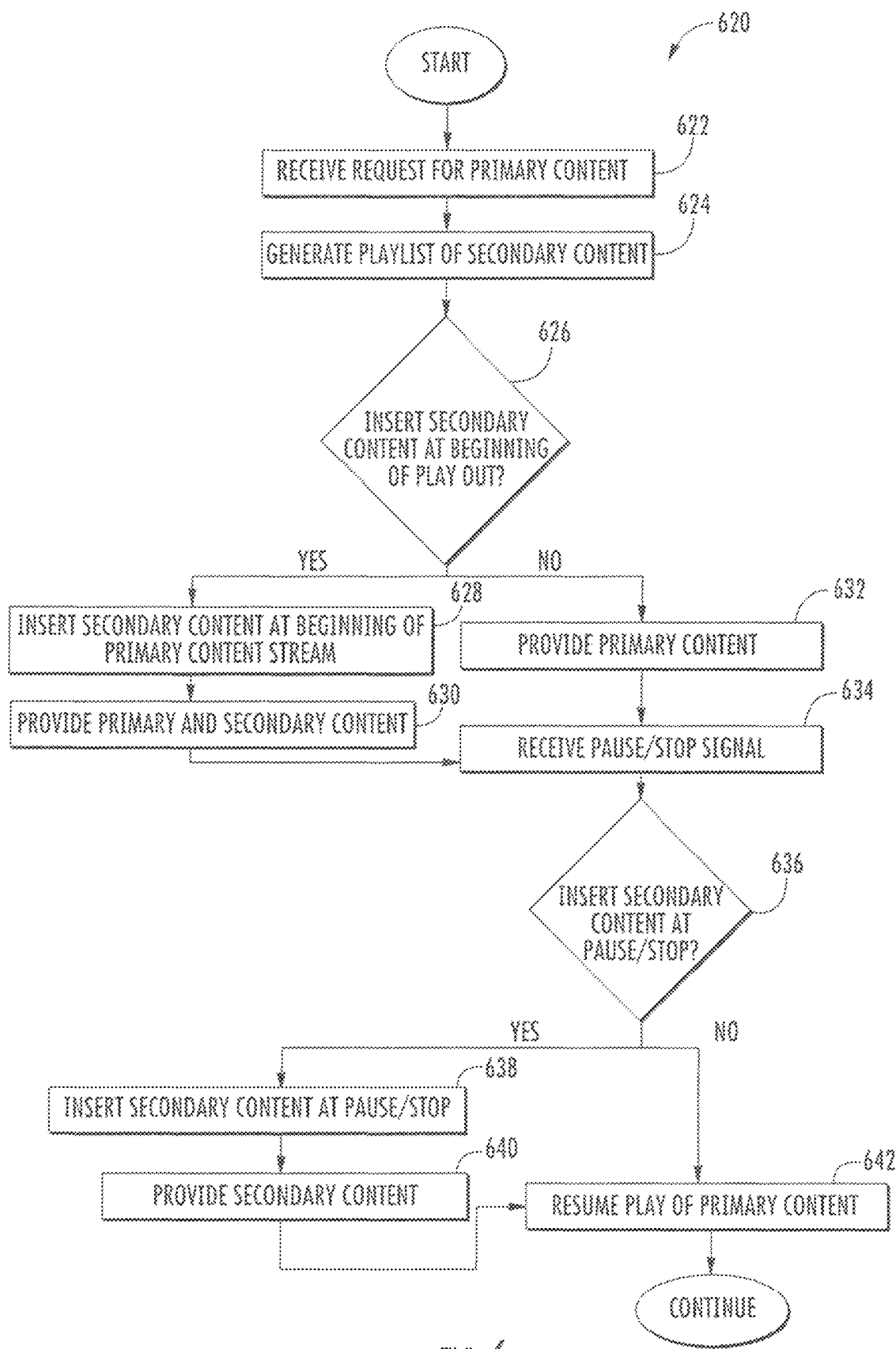
FIG. 6a is a logical flow diagram illustrating an exemplary method of providing secondary content insertion using the additive model of FIG. 6.

Referring now to FIG. 6a, one exemplary method 620 for secondary content insertion using the additive model is given. As shown, per step 622, a request for primary content is received. In one embodiment, the request comprises a request for VOD content from a user terminal. The request may be received at the primary content server 206 via the DNCS 218.

The DNCS 218 receives a message indicating the entitlements of the requesting subscriber to view the requested content in order for the content to be provided thereto. In one embodiment, this is accomplished via the "entitlements" approaches discussed previously herein.

As discussed previously, the primary content server 206 may, in response to receiving the request, send a message to the ADM 220 thereby triggering the creation of a playlist of secondary content (step 624). The message identifies the subscriber (such as by subscriber account, device identification, etc.), e.g., anonymously in order to enable the entities charged with identifying secondary content (e.g., the ADM 220, ADS 222, and/or CM 224) perform the selection based on what is known about the subscriber (such as by querying a data warehouse having records indicating demographic, psychographic, firmographic, geographic and/or behavioral variables) and/or the requesting device.

Per step 626 of the method, the dynamic secondary content insertion application determines whether content will be inserted at the beginning of play out of the requested primary content. Various business-related rules for this determination are discussed below. For example, whether secondary content is inserted may be dependent on one or more factors relating to the primary content, the subscriber, the type of delivery requested, the requesting device, the user context, etc. The secondary content may comprise for example advertisements, which are inserted at the beginning of the primary content. If it is determined that secondary content should be inserted at the beginning of play out of the requested content, then per step 628, at least one of the secondary content assets from said playlist is added ahead of the beginning of the primary content and, per step 630, the secondary and primary content are provided to the requesting user (the secondary content being inserted so as to play out prior to play out of the primary content). Alternatively, if it is determined that secondary content will not be inserted at the beginning of play out of the primary content, the primary content is merely provided to the user (step 632).

In either instance, during the playback of the primary content, a pause or stop command is received. The pause or stop command may be received from a user, such as for example by the user pressing a "pause" or "stop" button or function key on the user's remote control device associated with the display device for playing out the primary (and secondary) content, and/or on the display device itself A pause or a stop command may also be embedded within the primary content, such as at the end of the content or elsewhere therein (e.g., for a preprogrammed intermission). Hence, when the embedded command is reached, a signal is automatically generated and sent to the dynamic secondary content insertion application (e.g., running on one or more of the management entities 220, 222, 224, 210, 212). When the pause or stop command is received, the dynamic secondary content insertion application determines whether secondary content should be inserted (step 636).

If it is determined that secondary content is not to be inserted, then per step 642, the primary content will resume play out if any portion of the primary content remains to be played. In one embodiment, the play out of the remaining portion of the primary content does not begin until a signal is received to do so. For example, the user may select a "play" button or function key on his remote control device or display device, thereby indicating that the user is ready to resume viewing the primary content.

Per step 638, secondary content from the playlist is inserted at the pause/stop command if the dynamic secondary content insertion application detetinines that content should be inserted. Then, at step 640, the secondary content is presented to the user. Per step 642, subsequent to the presentation of the secondary content (step 640), the primary content resumes play if there is any portion of the primary content which remains to be played. As discussed above, the primary content may resume upon user selection (such as via a "play" button on the user's remote control or display device). In another embodiment, the primary content may resume playback after a predetermined number of secondary content assets have completed play, or a prescribed time period has elapsed.

Alongside the determination of whether secondary content will be inserted, the dynamic secondary content insertion application (or other entity in communication therewith) may also determine the number, types, and length of secondary content assets to be inserted. If a pause signal is received, the secondary content inserted may be a shortened form e.g., "clip" or in the form of a so-called "quick clip" (as discussed in previously incorporated co-owned U.S. Pat. No. 7,174,126 entitled "Technique for effectively accessing programming listing information in an entertainment delivery system"). If, on the other hand, a stop signal is received and/or if the program ends (and an automatic stop signal is received), the secondary content inserted may be longer format, and/or more than one secondary content asset may be inserted.

Additional models for secondary content insertion may be utilized in conjunction with the present invention as well, the foregoing being merely illustrative of broader principles.

User-Based Selection

In another variant of the invention, the aforementioned playlist of secondary content may be provided directly to the user. The user may then select the specific secondary content to receive from among the available secondary content. The playlist may be presented for example when a user selects a primary content element for viewing, or at some other time (e.g., when a user first starts up their CPE or display device). The selected secondary content will be displayed throughout the playback of the selected primary content at the appropriate secondary content insertion points (e.g., at the beginning, end, upon user-initiated interruption, or throughout according to splice points). Alternatively, the playlist may be presented at each instance of possible secondary content insertion, thereby ensuring that the viewer is present to view the presentation of the secondary content. In other words, when it is determined that secondary content should be inserted (either due to reaching one or more identified points in the content, or in response to the user's inputted commands), the user must physically select one of a plurality of possible advertisements. Optionally, the system may be configured to select an advertisement for the user if he/she does not make a selection within a prescribed time period.

Server—

FIG. 7 illustrates and exemplary content server 206 apparatus for use with the present invention. As illustrated, the server 206 generally comprises a network interface 702 for interfacing with the content delivery network 101, a processor 704, a storage apparatus 706 and a plurality of interfaces 708 for communication with other entities of the content and data distribution network 200. The other entities with which the content server 206 may be in communication as well as the content server 206 itself with may be located at a network headend 150. In one embodiment, as discussed above, the content server 206 comprises a VOD content server.

In the illustrated embodiment, the server comprises at least a dynamic secondary content insertion application 710 running thereon. Although illustrated as a single application running on the server 206, it is appreciated that the foregoing dynamic secondary content insertion functionality may comprise a distributed application running on a plurality of entities in data communication.

When a user establishes an on-demand session, or resumes a previous session, the server checks for updated content to place into the presentation stream. For instance, primary or secondary content may have a prescribed lifetime due to e.g., topical relevancy, and hence must be replaced periodically.

Appropriate permissions may be required for the dynamic secondary content insertion application 710 to assert controlling or management aspects with respect to the selection, insertion, and/or provision of secondary content to a client device. For example, the aforementioned management or control may require that the dynamic secondary content insertion application 710 be given appropriate permissions from the MSO.

In one example, the privileged or trusted application is configured to have appropriate permissions set up in the configuration tool to display playlist reports. In other words, the application 710 is a privileged or trusted application which is able to access the configuration tool and direct the display of the playlist reports. The configuration tool is used to register primary content (such as on-demand content) for the herein-described dynamic content insertion. In one embodiment, the configuration tool is run at (or associated with) the ADM 220. The configuration tool allows or controls which decision services can make decisions for a given OD service. Accordingly, the dynamic secondary content insertion capabilities may be controlled or managed at the ADM 220 via the configuration tool. Playlist reports show what activity (sessions, session composition, playout results, performance characteristics etc.).

The dynamic secondary content insertion application 710 may also have appropriate permissions to set up the ADS 222, ADM 220 and/or CM 224, and direct the ADS 222, ADM 220 and/or CM 224 to select secondary content for insertion.

The secondary content insertion application 710 may use the configuration method specified on the AS 214. In one embodiment, the AS 214 specifies whether the ADM 220 will determine secondary content insertion, or whether metadata of the primary content will determine secondary content insertion.

In operation, the dynamic content insertion application 710 at the server 206 is in communication with the AS 214 and ADS 222. When a user attempts to set up a session to receive primary content (such as on-demand content) from the content server 206, the AS 214 receives the user request and informs the application 710. In response, the application 710 queries the ADS 222 to determine the correct secondary content to associate with the requested primary content. The ADS 222 returns at least one appropriate secondary content asset and/or a playlist of appropriate secondary content assets as discussed above to the application 710. When the application 710 receives at least information identifying appropriate secondary content for insertion, the application 710 passes this information to back to the AS 214. The ADS 222 is the illustrated embodiment the "brains" for what secondary should be inserted; hence, it incorporates logic for making secondary content insertion decisions, although these may also be made in whole or part by other entities. In another embodiment, the insertion application 710 inserts the secondary content as appropriate, and transmits a content stream comprising the primary and secondary content to the AS 214 for subsequent delivery to the user.

Alternatively, the selection of secondary content for insertion may not be based on the primary content, but instead may be based on one or more other factors such as e.g., the subscriber or device identity, the advertisement zone, a time of day or time of year, or other business consideration as described elsewhere herein. Hybrids of the foregoing (i.e., considering both primary content and other factors) are also contemplated.

Thus, in the case of an on-demand session, prior to setting up the session, the AS 214 queries the dynamic secondary content insertion application 710 to determine the correct secondary content asset(s) to associate with that session (e.g., based on the selected primary content, and/or other factor). The ADS 222 then informs the application 710 of the correct secondary content asset(s) for insertion at the beginning of playout of the selected primary content.

Furthering the example, when a paused or stopped session is resumed (or when the pause signal is received), the AS 214 queries the dynamic secondary content insertion application 710 to determine the correct secondary content asset(s) to associate with that session. The ADS 222 then informs the application 710 of the correct secondary content asset(s) for insertion prior to resuming playback of the primary content after the pause or stop.

In another embodiment, as discussed above, a playlist of one or more secondary content assets may be generated and distributed to the content server 206 from which the content server 206 or the ADM 220 may select secondary content for insertion. The playlist may be delivered at e.g., the initiation of the on-demand session (thereby obviating the need for multiple messages to be sent between these entities as the user pauses/stops playback of the primary content). Alternatively, upon each instance of resuming playback of paused or stopped primary content, a new playlist may be provided.

An asset playlist of the types discussed herein above may include an ordered list of segments. The playlists may be created "on the fly" based on the settings of the on demand service and various addressability parameters. Exemplary addressability parameters may include e.g., demographics, geographies, or psychographies or basic attributes, such as "has internet" or "subscribes to HBO". These parameters are weighted as part of an advertisement decision (and/or complex campaign management system). The addressability parameters are typically assigned to the subscriber and "picked up" at session setup time and used to embellish or enhance the request to place an advertisement. In one embodiment, the playlists may comprise only secondary content. Alternatively, the playlists may include both entertainment content (EC) and non-entertainment content (such as advertisements). In the instance both EC and non-EC are listed in a playlist, certain steps must be taken to avoid the entire playlist to fail if there is a failure of any one of the non-EC content elements fails. In one embodiment, this may be accomplished by utilizing at least one mechanism to ensure the bitrate of the content remains substantially constant (allowing for a reasonable level variation). The bitrate may be capped at the highest bitrate of the segments. In another embodiment, this is accomplished by validating each of the segments placed into a playlist and if any non-critical segments fail or do not validate, they are omitted from the playlist.

It is appreciated that in some instances, secondary content may not be available for insertion at the time it is required. In one embodiment, if a secondary content segment is not available for insertion for any reason (e.g., it may have to be transrated/transcoded, may be damaged, the retrieval latency is too high, etc.), the primary content continues playing uninterrupted. Alternatively, a blank screen or frozen screen may be displayed, as in the case of secondary content insertion attempts at a pause/stop signal. If insertion of a secondary content segment is unsuccessful, the dynamic secondary content insertion application 710 may reattempt the insertion a prescribed number of times or over a prescribed time interval. Alternatively, the application 710 may forego reattempts, and default back to the aforementioned blank or frozen screen, or continue playback of the primary content. As yet another option, another secondary content element which is available may be substituted. Unsuccessful attempts to insert secondary content may be logged by the secondary content insertion application 710, and reports generated from the failure logs if desired. Similarly, the application 710 may be configured so that it will not attempt a reinsertion of the "failed" secondary content again without further operator intervention (i.e., sequester the failed content).

In one implementation, the ADS 222 is able to process at least 100,000 queries per second from the secondary content insertion application 710. Likewise, the application 710 is also able to process at least 100,000 queries per second from the AS 214, and process at least 100,000 responses per second from the ADS 222. This assumes that the AS 214 can support 100,000 session set-up requests per second, and process at least 100,000 responses per second from the secondary content insertion application 710. This capability allows the ADS/AS to service large portions of an MSO or other content distribution network from a single, centralized location if desired, and make secondary content selection and insertion effectively transparent to the user in terms of latency.

In another implementation, when the ADS 222 receives a request for secondary content information, the ADS 222 responds to the request within 10 milliseconds and when the application 710 receives a request from the AS 214, it responds within 20 milliseconds. The expectation is that there will be minimal impact to the overall session setup process (i.e., little or no additional delay). Hence, these times are selected as the upper bounds of what would be considered "end-user impacting".

The secondary content insertion application 710 is further responsible for directing the insertion of secondary content at user-invoked pauses. In one embodiment, the application 710 establishes a time frame within which a secondary content asset should be output to a user after the user initiates the pause (such as via a remote control or display device). When the viewer re-initiates playback of the primary content, display of the inserted secondary content is terminated, and display of the primary content resumes. Alternatively, in another implementation of the invention, the secondary content is not inserted and played until the user initiates playback of the primary content.

As noted above, the primary content may also be used in conjunction with so-called "start over" content (as described in previously incorporated co-owned, co-pending U.S. Patent Publication No. 2005/0034171 entitled "Technique for delivering programming content based on a modified network personal video recorder service"). As discussed therein, the start-over content may comprise primary content which was originally broadcast "live" to users with secondary content inserted therein. Start-over content uses local advertising zones (so called "ad zones") to allow for targeted advertising to reach a specific, limited geographic area. Hence in the original broadcast, there are several defined breaks in the programming where local advertisements were inserted into the content stream. According to the present invention, these breaks may be reused for insertion of alternate secondary content by the dynamic secondary content insertion application 710. The alternate secondary content assets may be selected for instance based on the aforementioned ad zones. For example, when the real time acquisition (RTA) entity starts, it determines the ad zone associated with the correct service group of the requesting user. This allows the correct zoned version of the recording to be played back, so the viewer sees the correct local secondary content. In this manner, national start-over content may be collected and distributed to users with local advertisements. In one embodiment, the RTA entity is disposed within the Mystro acquisition platform (such as the AS or Mystro entity) and is advantageously utilized to enable delivery of start-over and look-back content. The RTA schedules and creates content objects, and manages the content on the video platform as it relates to products like start over.

A so called "parent zone" for each of the ad zones may be given to replace the ad zone of a request in instances where secondary content is not found for the ad zone from which a request for start-over content is received.

A portion of the dynamic secondary content insertion application 710 may be utilized for generating and delivering information to the users regarding the primary and secondary content. In one embodiment, this information is presented in the form of a banner which is displayed on the user's display device. The banner may e.g., be displayed across the bottom of the user's screen and/or may be opaque so as to avoid substantial disruption to the user's viewing experience. The banner may display the length of the session including all inserted or appended content segments. In other words, the secondary content insertion decisions may be made prior to any content is provided to the user; in this manner, the dynamic secondary content insertion application 710 can calculate the total running time and, at time of presentation, present the running time in the banner. This embodiment may be useful, for example, to correct inaccuracies in the progress banner which result from the addition of secondary content to the entertainment content. Additionally, the method would be useful if the overall duration of what was communicated as part of the primary content is shortened. For example, suppose primary content is 1 hour in duration, and 2 minutes of "pre-roll" advertising are added and 5 minutes of "mid-roll" advertising are added, so that the total duration is 1 hour and 7 minutes. Unless the banner is updated, the user may mistakenly believe the content is 1 hour in duration (based on the primary content).
Exemplary Trick Mode Operation—

The dynamic secondary content insertion application 710 further cooperates with per-segment trick mode operations. In other words, the application 710 uses a navigator application (e.g., a version of the Mystro Digital Navigator (MDN) and OCAP Digital Navigator (ODN) provided by the Assignee hereof) which supports trick modes within individual content segments. The secondary content inserted via the insertion application 710 also complies with the aforementioned trick mode requirements.

Optionally, trick mode operation may be limited to certain times within each of the primary and/or secondary content segments. Accordingly, the primary and secondary content may include metadata describing time periods within the primary and secondary content during which trick modes are allowed. For example, one or more trick modes may be disabled throughout the entirety of secondary content playback, so as to prevent a user from fast-forwarding through commercials. One or more time-based segments may be associated with a single content asset. Time-based segment descriptors may then be used to determine which trick modes are allowed in each time segment associated with the asset. Alternatively, the content assets may not be associated with any time-based segments and/or descriptors. In one embodiment, the per-segment trick mode control information is made available to the client application (discussed below) in the CPE 106 on a per-session basis. In other words, when a session is established for transmitting primary and secondary content to the user, the content insertion application gathers the trick mode control information, and provides this information to the CPE 106. The user may also be informed of the trick mode control information associated with that session, such as via an information screen, window or banner display, which may be initiated with the user's input (e.g., only shows when the user attempts a prohibited function).

The time-based segments associated with the content assets, in one embodiment, also include information describing the segments. For example, the descriptive infoiination may include information indicating the segment type, segment controls (e.g., trick mode permissions), segment normal play time (NPT), start time (in milliseconds), and the segment duration (in milliseconds). The NPT is a time code in the MPEG stream that allows for synchronization.

The segment types may be identified for example as primary content (e.g., entertainment content), secondary content (e.g., advertisement content), "pause advertisement" and/or other trick mode type (e.g., "trick mode enabled advertisement", "trick mode disabled advertisement", etc.). The aforementioned segment controls specify whether fast forward, rewind, pause, etc. functions are enabled or disabled for each time based segment. In one embodiment, certain trick mode operations are disabled or enabled depending on one or more characteristics of the requesting subscriber and/or device. For example, a subscriber having a lower tier or "basic" level subscription may be disallowed to invoke any trick mode operations (such as during primary and/or secondary content play). Alternatively, if a device is unable to perform the trick mode, the trick mode operation will be specified as disabled in the segment controls. However, it is appreciated that the stop function may be constantly enabled; i.e., there will be no disabling of the stop function for any segment.

For on-demand assets, certain segment controls are not available; hence, they are listed as disabled in the segment controls. These include: "frame-by-frame forward", "slow motion forward", and "instant replay".

As discussed above, the segment control descriptors are configured to assign per-segment trick mode controls based on service level. Any asset associated with a given service that has not been assigned trick mode controls will have the trick mode controls of the service level applied thereto. Thus, unless an asset's trick modes are defined elsewhere, the trick mode functionality will be defined based on the service level of the requesting subscriber.

In another embodiment, segment trick modes are assigned on a per-product basis. All the assets associated with a given product (such as MOD, SVOD, FOD, etc.) are given the same trick mode control profile (e.g., the set of trick modes enabled and/or disabled).

The segment trick modes may also be applied on a per-provider basis. All assets from a given provider may be given the same trick mode control profile.

In yet another alternative, the trick mode controls may be established on a per-asset (e.g., per primary content element, such as a movie) basis. That is to say, each asset may have a different set of enabled/disabled trick modes regardless of the product, provider, etc. In this manner, different assets associated with the same service, product, or provider may have different trick modes enabled for different assets associated with that service.

A hierarchy may also be established, by which it is determined which trick mode profile will control for a given asset. In other words, in certain instances, a set of trick modes may be associated with the requesting subscriber's subscriber level, further trick mode controls may be established based on the provider, type, service or other characteristic of the asset. In one embodiment, the asset-based trick mode controls take precedence over the service level controls. If no asset-based trick mode controls have been applied to a particular asset, the service level segment trick mode controls are utilized. If no service level segment trick mode controls have been assigned to the asset, then all trick modes may be enabled for example, or a default profile having some restrictions may be applied. This hierarchy can also be applied only for restrictions; i.e., if no trick mode function restrictions are applied at the asset level, the service level is checked. If no segment trick mode controls have been assigned to an asset, then a default profile enabling all trick modes is utilized. It is appreciated that other default profiles may be utilized as well, including profile having one or more disabled trick modes. If an asset is associated with a per-segment trick mode descriptor which has been assigned by the ADS 222, then this descriptor will in one variant take precedence over any asset- or service-level descriptors.

A "forced service level override" function may be assigned per-asset, and defined in the asset level trick mode controls. The forced service level override function identifies whether the asset level trick mode controls are able to take precedence over the service level controls.

As will be discussed in greater detail below, an application running at the client device is configured to receive and honor the per-segment trick mode controls. As noted previously, if a particular asset is not associated with any time base segment descriptors, then a default trick mode profile is utilized (in one embodiment enabling all trick modes).

A given session may utilize more than one time-based segment. In such an instance, it is appreciated that if a given trick mode is disabled in any one of the time base segment descriptors in the session, the trick mode may be disabled for the all of the segments in that session. For example, a session is associated with three time based segment descriptors, and fast forward is disabled in one of those segments then fast forward is disabled for the entire session. Hence, a "most restrictive" type of model is applied, wherein the most restrictive policies associated with one segment are applied to all segments, so as to maintain a consistent user experience. It is noted, however, that a "least restrictive" model may also be applied if desired (i.e., if one of the three aforementioned segments is not restricted compared to the other two, the least restrictive policy may be extended to the other two segments, again maintaining consistent user experience.

If fast-forward is enabled for a given segment (which may include various levels or speeds of FF, such as "slow FF", "fast FF", and "skip FF" which provide progressively faster capabilities), the user is able to fast-forward the content associated with that segment, and/or jump forward through the content associated with that segment. If fast-forward is disabled for a given segment, then the user is not provided such capability.

If rewind is enabled for a given segment (which again may have multiple levels or speeds), the user is able to rewind the content associated with that segment, and/or jump backwards through the content associated with that segment. If rewind is disabled, then the user is not provided these capabilities.

If pause has been enabled for a given segment, then the user is allowed to pause the playback of that session during the segment where pause is enabled. If pause is disabled, the user is not able to pause the playback of the session. If the user invokes the pause function during playback of the session, the user is presented in one embodiment with several options including at least the ability to (i) resume playback of the session from the pause location, (ii) exit the session, and/or (iii) re-start the session from the beginning (where possible).

The stop function enables a user to stop the playback of a session. In one embodiment, the stop function is always enabled. When the stop function is invoked by the user, the user is in one embodiment presented with several options including the at least the ability to (i) resume the playback of the session (if possible), (ii) exit the session, and/or (iii) re-start the session (where possible). If a user has stopped the playback of a session during a segment that has the pause function disabled, then the user is not presented with an option to resume the playback of that session. This requirement ensures that the stop/resume combination cannot be used as an alternate way to access the pause functionality during segments when pause has been disabled.

If the user attempts to invoke a trick mode (such as fast forward, forward jump, rewind, backward jump, etc.) which is disabled, the user will be presented an on-screen indication that the selected trick mode is not allowed. In one embodiment, the on screen indicator is presented as a banner display or window. Alternatively, the indicator maybe displayed apart from the banner, but for the duration of the channel banner display timeout. There is no on-screen indication when a user invokes a trick mode which is enabled, although such display can be included if desired.

If the user tunes away from an in-progress on-demand session playing on a dedicated on-demand channel (e.g., selects another numerical program channel via the EPG/remote), then the session is paused, and the standard on-demand session pause timeout parameters are applied. The pause timeout parameters are configurable, and in one embodiment are set to 20 minutes. If the user then returns to the dedicated on-demand channel while the session is still paused, the user is presented with the option to resume playback of the session. If the session pause has timed out, then if the user returns to the dedicated on-demand channel, the user is presented with a standard entry screen for that dedicated on-demand channel.

Data Collection

As viewers interact with on-demand programming, events such as remote or CPE button presses or function invocations are captured. To accomplish this, the end-user's interactions with the CPE client software are communicated to the VOD system; the VOD system reports on a per-session basis these user events. Each user event is in one embodiment referred to as a placement status events (PSN).

The captured information is transmitted to one or more of the above-referenced data collection entities, and may be used later in report generation, and/or to assist in selecting content for insertion. For example, one or more patterns regarding a user or device may be "learned" from the users' button presses and other actions taken with respect to content as discussed in co-owned, co-pending U.S. patent application Ser. No. 12/414,576 filed on Mar. 30, 2009 and entitled "RECOMMENDATION ENGINE APPARATUS AND METHODS", which is incorporated herein by reference in its entirety. As discussed therein, the learned patterns can be used to identify and recommend content targeted to a particular user (or group of users) within a content-based network, such as a cable television or satellite network. Content may then be selected to align with a user's preferences (the latter which the viewer need not enter manually). In another aspect, the client applications discussed above are implemented by a network-based entity such as a hub or headend server adapted to perform the above-described functions for a variety of user profiles (e.g., individual user profiles, or user accounts) simultaneously.

In one example, if it appears that the user often fast forwards through sports-related advertisements, but will view advertisements for family programming, a recommendation engine (not shown) will assist the ADS 222 in selecting content for insertion that is related to family programming and/or family related events (such as theme parks, children's or family movie trailers, etc.).

Targeted Secondary Content Insertion—

As noted above, in one embodiment, inserted secondary content may be specifically targeted to the user, context, and/or device from which a request is received, as well as the primary content requested. Information may be obtained, for example, relating to the geographic location, advertisement zone, demographics, or psychographics of the subscriber. Information may be obtained regarding the geographic location, capabilities, etc. of the device as well. Still further, the secondary content may be logically related to the context of the primary content. For example, sports-related primary content may invoke the insertion of sports related advertisements. The user context may also be exploited; i.e., knowing that a user is at work or their primary home or their vacation home may each trigger selection of different secondary content.

For example, the apparatus and methods discussed in co-owned, co-pending U.S. patent application Ser. No. 11/198,620 filed on Aug. 4, 2005 and entitled "METHOD AND APPARATUS FOR CONTEXT-SPECIFIC CONTENT DELIVERY", which is incorporated herein by reference in its entirety, may be utilized consistent with the present invention. As discussed therein, contextually-related "secondary" content (e.g., advertising messages, useful informational links, etc.) may be provided in association with other primary content selected by the user. In one exemplary embodiment, the secondary content is selected at least in part based on metadata associated with the primary content. The metadata may be provided by, e.g., the content originator or the network operator, and is sent to a network entity (e.g., advertising server) which returns contextually specific advertising matching the search terms. In one variant, the search term is simply one or more keywords drawn from the metadata and used as an input to a search engine. In another variant, more sophisticated analysis of the metadata is performed so as to ostensibly reduce the number of irrelevant or marginally relevant "hits" returned by the search engine/advertising server.

The apparatus and methods discussed in co-owned, co-pending U.S. patent application Ser. No. 11/441,476 entitled "SECONDARY CONTENT INSERTION APPARATUS AND METHODS", previously incorporated herein, may be utilized to further provide secondary content insertion. As discussed therein, secondary content may be inserted dynamically (e.g., replacement of dated or geographically inappropriate advertisements or promotions), thereby allowing the MSO or other network operator to adjust the secondary content to make it more applicable to the remote user's context (e.g., location, hardware/software environment, date/time, etc.).

Still further, the methods and apparatus discussed in co-owned, co-pending U.S. patent application Ser. No. 12/503,710 filed Jul. 15, 2009 and entitled "METHODS AND APPARATUS FOR TARGETED SECONDARY CONTENT INSERTION", which is incorporated herein by reference in its entirety, may be utilized as well. This embodiment is particularly useful in targeting content to a set of subscribers, such as those serviced by a local service node. As discussed therein, content targeted to a particular audience within a content-based network may be identified and inserted. For instance, the content is identified by analyzing audience or viewer qualities (i.e., psychographic, geographic, or demographic, characteristic or classifications) at a particular insertion opportunity using an advertisement management system (and associated advertisement decision maker process). The audience information can in one embodiment be gathered in real-time directly from users' CPE (i.e., set top boxes, cable modems, PC, etc.), thereby allowing information to be gathered which is specific to actual content viewers. Historical or other information relating to particular subscribers (or subscribers in general, or even the broader general population) may also be utilized in characterizing an audience. The advertisement management system then uses the gathered audience information to correlate particular advertisements or other content thereto. In one variant, an algorithm is used to analyze audience qualifiers (i.e., attributes of an audience or its behavior), and determine the "proximity" of a given audience (e.g., that currently viewing a program where an impending placement opportunity will occur) to a set of audience qualifiers of a target audience of an advertisement. The placement opportunity can then be optimized for one or more variables (e.g., proximity, revenue, impressions, etc.) by selecting the best fitting advertisement for that opportunity.

The aforementioned methods and apparatus can advantageously provide content across multiple delivery platforms utilizing substantially extant network infrastructure and components compatible with a number of different client device and delivery systems including both wired and wireless technologies.

Subscriber privacy and anonymity is also optionally maintained via e.g., hashing or encrypting data relating to the CPE and/or subscriber (as discussed below), thus ensuring that stored data is not traceable to a specific user account. In alternative embodiments, only infoimation designated by a consumer is eligible for content collection and/or analysis. In this manner, subscriber privacy is effectively safeguarded, and user control of their private information (including for example preferences or user profile) is protected as well.

The primary and secondary content can also be manipulated to perform all relevant advertising foiiiiats and schemes (e.g., bookends, replacement, pause, telescoping, etc.) on the content transferred by the network or from other content source. See, e.g., co-pending and co-owned U.S. patent application Ser. No. 10/662,776 filed Sep. 15, 2003 and entitled "SYSTEM AND METHOD FOR ADVERTISEMENT DELIVERY WITHIN A VIDEO TIME SHIFT- ING ARCHITECTURE", incorporated herein by reference in its entirety, which describes exemplary methods and apparatus for implementing the foregoing (and other) schemes and formats within the context of a content-based network.

Enhancement Model—

In another embodiment, the primary content and/or secondary content discussed herein may comprise so-called "enhanced content" as discussed in co-owned, co-pending U.S. patent application Ser. No. 12/582,653 filed Oct. 20, 2009 and entitled "METHODS AND APPARATUS FOR ENABLING MEDIA FUNCTIONALITY IN A CONTENT-BASED NETWORK", which is incorporated herein by reference in its entirety. As discussed therein, the secondary content and/or primary content may comprise one or more user-interactive media features or applications. In one particular implementation, various of the foregoing interactive "media" applications are disposed at one or more headend entities; also provided is a servlet application which facilitates communication between the various applications and one or more client applications resident on the user's premises system. In this manner, a user at his/her premises or client device, may access and interact with various ones of the applications in an integrated fashion.

In another implementation, individual ones of the interactive applications are in communication with an internet (e.g., Internet) host server in order to obtain data therefrom via a gateway device located at e.g., the headend of the network. In other words, the gateway device requests and receives internet data and/or content from the host servers on behalf of the media application(s). The data and/or content is then processed as required and, via the servlet, delivered to one or more client devices. For example, the content may be de-encapsulated from a first container format, and re-encapsulated into a second format for delivery to the client device. The content may also optionally be transcoded and/or transrated if desired. The servlet application may serve as a proxy for various ones of the applications which utilize a different content format than the client device. The servlet application will refer the client device (such as by the SIP REFER method) to a media application which utilizes the same content format as the client device. For example, if the media application provides standard HTTP APIs, then the client device may communicate directly therewith.

In another embodiment, one or more of the interactive media applications is configured to utilize the Enhanced TV Binary Interchange Format (EBIF). Further, the client application running on the client device(s) may comprise an EBIF user agent. The user agent enables a user of the client device to view and interact with various EBIF pages of the particular media application(s) of interest.

One of the exemplary interactive media applications is a search application, which enables a user to search the internet for data relating to displayed program or advertising content. For example, the user may use the search application simultaneous with the playing of a commercial for a restaurant to find the nearest location and/or directions, or other information about the restaurant (such as reviews, Zagat™ rating, etc.).

Another media application useful in various embodiments of the present invention is a real-time web-based micro-blogging application, which enables a user to post, view and navigate micro-blogs from the user's CPE (e.g., set top box or converged media device) simultaneously with viewing programming and advertising content.

Yet another media application useful with the invention is a so-called "request for information" or RFI application. In one embodiment, the RFI application enables the user to select to receive additional information about a product or service, such as via a "telescoping" function discussed in co-owned, co-pending U.S. patent application Ser. No. 12/284,757 filed on Sep. 24, 2008 and entitled "METHODS AND APPARATUS FOR USER-BASED TARGETED CONTENT DELIVERY", which is incorporated herein by reference in its entirety. As discussed therein, exemplary methods and apparatus are configured to correlate the content of the secondary content and the content of the contemporaneous primary content via metadata, thereby placing the advertisement or promotion "in context". Additionally, the correlation may be "fine tuned", such as based on the subscriber demographic data. At yet a further level of precision, the metadata in the primary content and/or secondary content can be provided with a timing index or other reference and further information (e.g., descriptive codes) that allow for precise placement of the secondary content within a program stream for maximum efficacy.

Anonymity—

As noted above, certain collected data may be particular to or identified with a particular subscriber, user, or user device. Accordingly, such data may be anonymized by inter alia, the use of a cryptographic hash to protect the privacy of the identified subscriber, user, and/or device. In one embodiment, the techniques for providing anonymity utilizing a cryptographic hash described in U.S. patent application Ser. No. 11/186,452 filed Jul. 20, 2005 and entitled "METHOD AND APPARATUS FOR BOUNDARY-BASED NETWORK OPERATION", which is incorporated herein by reference in its entirety, may be utilized in conjunction with the present invention. As disclosed therein, the identity of a CPE or subscriber is anonymized by using a cryptographic hash coupled with an optional "opaque" variable which carries information relating to the CPE of the hash with which it is associated. The hash and opaque variable frustrate de-encryption or reverse-engineering of the individual subscriber's identity or specific location. Alternative methods of providing anonymization may also be utilized consistent with the present invention.

Exemplary CPE—

FIG. 8 is a block diagram of one exemplary embodiment of the CPE 106 discussed above. In the illustrated embodiment, the exemplary CPE 106 includes a network interface 802, a processor 804 and associated storage 806, and a plurality of back end interfaces 808 for communication with other devices.

The illustrated CPE 106 can assume literally any discrete form factor, including those adapted for settop/desktop, hand-held, or wall-mounted use, or alternatively may be integrated in whole or part (e.g., on a common functional basis) with other devices if desired.

It will also be recognized that the CPE configuration shown is essentially for illustrative purposes, and various other configurations of the CPE 106 are consistent with other embodiments of the invention. For example, the CPE 106 in FIG. 8 may not include all of the elements shown, and/or may include additional elements and interfaces such as for example an interface for the HomePlug A/V standard which transmits digital data over power lines, a PAN (e.g., 802.15), Bluetooth, or other short-range wireless interface for localized data communication, etc.

The network interface 802 of the illustrated CPE 106 receives content and/or data. In one embodiment, the network interface may comprise one or more RF tuners configured to receive content from an HFC network 101. The RF tuner(s) may comprise traditional video RF tuner(s)

adapted to receive video signals over, e.g., a QAM. For example, the RF tuner(s) may comprise one or more tuners, a demodulator, decryption module, and demultiplexer of the type well known in the art, although other configurations may be used. A wideband tuner arrangement such as that described in co-owned and co-pending U.S. patent application Ser. No. 11/013,671 entitled "Method and Apparatus for Wideband Distribution of Content" filed Dec. 15, 2004 and incorporated herein by reference in its entirety, may also be utilized, such as where the content associated with one or more program streams is distributed across two or more QAMs. Additionally, the RF tuner(s) may incorporate functionality to modulate, encrypt/multiplex as required, and transmit digital information for receipt by upstream entities such as the CMTS.

Alternatively, the network interface 802 may comprise any other means for receiving content from a network. Digital data received via the network interface 802 may include for example MPEG-2 encoded programming data that is forwarded to a television monitor via a video interface. Programming data may also be stored on the CPE storage unit 806 for later distribution by way of the video interface, or using a Wi-Fi interface, Ethernet interface, Firewire (IEEE Std 1394), USB/USB2, or any number of other such options.

In another embodiment, the CPE 106 may further comprise a cable modem (CM) of the type known in the art, including one or more tuners configured to tune to DOCSIS QAMs. In this fashion, and content or data normally streamed over the CM can be received and distributed by the CPE 106, such as for example packetized video (e.g., IPTV). In accordance with the exemplary embodiment of the invention, the DOCSIS cable modem may also be utilized for delivery of traditional broadband Internet services. As discussed elsewhere herein, content and/or data sent to the CPE 106 will only be presented to those subscribers having appropriate rights to receive the data/content.

Programming and other types of data including pictures, video, music or MP3 files, software applications, metadata files, etc. may also be received by way of the various digital interfaces in the CPE 106. These data may be stored locally (e.g., in the CPE storage unit 806) or even on a device or network agent in communication with the CPE 106, for later use by a user as is discussed in co-owned U.S. patent application Ser. No. 11/378,129 entitled "METHODS AND APPARATUS FOR CENTRALIZED CONTENT AND DATA DELIVERY", previously incorporated herein.

The CPE 106 mass storage device 806 of the illustrated embodiment comprises a Serial-ATA (SATA) or Ultra-ATA (also known as Ultra-DMA, or ATA-4/5/6/7) hard disk drive for the operating system and content storage of at least 500 GB, although higher capacities and even RAID arrays may be used for this purpose. The CPE 106 hard disk is preferably removable without the need for tools, and the CPE 106 is also configured allow for an external USB (e.g., USB 2.0) drive or other easily removable storage device to be attached and automatically added to the existing storage. It will also be appreciated that USB keys of the type well known in the art can be used consistent with the USB port(s) of the CPE 106, so as to make the data storage device highly mobile and of very small size.

During operation of the CPE 106, a client application 810 (located in the storage unit 806) is run on the microprocessor 804. The client application 810 facilitates the secondary content insertion discussed herein by providing information regarding the subscriber/user and/or device to the insertion entities discussed above. For example, the client application 810 may provide subscriber account information upstream in order for the ADS 22 (and other entities) to identify the subscriber and provide content based on what is known (at the headend) about the subscriber. In addition, the client application 810 may be configured to collect information regarding the user's actions with respect to content. For example, the client application 810 may record button presses, playback events, trick mode events, etc. and pass this information to the ADS 222 and other headend entities.

In another embodiment, the aforementioned secondary content insertion entities (e.g., ADS 222, etc.) may provide the playlist of available secondary content and/or the secondary content itself directly to the CPE 106 for storage thereon. The client application 810 in this embodiment may be configured to dynamically cause insertion of the provided secondary content upon the occurrence of a particular event. For example, the client application 810 may insert secondary content when the user pauses or otherwise stops playback of requested content. Such mechanisms may utilize the methods discussed above with respect to FIGS. 6 and 6*a* above. The client application 810 may insert secondary content from the provided secondary content. Alternatively, the client application 810 may utilize metadata of the provided playlist to request secondary content for insertion from the headend; once received, the client application 810 may insert the content as discussed above.

In one embodiment, the CPE 106 may be further adapted to perform de-encapsulation/re-encapsulation of content where necessary as is disclosed in U.S. patent application Ser. No. 12/582,619 entitled "GATEWAY APPARATUS AND METHODS FOR DIGITAL CONTENT DELIVERY IN A NETWORK", previously incorporated herein. In this embodiment, the CPE 106 is adapted to processes content from a first media file container format to one or more second media file container formats which are compatible with the CPE 106 capabilities or with the capabilities of other CPE 106 in communication therewith.

In another aspect, the CPE 106 of the present invention may be also compatible with the methods and apparatus disclosed in U.S. patent application Ser. No. 11/363,578 filed Feb. 27, 2006 and entitled "METHODS AND APPARATUS FOR SELECTING DIGITAL ACCESS TECHNOLOGY FOR PROGRAMMING AND DATA DELIVERY", which is incorporated herein by reference in its entirety. Specifically, a plurality of CPE 106 (electronic devices such as set-top boxes, PMDs, etc.) containing one or more hardware and software functions or modules are used; the hardware and software functions/modules of the different CPE 106 on the network contain various capabilities and options, including conditional access capabilities, video coding or compression capabilities, encryption schema, and network interfaces. These capabilities may be utilized by the content server 206 as a basis for determining which conditional access, coding, encryption, and/or network interfaces to utilize for delivery of content to each particular CPE 106. The CPE 106 of the present invention can accordingly be equipped with such capability if desired in order to, inter alia, profile the CPE 106 for tailoring content or other functions (e.g., CA) to that specific CPE 106 environment. For example, if the CPE 106 (or any of its connected "client devices") has only an MPEG-2 decoder, only MPEG-2 encoded content would be sent to that CPE 106 (or passed on to the client devices), or alternatively the CPE or devices would obtain the necessary codec (e.g., MPEG-4 or Real) from another source, such as an MSO or third party.

Business/Operational Rules Engine—

In another aspect of the invention, a so-called "rules" engine may be disposed at e.g., the ADM 220, ADS 222, CM 224, CPE 106, or other location (e.g., rendered as one or more computer programs disposed thereon). This engine comprises, in an exemplary embodiment, one or more software routines adapted to control the secondary content insertion process in order to achieve one or more goals relating to operations or business (e.g., profit). Included within these areas are network optimization and reliability goals, increased maintenance intervals, increased subscriber or user satisfaction, increased subscription base, higher profit (e.g., from increased advertising revenues, more subscriber "views" of given content, higher data download speed, increased bandwidth and responsiveness to changing demands for bandwidth, reduction of undue QAM replication, and so forth.

These rules may comprise a separate entity or process, and may also be fully integrated within other processing entities (such as the applications running on the aforementioned entities and/or the client application 810), and controlled via e.g., a GUI displayed on a device connected to the relevant server or CPE. In effect, the rules engine comprises a supervisory entity which monitors and selectively controls secondary content insertion operation at a higher level, so as to implement desired operational or business rules. The rules engine can be considered an overlay of sorts to the more fundamental algorithms used to accomplish required network operation, such as IP address assignment, secondary content selection and insertion, statistical multiplexing, BSA switching, and so forth.

For example, the ADM 220, ADS 222, CM 224 or CPE 106 may invoke certain operational protocols or decision processes based on information or requests received from the CPE 106, conditions existing within the network, demographic data, geographic data, etc. However, these processes may not always be compatible with higher-level business or operational goals, such as maximizing profit or system reliability. Hence, when imposed, the business/operational rules can be used to dynamically (or manually) control the selection and/or insertion of secondary content. The rules may be, e.g., operational or business-oriented in nature, and may also be applied selectively in terms of time of day, duration, specific local areas, or even at the individual user level (e.g., via specific identification of the CPE or client device via TUNER_ID, IP address, MAC address, or the like, or via a user-based login or "entitlements" profile).

For example, one rule implemented by the rules engine may comprise providing secondary content from certain secondary content sources according to a tiered system. Secondary content under such an approach might be selected in part on the revenue such insertion will bring to the MSO based on the secondary content source.

Alternatively, historical "performance" of a given secondary content element may be considered, irrespective of source. For instance, each of a plurality of secondary content sources may have playlists comprising several advertisements. However, the selection of a given advertisement from the playlist may also consider whether an advertisement has historically received a disproportionate number of tune-away or pause events during the playout thereof (i.e., indicating users are not interested in the advertisement).

Other metrics of performance may be used as well, such as one relating to MSO revenue or profit per unit time of play. For instance, it may be that insertion of two (2) advertisements of 15 seconds each would (based on historical data) produce a greater revenue or profit for the MSO (or content source) than a single advertisement of 30 seconds.

Two or more secondary content elements may also be selected in coordinated or "ganged" fashion so as to meet one or more desired business goals. For instance, in the case of the previous example of a primary content element (e.g., movie) having a car chase scene, it may be that there are splice points or insertion opportunities at either end of the segment containing the car chase scene. Hence, one secondary content selection model might comprise selection of two car-related advertisements for these two insertion opportunities, thereby sotensibly enhancing the contextual relevance of the advertisements to the primary content.

As another example, the selection algorithms may be configured to purposely select, or purposely avoid, placement of two advertisements having a given commonality, proximate to one another in "advertisement space". For example, the commonality may comprise a common actor or personality advertising different goods/services for a common source or advertiser. The commonality may also comprise the same goods and services from competing advertisers (e.g., the MSO way wish to avoid placing advertisements for competing cellular service providers one after the other).

Moreover, it is appreciated that the "user" and "device" specific data previously referenced herein may also apply to multiple individuals, or organizations. For example, a device identification may relate to a DSTB or other CPE within a family premises having several individual family members associated therewith. Each of these family members may have different demographics, psychographics, etc., and hence the present invention contemplates that the CM or other supervisory/selection entity can be configured to construct advertising or promotional campaigns based on (i) two or more person as individuals, or (ii) on the entity in the aggregate. For example, a "family" or "company" profile may be constructed, which considers the various attributes, demographics, psychographics, etc. of the entity as a whole, or multiple sub-profiles for each of the individuals may be used. User-specific logins such as those described in co-owned, co-pending U.S. patent application Ser. No. 12/414,554 filed on Mar. 30, 2009 and entitled "PERSONAL MEDIA CHANNEL APPARATUS AND METHODS", which is incorporated herein by reference in its entirety, may be used for this purpose; i.e., to specifically identify an individual within an entity, so as to tailor the secondary content for that individual (as opposed to the larger entity as a whole).

It is also appreciated that the enhanced opportunities for targeted secondary content insertion described herein may be exploited by network operators or advertisers via a "network promotion" product or model. For example, clients of an MSO (e.g., studios, networks, advertisers, etc.) can utilize the foregoing content insertion tools (e.g., replacement, fill, and/or addition) to specifically target advertising or other secondary content based on the characteristics of the subscriber and/or the particular on-demand asset being viewed.

Moreover, individual user devices associated with a common account may be used as the basis for selection and insertion. That is, knowledge of a particular requesting device may tell the CM, ADM, etc. what the context of a user is at the time of request. For example, a given subscriber account may have three (3) separate devices registered therein or associated therewith, such as (i) a DSTB; (ii) a 3G or 4G (e.g., WiMAX or LTE enabled) mobile smart-phone; and (ii) a WiFi-enabled PMD. Origination of an OD content request via the smartphone or PMD (e.g., over a WiFi WLAN in communication with the subscriber's "home" cable or satellite network) may be used to determine that the subscriber has a "mobile" context (i.e., is not at their premises), and therefore may wish to receive, or can make best use of, a certain class of secondary content (e.g., advertisements related to mobility-related topics, such as on-line sources for directions, things having an "on-the-go" theme, travel topics, etc.). Conversely, where the request originates from that user's DSTB, the context may indicate that premises-related advertisements (e.g., home repair or upgrade, real estate purchase, major appliances, etc.) are more suitable or effective.

The types or formats of secondary content to be inserted may also vary according to the status of the requesting subscriber and/or device (e.g., certain subscribers or classes of subscribers may receive upgraded content formats). As noted previously, these rules may be implemented at the device level (e.g., CPE 106) or at the ADM 220, ADS 222, or CM 224. The CPE 106 may possess high definition (HD) decoding capability, for example, but programs rendered in HD would not be made available to such subscribers unless they met certain criteria (e.g., "premium" subscription, etc.). Similarly, if the subscriber did not possess a required codec, CA keys, or network interface, the download of this missing component could be controlled to only subscribers meeting certain criteria. In one embodiment, the business rules engine running on a processor 804 of the CPE 106 and/or at the aforementioned ADM 220, ADS 222, or CM 224 implements these criteria.

Many other approaches and combinations of various operational and business paradigms are envisaged consistent with the invention, as will be recognized by those of ordinary skill when provided this disclosure.

Alternate Delivery Paradigms—

As previously noted, the concepts and apparatus described herein are readily extensible to other content delivery paradigms which provide content "on demand", including without limitation: (i) "pay per view (PPV)"; (ii) content rental or purchase via mail or other tangible delivery platform (e.g., the prior art "Netflix®" service); and (iii) selection of a video for play via the Internet, such as via the "YouTube®" website.

For example, typical PPV services offer customers the ability to tune into existing linear content broadcasts which begin at staggered times across various different program channels offered by the MSO. The user does not "demand" the content per se, but rather demands access to an existing asset stream. Since the content stream is ubiquitous and delivered identically and simultaneously to a plurality of different subscribers, the opportunities for targeted insertion of secondary content before or during the primary content stream play are limited; however, at the completion of the PPV stream, an insertion opportunity exists. In one approach, the user, content, or device-specific data is sent upstream to the ADM 220, ADS 222, or CM 224 upon PPV request. At a subsequent time, the ADM 220, ADS 222, or CM 224 uses the user-specific data to identify a targeted advertisement for delivery to the user immediately upon completion of the PPV movie (or even upon detection of a tune-away event received before completion of the PPV event, e.g., within one minute of the end of the program, when people normally tune away while the credits are being played). A brief user-specific "on demand" session is instantiated automatically, and the short advertisement played, but the session may be terminated if the user tunes away (or alternatively, the user may be "held captive" for the duration of the advertisement by preventing user teiiiiination of the session or tune-away, and then control subsequently restored when the advertisement has been completed).

In terms of content rental or purchase, user, context, or device-specific data may be used to select secondary content for inclusion within purchased or leased media delivered to the user. For example, in one such variant, user- (or premises) specific DVD or other physical media is dynamically generated and sent to a user. For instance, a user might access a media provider's Internet website via their cable or satellite modem (whether interactively, such as in the context of an IPTV scenario, or via traditional data channels), and select a title for delivery via "hard" media. The request may include information regarding the user, which can be used to access demographic, psychographic, etc. data relating thereto. Targeted secondary content can then be dynamically selected and inserted ("burned") onto the DVD before shipment (e.g., in a just-in-time fashion), so that each DVD delivered to each customer is uniquely tailored to them in terms of secondary content (e.g., trailers, previews, advertisements, etc.).

In another variant, the methods and apparatus described in co-owned and co-pending U.S. patent application Ser. No. 11/080,693 filed on Mar. 14, 2005 and entitled "METHOD AND APPARATUS FOR NETWORK CONTENT DOWNLOAD AND RECORDING", which is incorporated herein by reference in its entirety, may be used consistent with the present invention. As described therein, extant high-speed network download and data recording technologies may be used to provide the network subscriber or other user the ability to timely and rapidly download new content such as a new-release movie or game, along with the ability to promptly reduce the downloaded content onto a desired medium (e.g., DVD). The downloaded content may include e.g., targeted secondary content selected and inserted according to the methods and apparatus discussed elsewhere herein. The provision of the new content for viewing can also be tied to a purchase of the content (or other commerce-based event), such as where the content is only delivered after the user agrees to purchase the content and record it onto a DVD or similar media. This capability provides a number of distinct advantages, including, inter alia: (i) the ability to sell the subscriber a movie or other title in an earlier window than would otherwise be available under prior art network content distribution paradigms; (ii) the ability to download a disk image to the customer's DVR hard disk or other storage device at a very high speed; and (iii) the customer's ability to run the downloaded content directly from their hard disk and also produce a fixed or erasable medium copy (e.g., DVD, memory stick, USB key, etc.), as desired.

In terms of online (Internet) content demands, the MSO may utilize knowledge regarding a particular subscriber, account, device, use or content context, etc. to selectively insert advertising or other secondary content into the requested video. For instance, a user requesting to watch a YouTube video on their PC (or television monitor via, e.g., the methods and apparatus of U.S. Provisional Patent Application Ser. No. 61/256,903 entitled "METHODS AND APPARATUS FOR PACKETIZED CONTENT DELIVERY OVER A CONTENT DELIVERY NETWORK" previously referenced herein) will be identified as being a particular MSO network subscriber, and hence demographic, device, context, etc. information can be used to populate one or more insertion opportunities with targeted secondary content within the delivered IP transport of the primary content. For instance, in one variant, the secondary content is appended contiguously to the front or back of the requested video, akin to prior art video delivery windows now ubiquitous on the network. One salient distinction over these prior art approaches, however, is an explicit association between the requesting subscriber and particular demographics, psychographics, device contexts, etc. and the inserted advertising.

In yet another embodiment, content providers which provide the content fixed a physical medium (such as the aforementioned Netflix system) may generate and re-use user-customized versions of the content. In other words, the content may be placed on a DVD or other fixed or transitory medium with secondary content inserted therein which is specific to (e.g., targeted to) a first user. Once the DVD is returned, the targeted DVD may be categorized based on e.g., demographics, psychographics, etc. and subsequently provided to a second user requesting the content who shares the demographic, psychographic, etc. of the first user. In this manner, multiple uniquely targeted content versions may be created and shared among a plurality of users.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps pennuted. All such variations are considered to be encompassed within the invention disclosed and claimed herein.

While the above detailed description has shown, described, and pointed out novel features of the invention as applied to various embodiments, it will be understood that various omissions, substitutions, and changes in the faint and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A method of operating a computerized network apparatus within a content delivery network for provision of modified on-demand digitally rendered content to a computerized user device, the computerized user device in data communication with the content delivery network, the modified on-demand digitally rendered content having targeted digital secondary content inserted therein, the method comprising:
   receiving, via the content delivery network, data indicative of a request for on-demand digitally rendered content from the computerized user device;
   evaluating the requested on-demand digitally rendered content to identify (i) one or more first secondary digital content elements inserted therein, and (ii) first metadata associated with the one or more first secondary digital content elements;
   accessing context data associated with the computerized user device;
   based at least in part on evaluation of the first metadata and the context data, determining incompatibility of the one or more first secondary digital content elements with one or more characteristics associated with the computerized user device; and
   based at least in part on the determined incompatibility:
      removing each of the one or more first secondary digital content elements from the requested on-demand digitally rendered content by at least identifying a range of each of one or more digital content blocks within the requested on-demand digitally rendered content, each of the one or more digital content blocks corresponding to one of the one or more first secondary digital content elements, and based at least in part on the range thereof, ranging-out each of the one or more digital content blocks from the requested on-demand digitally rendered content;
      identifying one or more insertion opportunities within the requested on-demand digitally rendered content having the one or more first secondary digital content elements removed therefrom, wherein the identifying comprises, after the ranging-out of the one or more digital content blocks, identifying one or more of a start splice point or an end splice point for each of one or more remaining digital content blocks, each of the one or more remaining digital content blocks corresponding to at least one segment of the on-demand digitally rendered content;
      identifying one or more replacement secondary digital content elements targeted to each of the one or more insertion opportunities;
      inserting at least one of the identified one or more replacement secondary digital content elements at each of the one or more insertion opportunities to generate the modified on-demand digitally rendered content, wherein the inserting comprises splicing the at least one of the identified one or more replacement secondary digital content elements into at least one of the one or more of the start splice point or the end splice point for each of the one or more remaining digital content blocks; and
      enabling delivery of the modified on-demand digitally rendered content to the computerized user device via an on-demand session;
   wherein:
      the at least one of the identified one or more replacement secondary digital content elements comprises at least a first replacement secondary digital content element;
      the one or more remaining digital content blocks comprise at least a first digital content block and a second digital content block, the second content block downstream of the first digital content block; and
      the splicing further comprises:
         identifying data related to a first run-time of a first one of the one or more first secondary digital content elements removed from the requested on-demand digitally rendered content at a first location between the first digital content block and the second digital content block;
         identifying data related to a second run-time of the first replacement secondary digital content element to be inserted at the first location; and
         based at least on evaluation of the data related to the first run-time and the data related to the second run-time, time-shifting at least the second digital content block.

2. The method of claim 1, wherein the one or more first secondary digital content elements are replaced (i) one-for-one, or (ii) one-for-N, or (iii) N-for-one.

3. The method of claim 1, wherein:
the context data associated with the computerized user device comprises data indicative of one or more of a current time or a current date at a location associated with the computerized user device;
the first metadata associated with the one or more first secondary digital content elements comprises at least first temporal relevance data; and
the determining of the incompatibility of the one or more first secondary digital content elements and the one or more characteristics associated with the computerized user device at least in part comprises determining that the first temporal relevance data is incompatible with the data indicative of the one or more of the current time or the current date at the location associated with the computerized user device.

4. The method of claim 3, wherein the identifying the one or more replacement secondary digital content elements targeted to each of the one or more insertion opportunities at least in part comprises:
accessing second metadata associated with the one or more replacement secondary digital content elements, the second metadata comprising at least second temporal relevance data; and
based at least in part on evaluation of the second metadata and the context data, identifying that the second temporal relevance data is compatible with the data indicative of the current time at the location of the computerized user device.

5. The method of claim 1, wherein:
the context data associated with the computerized user device comprises data indicative of a geographic location associated with the computerized user device;
the first metadata associated with the one or more first secondary digital content elements comprises at least first geographic relevance data; and
the determining of the incompatibility of the one or more first secondary digital content elements and the one or more characteristics associated with the computerized user device at least in part comprises identifying that the first geographic relevance data is incompatible with the data indicative of the geographic location associated with the computerized user device.

6. The method of claim 5, wherein the identifying the one or more replacement secondary digital content elements targeted to each of the one or more insertion opportunities at least in part comprises:
accessing second metadata associated with the one or more replacement secondary digital content elements, the second metadata comprising at least second geographic relevance data; and
based at least in part on evaluation of the second metadata and the context data, identifying that the second geographic relevance data is compatible with the data indicative of the geographic location associated with the computerized user device.

7. The method of claim 1, wherein:
the context data associated with the computerized user device comprises data indicative of at least one of demographic information or historical user activity associated with the computerized user device;
the first metadata associated with the one or more first secondary digital content elements comprises at least first target audience data; and
the determining of the incompatibility of the one or more first secondary digital content elements and the computerized user device at least in part comprises identifying that the first target audience data is incompatible with the data indicative of the at least one of the demographic information or the historical user activity associated with the computerized user device.

8. The method of claim 7, wherein the identifying the one or more replacement secondary digital content elements targeted to each of the one or more insertion opportunities at least in part comprises:
accessing second metadata associated with the one or more replacement secondary digital content elements, the second metadata comprising at least second target audience data; and
based at least in part on an evaluation of the second metadata and the context data, identifying that the second target audience data is compatible with the data indicative of the at least one of the demographic information or the historical user activity associated with the computerized user device.

9. The method of claim 1, wherein:
the computerized user device comprises a mobile computerized user device, the mobile computerized user device associated with a primary computerized user device;
the context data associated with the computerized user device comprises at least data indicative of (i) the association of the mobile computerized user device and the primary computerized user device and (ii) a geographic location associated with the primary computerized user device;
the metadata associated with the one or more first secondary digital content elements comprises at least first geographic relevance data; and
the determining of the incompatibility of the one or more first secondary digital content elements and the one or more characteristics associated with the computerized user device at least in part comprises identifying, irrespective of data indicative of a location of the mobile computerized user device, that the first geographic relevance data is incompatible with the data indicative of (i) the association of the mobile computerized user device and the primary computerized user device and (ii) the geographic location associated with the primary computerized user device.

10. The method of claim 9, wherein the identifying the one or more replacement secondary digital content elements targeted to each of the one or more insertion opportunities at least in part comprises:
accessing second metadata associated with the one or more replacement secondary digital content elements, the second metadata comprising at least second geographic relevance data; and
based at least in part on evaluation of the second metadata and the context data, identifying that the second geographic relevance data is compatible with the data indicative of (i) the association of the mobile computerized user device and the primary computerized user device and (ii) the geographic location associated with the primary computerized user device, the compatibility irrespective of the data indicative of the location of the mobile computerized user device.

11. A computerized network apparatus configured for operation in a content delivery network for provision of on-demand primary digital content having targeted digital secondary content inserted therein to one or more computerized user devices in data communication with the content delivery network, the computerized network apparatus comprising:

data interface apparatus, the data interface apparatus configured for data communication with the content delivery network;

data processing apparatus, the data processing apparatus in data communication with the data interface apparatus; and data storage apparatus in data communication with the data processing apparatus, the data storage apparatus comprising at least one computer program, the at least one computer program comprising a plurality of instructions which are configured to, when executed by the data processing apparatus, cause the computerized network apparatus to:

receive, via the content delivery network, data indicative of a request for the on-demand primary digital content from a first computerized user device of the one or more computerized user devices;

identify each of (i) one or more first secondary digital content elements inserted within the requested on-demand primary digital content, and (ii) first metadata associated with the one or more first secondary digital content elements;

access context data associated with the first computerized user device;

identify whether the one or more first secondary digital content elements are compatible with the first computerized user device via evaluation of the context data and the first metadata;

based at least in part on an identification of compatibility, enable delivery of the on-demand primary digital content having the one or more first secondary digital content elements inserted therein to the first computerized user device; and based at least in part on an identification of incompatibility:

automatically remove the one or more first secondary digital content elements from the requested on-demand primary digital content wherein the automatic removal of the one or more first secondary digital content elements from the requested on-demand primary digital content at least in part comprises:

range-out of one or more digital content blocks each corresponding to one of the one or more first secondary digital content elements; and identification of at least a first digital content block and a second digital content block, the second digital content block downstream of the first digital content block;

evaluate (i) second metadata associated with individual ones of a plurality of secondary digital content elements and (ii) the context data associated with the first computerized user device to identify at least a first replacement secondary digital content element from a plurality of secondary digital content elements that is compatible with the first computerized user device;

splice-in at least the first replacement secondary digital content element into the requested on-demand primary digital content having the one or more first secondary digital content elements removed therefrom; and enable the delivery of the on-demand primary digital content having at least the first replacement secondary digital content element spliced therein to the first computerized user device;

wherein:
the splice-in of the at least first replacement secondary digital content element at least in part comprises:

identification of data related to a first run-time of a first one of the one or more first secondary digital content elements, the first one of the one or more first secondary digital content elements removed from the requested on-demand digital content at a first location between the first digital content block and the second digital content block;

identification of data related to a second run-time of the first replacement secondary digital content element to be inserted at the first location; and based at least on an evaluation of the data related to the first run-time and the data related to the second run-time, performance of at least one time-shift of at least the second digital content block.

12. The computerized network apparatus of claim 11, wherein the first replacement secondary digital content element is re-encapsulated to be compatible with the first computerized user device.

13. A method of operating a computerized network apparatus within a digital content delivery network for provision of modified on-demand digitally rendered content to a computerized user device, the modified on-demand digitally rendered content having targeted digital secondary content therein, the method comprising:

receiving data indicative of a request for on-demand digitally rendered content, the request issued from the computerized user device;

evaluating the requested on-demand digitally rendered content to identify (i) at least one secondary digital content element inserted therein, and (ii) first metadata associated with the at least one secondary digital content element;

based at least in part on evaluation of the first metadata, determining an incompatibility of the at least one secondary digital content element with one or more characteristics associated with the computerized user device; and based at least in part on the determined incompatibility:

removing the at least one secondary digital content element from the requested on-demand digitally rendered content by at least ranging-out one or more digital content blocks associated with the at least one secondary digital content element from the requested on-demand digitally rendered content;

identifying at least one insertion opportunity within the requested on-demand digitally rendered content having the at least one secondary digital content element removed therefrom, wherein the identifying comprises identifying one or more of a start splice point or an end splice point for one or more remaining digital content blocks, each of the one or more remaining digital content blocks corresponding to at least one segment of the on-demand digitally rendered content;

identifying one or more replacement secondary digital content elements targeted to the at least one insertion opportunity;

inserting the identified one or more replacement secondary digital content elements at the at least one insertion opportunity to generate the modified on-demand digitally rendered content, wherein the inserting comprises splicing the identified one or more replacement secondary digital content elements using at least one of the start splice point or the end splice point; and enabling delivery of the modified on-demand digitally rendered content to the computerized user device via an on-demand session;

wherein the splicing further comprises:
accessing first data related to a run-time of the at least one secondary digital content element;
accessing second data related to a run-time of the at least one replacement secondary digital content element to be inserted; and
based at least on evaluation of the first data and the second data, time-shifting at least a portion of the one or more remaining digital content blocks.

14. A computerized network apparatus configured for operation in a content delivery network for provision of modified on-demand primary digital content to one or more computerized user devices in data communication with the content delivery network, the computerized network apparatus comprising:

data interface apparatus, the data interface apparatus configured for data communication with the content delivery network;
data processing apparatus, the data processing apparatus in data communication with the data interface apparatus; and
data storage apparatus in data communication with the data processing apparatus, the data storage apparatus comprising at least one computer program, the at least one computer program comprising a plurality of instructions which are configured to, when executed by the data processing apparatus, cause the computerized network apparatus to:
receive, via the content delivery network, data indicative of a request for on-demand primary digital content from a first computerized user device of the one or more computerized user devices;
identify whether the requested on-demand primary digital content comprises one or more segments of secondary digital content inserted therein;
based at least in part on an identification indicating that the requested on-demand primary digital content does not have the one or more segments of secondary digital content inserted therein:
cause insertion of at least one targeted secondary content element into the requested on-demand primary digital content to generate the modified on-demand primary digital content, wherein the causation of the insertion of the at least one targeted secondary content element into the requested on-demand primary digital content at least in part comprises:
evaluation of the requested on-demand primary digital content to identify data indicative of at least one insertion opportunity;
utilization of (i) first metadata associated with individual ones of a plurality of secondary digital content elements, and (ii) first context data associated with the first computerized user device to identify the at least one targeted secondary content element from the plurality of secondary digital content elements; and
utilization of the data indicative of at least one insertion opportunity to splice the at least one targeted secondary content element into the requested on-demand primary digital content; and enable delivery of the modified on-demand primary digital content to the first computerized user device; and
based at least in part on an identification indicating that the requested on-demand primary digital content does have the one or more segments of the secondary digital content inserted therein:
identify, based at least on one or more device capabilities associated with the first computerized user device, whether the one or more segments of the secondary digital content are compatible with first computerized user device;
based at least in part on an identification of incompatibility with the first computerized user device based at least on the one or more device capabilities, (i) remove the one or more segments of the secondary digital content from the requested on-demand primary digital content, and (ii) replace each of the removed one or more segments of the secondary digital content with one or more targeted secondary content elements to generate the modified on-demand primary digital content; and
enable the delivery of the modified on-demand primary digital content to the first computerized user device.

15. The computerized network apparatus of claim 14, wherein the identification of whether the one or more segments of the secondary digital content are compatible with the first computerized user device at least in part comprises:
evaluation of (i) second metadata associated with the one or more segments of the secondary digital content, and (ii) first context data associated with the first computerized user device; and
based at least in part on the evaluation, identification that the one or more segments of the secondary digital content are incompatible with the first computerized user device.

16. The computerized network apparatus of claim 14, wherein the removal of the one or more segments of the secondary digital content from the requested on-demand primary digital content, and the replacement of each of the removed one or more segments of the secondary digital content with the one or more targeted secondary content elements at least in part comprises:
automatic range-out of one or more sections of digital content from the requested on-demand primary digital content, each of the one or more sections of digital content corresponding to one of the one or more segments of the secondary digital content;
identification of one or more remaining sections of digital content, each of the one or more remaining sections of digital content comprising a primary digital content segment;
evaluation of (i) the first metadata associated with individual ones of a plurality of secondary digital content elements, and (ii) the first context data associated with the first computerized user device to identify the one or more targeted secondary content elements from the plurality of secondary content elements which are compatible with the first computerized user device; and
splice-in of at least one of the one or more targeted secondary content elements between the one or more remaining sections of digital content.

17. Computer readable apparatus comprising a non-transitory storage medium, the non-transitory medium comprising at least one computer program having a plurality of instructions, the plurality of instructions configured to, when executed on a processing apparatus, cause a computerized apparatus to:

receive data representative of a request for on-demand digitally rendered content, the request originating from a computerized user device;

evaluate the requested on-demand primary digital content to identify (i) at least one secondary digital content element inserted therein, and (ii) first metadata associated with the at least one secondary digital content elements;

based at least in part on evaluation of the first metadata, determine at least one incompatibility of the at least one secondary digital content element with one or more characteristics associated with the computerized user device; and based at least in part on the determined at least one incompatibility:

(i) remove the at least one secondary digital content element from the requested on-demand primary digital content by at least ranging-out one or more digital content blocks associated with the at least one secondary digital content element from the requested on-demand primary digital content;

(ii) identify at least one insertion opportunity within the requested on-demand primary digital content having the at least one secondary digital content element removed therefrom, wherein the identification comprises identification one or more of a start splice point or an end splice point for one or more remaining digital content blocks, each of the one or more remaining digital content blocks corresponding to at least one segment of the requested on-demand primary digital content;

(iii) identify one or more replacement secondary digital content elements targeted to the at least one insertion opportunity;

(iv) insert the identified one or more replacement secondary digital content elements at the at least one insertion opportunity to generate modified on-demand digitally rendered content, wherein the insertion comprises splicing the identified one or more replacement secondary digital content elements using at least one of the start splice point or the end splice point; and (v) enable delivery of the modified digitally rendered on-demand content to the computerized user device via an on-demand session;

wherein the splicing further comprises:

access of first data related to a run-time of the at least one secondary digital content element;

access of second data related to a run-time of the at least one replacement secondary digital content element to be inserted; and based at least on evaluation of the first data and the second data, a time-shift of at least a portion of the one or more remaining digital content blocks.

\* \* \* \* \*